US010789691B2

(12) United States Patent
Arai

(10) Patent No.: US 10,789,691 B2
(45) Date of Patent: Sep. 29, 2020

(54) INFORMATION PROCESSING APPARATUS AND INFORMATION PROCESSING METHOD

(71) Applicant: SONY CORPORATION, Tokyo (JP)

(72) Inventor: Hiroshi Arai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 46 days.

(21) Appl. No.: 16/067,352

(22) PCT Filed: Dec. 5, 2016

(86) PCT No.: PCT/JP2016/005060
§ 371 (c)(1),
(2) Date: Jun. 29, 2018

(87) PCT Pub. No.: WO2017/125980
PCT Pub. Date: Jul. 27, 2017

(65) Prior Publication Data
US 2019/0012774 A1    Jan. 10, 2019

(30) Foreign Application Priority Data

Jan. 21, 2016  (JP) .................................. 2016-009553

(51) Int. Cl.
*G06T 5/20* (2006.01)
*G06N 3/08* (2006.01)
(Continued)

(52) U.S. Cl.
CPC ............ *G06T 5/20* (2013.01); *G06K 9/00973* (2013.01); *G06K 9/46* (2013.01); *G06K 9/4628* (2013.01);
(Continued)

(58) Field of Classification Search
CPC ......... G06T 5/20; G06T 5/00; G06K 9/00973; G06K 9/46; G06K 9/4628; G06K 9/627;
(Continued)

(56) References Cited

U.S. PATENT DOCUMENTS

2016/0328645 A1* 11/2016 Lin ......................... G06N 3/08

FOREIGN PATENT DOCUMENTS

JP    06-231245 A    8/1994
JP    2015-036939 A    2/2015

OTHER PUBLICATIONS

Chen et al, "Removing Structural Noise in Handwriting Images using Deep Learning", 2014, ICVGIP '14, 8 pages (Year: 2014).*
(Continued)

*Primary Examiner* — David F Dunphy
(74) *Attorney, Agent, or Firm* — Chip Law Group

(57) ABSTRACT

This information processing apparatus includes: a mechanical learning module that is a multiplier-accumulator circuit including a plurality of deep-learning neural network blocks hierarchized and synthesizes an algorithm having a filter characteristic for image processing by mechanical learning, the image processing being a target; a debug module that analyzes a digital filter characteristic in each of the deep-learning neural network blocks on the basis of input and output data in the mechanical learning module; and a grading module that develops an output image from an input image by performing gain control on the basis of a result of analysis of the debug module.

10 Claims, 51 Drawing Sheets

(51) Int. Cl.
*G06N 3/063* (2006.01)
*G06K 9/46* (2006.01)
*G06T 5/00* (2006.01)
*G06K 9/62* (2006.01)
*G06K 9/00* (2006.01)
*G06N 3/04* (2006.01)

(52) U.S. Cl.
CPC ........... *G06K 9/627* (2013.01); *G06N 3/0454* (2013.01); *G06N 3/063* (2013.01); *G06N 3/0635* (2013.01); *G06N 3/088* (2013.01); *G06T 5/00* (2013.01); *G06T 2207/20081* (2013.01); *G06T 2207/20084* (2013.01)

(58) Field of Classification Search
CPC .... G06N 3/0454; G06N 3/063; G06N 3/0635; G06N 3/088
See application file for complete search history.

(56) References Cited

OTHER PUBLICATIONS

Okatani, et al., "Deep Learning", IPSJ SIG Notes Computer Vision and Image Media (CVIM), Jan. 16, 2013, vol. 2013-CVIM-185, Issue 19, pp. 1-17.
International Search Report and Written Opinion of PCT Application No. PCT/JP2016/005060, dated Jan. 17, 2017, 07 pages of ISRWO.

\* cited by examiner

Example in which seamless connection has failed

Example in which seamless connection has succeeded

Conventional spatial wavelet transform
Multilevel hierarchy of downsizing

Extended wavelet transform
Multiresolution of staircase structure

Conventional matching technique

Analysis by mechanical learning

CNN clustering

AutoEncoder multilevel hierarchy

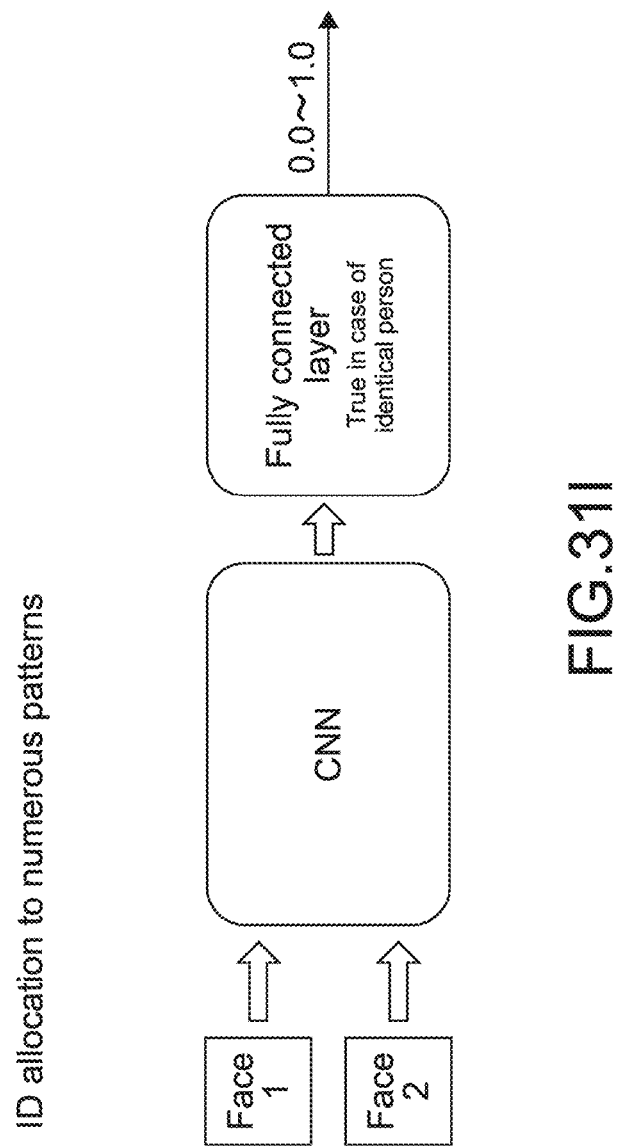

Image processing algorithm (1) of numerical value calculation type

Image processing algorithm (2) of numerical expression processing type

Image processing algorithm of numerical expression processing (symbol processing) type

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/005060 filed on Dec. 5, 2016, which claims priority benefit of Japanese Patent Application No. JP 2016-009553 filed in the Japan Patent Office on Jan. 21, 2016. Each of the above-referenced applications is hereby incorporated herein by reference in its entirety.

TECHNICAL FIELD

The present technology relates to an information processing apparatus, an information processing method, and a program, with which an image processing algorithm is synthesized by mechanical learning in the field of image processing.

BACKGROUND ART

For designing an algorithm for image processing, it is necessary to use a numerical expression that is a base of an algorithm to be implemented. In contrast, a mechanical learning system represented by a neural network is capable of synthesizing an algorithm by determining an approximation expression of a target numerical expression by mechanical learning using input data and an expectation value.

For example, Patent Literature 1 has disclosed a mechanism for automatically constructing a feature-amount calculation algorithm that calculates an aimed feature amount corresponding to input data of an image or the like by using mechanical learning and a genetic algorithm.

CITATION LIST

Patent Literature

Patent Literature 1: Japanese Patent Application Laid-open No. 2009-104275

DISCLOSURE OF INVENTION

Technical Problem

However, such a mechanical learning system often requires suitable skills of sorting learning patterns, providing necessary and sufficient learning patterns with a full knowledge of basis characteristics of the mechanical learning, and the like. Therefore, it is difficult to efficiently synthesize a high-precision algorithm by making the use of the characteristics of the mechanical learning system. In addition, the mechanical learning system still has unsolved problems, and it is desirable to solve them.

In view of the above-mentioned circumstances, it is an object of the present technology to provide an information processing apparatus, an information processing method, and a program, with which an aimed algorithm can be favorably synthesized by using a mechanical learning system.

Solution to Problem

In order to solve the above-mentioned problem, an information processing apparatus of an embodiment according to the present technology includes: a mechanical learning module that is a multiplier-accumulator circuit including a plurality of deep-learning neural network blocks hierarchized and synthesizes an algorithm having a filter characteristic for image processing by mechanical learning, the image processing being a target; a debug module that analyzes a digital filter characteristic in each of the deep-learning neural network blocks on the basis of input and output data in the mechanical learning module; and a grading module that develops an output image from an input image by performing gain control on the basis of a result of analysis of the debug module. Therefore, it is possible to favorably synthesize an aimed algorithm by using a mechanical learning system.

In order to solve the above-mentioned problem, in the information processing apparatus of the embodiment according to the present technology, the mechanical learning module may include a PreTraining layer that performs unsupervised machine learning, and a FineTune layer that performs supervised learning.

In order to solve the above-mentioned problem, in the information processing apparatus of the embodiment according to the present technology, the mechanical learning module may be configured to perform the supervised learning by using a component decomposed in a middle layer of each of the deep-learning neural network blocks included in the PreTraining layer as a supervisory signal of each of the deep-learning neural network blocks included in the FineTune layer.

In order to solve the above-mentioned problem, in the information processing apparatus of the embodiment according to the present technology, the PreTraining layer may be constructed by an object type header that decomposes the input image into an object tree structure by performing convolution and pooling on the input image.

In order to solve the above-mentioned problem, in the information processing apparatus of the embodiment according to the present technology, the PreTraining layer may be constructed by a wavelet type header that generates, from the input image, a frequency decomposed image with a time and a space mixed from a high frequency to a low frequency.

In order to solve the above-mentioned problem, in the information processing apparatus of the embodiment according to the present technology, the PreTraining layer may be constructed by a struct type header that extracts an effective component in depth analysis, profile analysis, or region analysis of the input image.

In order to solve the above-mentioned problem, in the information processing apparatus of the embodiment according to the present technology, the FineTune layer may include the plurality of deep-learning neural network blocks that perform inter-frame learning by using the input image including a plurality of frames, and the plurality of deep-learning neural network blocks that perform in-frame learning by using the input image including the plurality of frames.

In order to solve the above-mentioned problem, in the information processing apparatus of the embodiment according to the present technology, a configuration in which the plurality of deep-learning neural network blocks that perform the in-frame learning are connected in the order of the plurality of deep-learning neural network blocks that perform commutative-law conversion, the plurality of deep-learning neural network blocks that perform spatial-resolution conversion, and the plurality of deep-learning neural network blocks that perform dynamic-resolution conversion may be employed.

In order to solve the above-mentioned problem, an information processing method of an embodiment according to the present technology includes: synthesizing, by a mechanical learning module that is a multiplier-accumulator circuit including a plurality of deep-learning neural network blocks hierarchized, an algorithm having a filter characteristic for image processing by mechanical learning, the image processing being a target; analyzing, by a debug module, a digital filter characteristic in each of the deep-learning neural network blocks on the basis of input and output data in the mechanical learning module; and developing, by a grading module, an output image from an input image by performing gain control on the basis of a result of analysis of the debug module.

In order to solve the above-mentioned problem, a program of an embodiment according to the present technology causes a computer to function as: a mechanical learning module that is a multiplier-accumulator circuit including a plurality of deep-learning neural network blocks hierarchized and synthesizes an algorithm having a filter characteristic for image processing by mechanical learning, the image processing being a target; a debug module that analyzes a digital filter characteristic in each of the deep-learning neural network blocks on the basis of input and output data in the mechanical learning module; and a grading module that develops an output image from an input image by performing gain control on the basis of a result of analysis of the debug module.

Advantageous Effects of Invention

As described above, in accordance with the present technology, it is possible to favorably synthesize an aimed algorithm by using a mechanical learning system.

It should be noted that the effects described here are not necessarily limitative and any effect described in the present disclosure may be provided.

BRIEF DESCRIPTION OF DRAWINGS

[FIG. 31I] A diagram showing a state of ID allocation to numerous patterns.

MODE(S) FOR CARRYING OUT THE INVENTION

Hereinafter, embodiments according to the present technology will be described with reference to the drawings.

First Embodiment

[Overall Configuration of Image Processing Algorithm Generation Apparatus]

Figure 1:
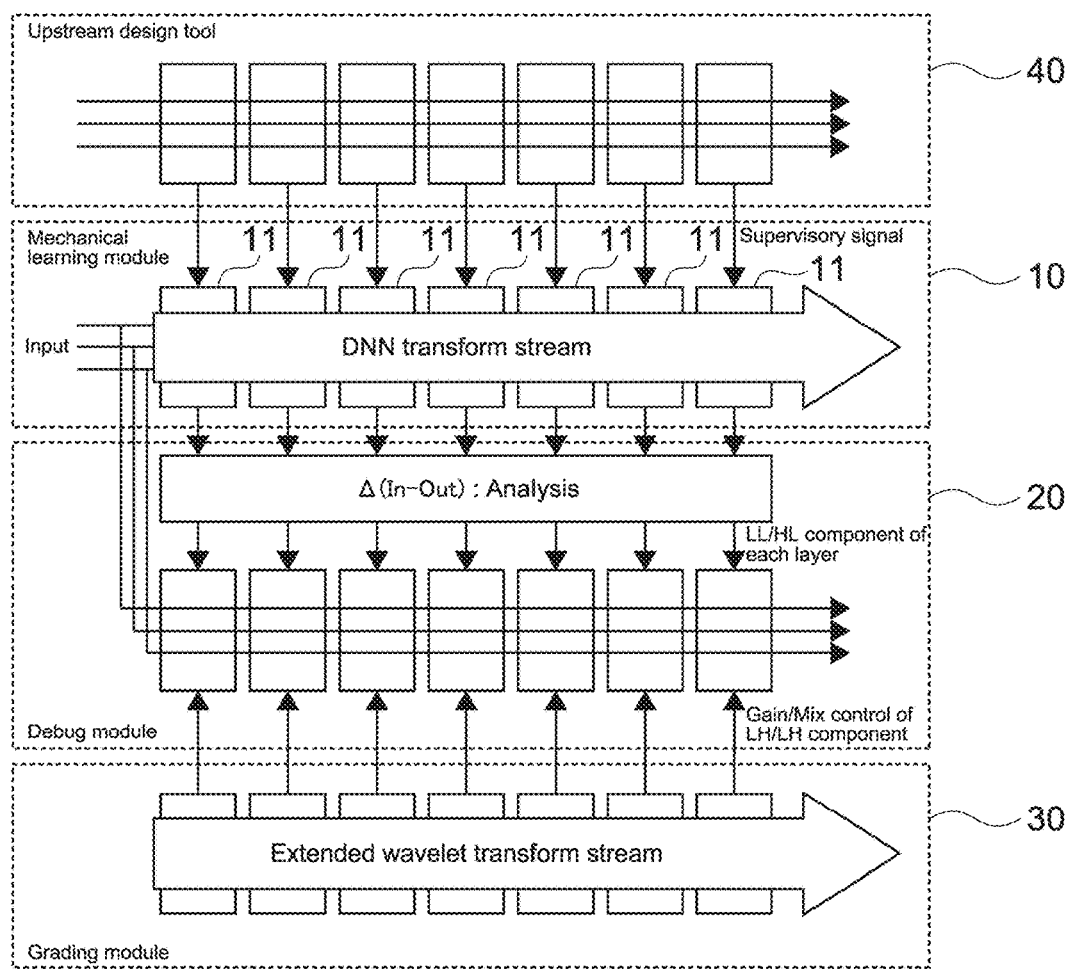
[FIG. 1] A block diagram showing a configuration of an image processing algorithm generation apparatus 1 that is a first embodiment according to the present technology.

First of all, an overall configuration of an image processing algorithm generation apparatus will be described as an example of an information processing apparatus according to a first embodiment of the present technology. FIG. 1 is a block diagram showing a configuration of an image processing algorithm generation apparatus 1 that is a first embodiment according to the present technology.

This image processing algorithm generation apparatus 1 includes a mechanical learning module 10, a debug module 20, a grading module 30, and the like.

The mechanical learning module 10 is a multiplier-accumulator circuit, and constructs an algorithm having a filter characteristic for image processing, which is a target, by mechanical learning. The mechanical learning module 10 includes a plurality of deep learning neural network (DNN) blocks 11 hierarchized.

Each layer in the mechanical learning module 10 has a function of analyzing digital filter characteristics from input and output.

The debug module 20 analyzes the digital filter characteristics at each DNN block 11 on the basis of input and output data in the mechanical learning module 10.

The grading module 30 performs gain control on the basis of a result of analysis of the debug module 20, and develops an output image such as a high-framerate image from an input image.

The grading module 30 performs extended wavelet transform in each level layer from input information, and adjusts each component of the performed extended wavelet transform.

Hereinabove, the overall configuration of the image processing algorithm generation apparatus has been described as the example of the information processing apparatus according to the first embodiment of the present technology. Note that an upstream design tool 40 shown in the figure refers to a tool for generating a supervisory signal to each DNN block 11 of the mechanical learning module 10.

[Description Method for DNN Block]

Figure 2:
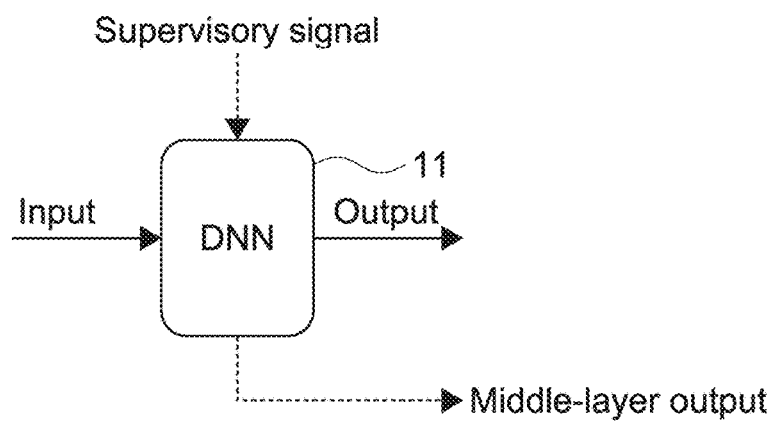
[FIG. 2] A diagram showing a description method for input and output into/from each of DNN blocks 11 that constitute a mechanical learning module 10.

Next, a description method for each of the individual DNN blocks 11 that constitute the mechanical learning module 10 will be described. FIG. 2 is a diagram showing a description method for the input and output into/from each of the DNN blocks 11 that constitute the mechanical learning module 10. Note that, in the figures which will be described below, the DNN blocks 11 will be described as a DNN or simply an NN.

An input signal, an output signal, a supervisory signal (expectation value), and a middle-layer output signal are input and output into/from the DNN block 11.

After the supervisory signal is provided and the mechanical learning is performed, a filter coefficient of synapse data inside the DNN block 11 is determined. Then, an output value can be obtained with respect to an input signal input after the learning.

That is, the learning is performed by performing learning in a neural network including a multilayer perceptron by using the supervisory signal that is the expectation value as a supervisor and determining the filter coefficient of the synapse data inside the DNN block 11.

The present technology is a technology using the DNN, and employs a configuration in which a middle-layer output is passed as an input to the DNN block 11 at a post-stage.

[Object of Present Technology]

In this embodiment, mainly focusing on three technologies of image processing, image recognition, and image analysis, the algorithm is synthesized by using the DNN technology with respect to each of these technologies.

In this application, various elemental technologies for assisting algorithm development using comprehensive artificial intelligence is provided.

[Technology Addressed in This Embodiment]

For explaining the present technology, the principle and the embodiment of the present technology will be explained by addressing a control technology of time information as a specific embodiment.

Note that the present technology is a general-purpose technology applicable to various types of image processing including, in addition to time control, focus control, depth-of-field control, and perspective control related to space phase control, and spectrum information control, and the like, and is not limited to the synthesis of the time control algorithm.

[Fundamental Difference From Typical Technology]

In this embodiment, explanation will be made throughout by exemplifying the synthesis of the algorithm that controls the time information.

Conventionally, in a case where a person designs an algorithm that interpolates image information in a time direction, the algorithm is constructed by using various elemental technologies including motion-vector analysis using feature point extraction and matching technologies, image region division, various scenes associated with intersection or collision of an imaged object, optical flow, and the like.

However, in a case of the mechanical learning, especially, in algorithm synthesis using a neural network using a sigmoid function, the artificial intelligence itself synthesizes an algorithm without considering the above-mentioned basic elemental technologies by a designer.

In particular, in the image processing algorithm generation apparatus 1 of this embodiment, an algorithm of extended wavelet transform that can orthogonally control a time-phase resolution and a dynamic resolution was able to be derived. Note that details will be described later.

By analyzing the derived algorithm, it was found that the time-phase resolution and the dynamic resolution have been controlled in this algorithm through profile movement in multidimensional contrast correction with respect to multidimensional gradation.

In this control, a gradation curve has been constructed as a mean value of various learning patterns in the mechanical learning, and the profile movement has been performed by using this gradation curve.

In this manner, in the algorithm synthesis by mechanical learning, a significantly robust algorithm that causes few failures during interpolation of the input image can be constructed even without considering the above-mentioned technologies such as pattern matching and vector analysis performed by a designer.

Figure 3:
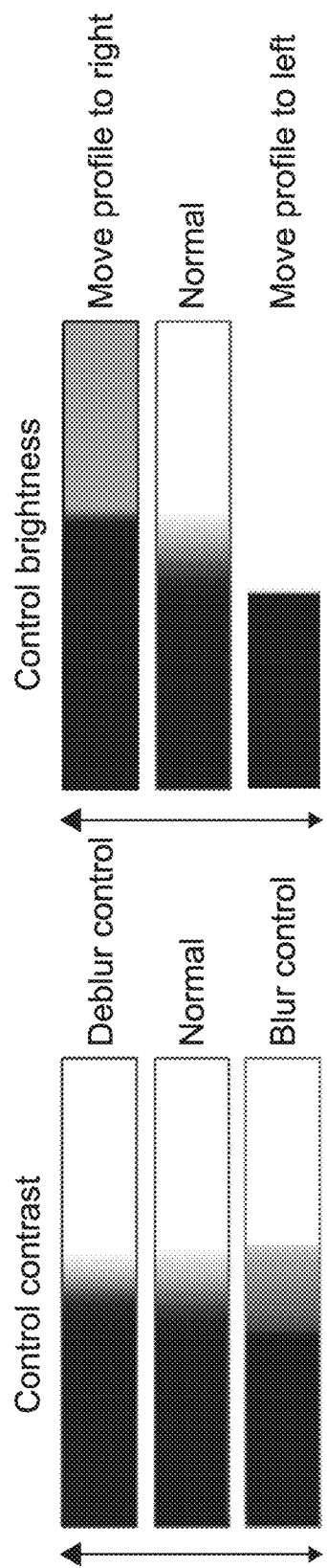
[FIG. 3] A diagram showing an example in which brightness and contrast are varied in one-dimensional gradation.

Note that FIG. 3 is a diagram showing an example in which brightness and contrast are varied in one-dimensional gradation.

As shown in the figure, when the contrast or the brightness of the one-dimensional gradation is changed, the edge of the profile can be controlled by the change of the contrast, and translation of the profile to the left or the right can be controlled by the change of the brightness.

By performing multiply-accumulate operation on the multidimensional gradation, a variety of motions can be represented while reducing variations in luminance and gradation.

When the image processing algorithm is synthesized by mechanical learning using the sigmoid function in the neural network, the profile movement and dynamic resolution control can be explained due to a gradation effect of the curve of the sigmoid function and a multidimensional perceptron.

In accordance with this method, phase information is described in the gradation curve, and the phase information becomes the mean value of the learning patterns. Thus, flexible representation becomes possible also with respect to intersection or deformation of an imaged object.

As observed from the figure, the position of the profile can be moved by brightness control and blur/deblur control of the profile can be performed by contrast control also in the one-dimensional gradation.

As described above, such gradation can be multidimensionally generated in a case of synthesizing the algorithm by mechanical learning.

Therefore, robust development is possible also in interpolation with respect to scenes of intersection, deformation, and the like of the imaged object while freely controlling the time-phase resolution or the dynamic resolution within a range of a "commutative law of information" by using the generated multidimensional gradation.

Note that, if a special precondition is not set, output information cannot be increased beyond information input into the image processing algorithm generation apparatus 1 only by the multiply-accumulate operation through the neural network.

That is, the algorithm that can be obtained by the image processing algorithm generation apparatus 1 is dependent on the "commutative law of the information". Therefore, in a case where an image upconverted in the time direction is developed, the gradation, the spatial resolution, the dynamic resolution, and the SN ratio of the image are deteriorated due to the development in compensation therefor.

As described above, the present technology involves an inventive step. Therefore, a digital filter strictly following the "commutative law of the information" can be synthesized.

[Input Data to Time Control Algorithm]

In the following description, data of successive five frames is used as input data to be processed by using the synthesized time control algorithm.

An extended wavelet transformed image decomposed into components with which the time-phase resolution and the dynamic resolution can be controlled is obtained from the input data through the digital filter that is the algorithm synthesized by the mechanical learning module 10. The extended wavelet transformed image will be described later.

A time control system following the "commutative law of the information" described above can be provided in such a manner that the components with which the time-phase resolution and the dynamic resolution can be controlled is tuned by the grading module 30.

[Time-Phase Resolution Control and Dynamic Resolution Control]

The time-phase resolution control is free control to interpolate a frame in a time phase of −360 degrees to 0 to 360 degrees where an imaging time is defined as 0 degrees and imaging times of previous and subsequent frames are defined as ±360 degrees.

On the other hand, the dynamic resolution control is control related to a residual image with respect to an imaged object that is a moving object, and is control performed by the blur control and the deblur control.

Figure 4:
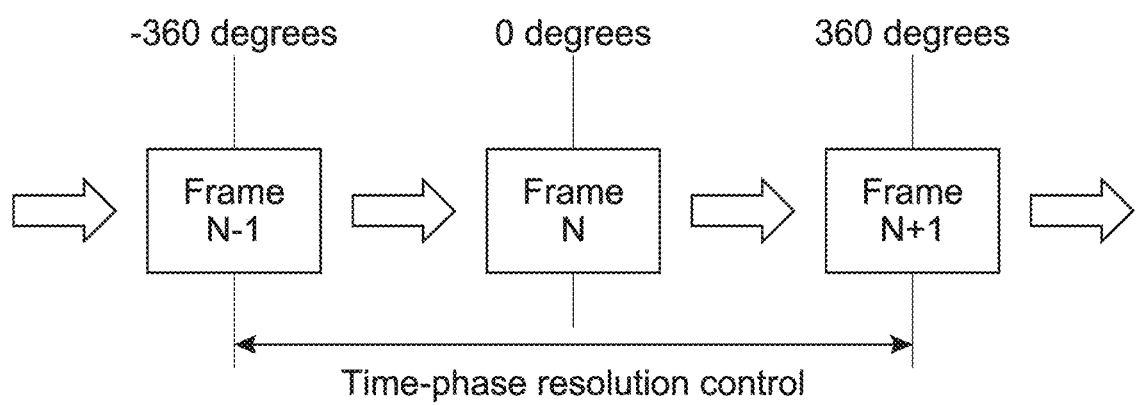
[FIG. 4] A diagram showing a general state in which successive five frames are set as inputs, an imaging time of a third frame that is a center frame is defined as a phase of 0 degrees, a second frame is defined as a phase of −360 degrees, and a fourth frame is defined as a phase of 360 degrees.

Note that, in this embodiment, the successive five frames are used as inputs, an imaging time of a third frame that is a center frame is defined as the phase of 0 degrees, an imaging time of a second frame is defined as the phase of −360 degrees, and an imaging time of a fourth frame is defined as the phase of 360 degrees. FIG. 4 is a diagram showing a general state in which the successive five frames are used as inputs, the imaging time of the third frame that is the center frame is defined as the phase of 0 degrees, the imaging time of the second frame is defined as the phase of −360 degrees, and the imaging time of the fourth frame is defined as the phase of 360 degrees.

Conventionally, a method of independently controlling both of the time-phase resolution and the dynamic resolution has not existed. Parameters of the time-phase resolution and the dynamic resolution tend to interfere with each other. Therefore, it has been very difficult to generate a high-framerate image or a deblur image by controlling both not to interfere with each other.

In a case where the independent control is impossible, for example, when a high-framerate image is generated by developing a plurality of frames at an arbitrary time phase, the dynamic resolution also varies.

Therefore, the high-framerate image exhibits significantly low quality when continuously observing the developed frames.

Further, also in the case where the independent control is impossible, when the dynamic resolution is controlled, an image including an unstable artifact with the time phase deviated from the imaging time is provided, which has been problematic.

In this embodiment, the image developed through the digital filter generated by mechanical learning is reverse-engineered.

Therefore, we have succeeded in extracting orthogonal components with which the time-phase resolution and the dynamic resolution can be independently controlled, performing conversion into the extended wavelet transformed image, and independently controlling each of the components.

[Basic Configuration of DNN Block]

In the DNN, as generally known, learning is performed at a step of performing unsupervised learning, i.e., PreTraining learning such that the input is equal to the output and then at a step of supervised learning, i.e., FineTune learning.

The mechanical learning module 10 of this embodiment includes DNN blocks 11$p$ that constitute a PreTraining layer PT and DNN blocks 11$f$ that constitute a FineTune layer FT.

In the mechanical learning module 10, components decomposed in middle layers of the DNN blocks 11$p$ that constitute the PreTraining layer PT are input as supervisory signals for the DNN blocks 11$f$ that constitute the FineTune layer FT. Then, supervised learning at the DNN blocks 11$f$ that constitute the FineTune layer FT is performed. A desired algorithm is thus obtained.

As a learning method in the FineTune learning, there are exemplified methods using an AutoEncoder, a convolutional neural network (CNN), and pooling.

Note that, in a general DNN, CNNs are propagated as the learning method as used in the field of image recognition, which have produced excellent results.

However, in this embodiment, image operations required in the field of computer vision, i.e., "image recognition", "image processing", and "image analysis" are targeted.

Therefore, the AutoEncoder is considered as important as the learning method in view of the computation-amount reduction effect especially in the fields of the image processing and the image analysis. Thus, the AutoEncoder is employed.

Note that, in this embodiment, the "image recognition" refers to an application to recognize an imaged object as an object, and to an application to recognize a scene of motion or the like of the imaged object.

The "image processing" refers to processing on a range of image data using the digital filter, such as white balance processing, gamma processing, and noise reduction processing.

The "image analysis" refers to depth analysis, region division, boundary analysis, optical flow analysis, and the like.

[Difference Between Image Analysis and Image Recognition]

In the computer vision, there is, for example, a case where autofocus control is performed by analyzing a depth of an imaged object in depth direction, for example.

However, in that case, an abstraction degree of an object at a level that can show what the imaged object specifically is, for example, whether it is a cat or a dog (abstraction degree that allows the CNN to recognize it) is not necessarily required.

Due to such application differences, the components required for the mechanical learning module 10 greatly differ. Therefore, in this embodiment, an image operation associated with such structure analysis is defined as the "image analysis" different from the "image recognition".

In the "image recognition", the CNN is mainstream. However, in this method, the size of a patch that can be analyzed is limitative, and it is difficult to apply it to a large image, for example, the angle of view in the Hi-Vision.

Note that, in general, in the CNN, an input image is processed in units of pixels of 64×64, for example. This is a method found in a MPEG-based technology of Fourier transform-based image compression.

In a case of an angle of view of 1920×1080, a massive amount of computation is required. Therefore, it is decomposed into blocks of approximately 8×8 and subjected to discrete cosine transform (DCT). Such a block is called "patch".

On the other hand, regarding the "image analysis", although it may have an image recognition ability lower than that of the "image recognition", it is required to have an ability of analyzing the structure of an image over a wider range.

In the "image processing", it is unnecessary to recognize the image structure, and it is possible to enhance the precision of the image processing algorithm by performing frequency component analysis.

[Types of Headers of PreTraining Layer]

In the mechanical learning module 10 of this embodiment, the PreTraining layer PT is called header and the FineTune layer FT is called body.

Figure 5:
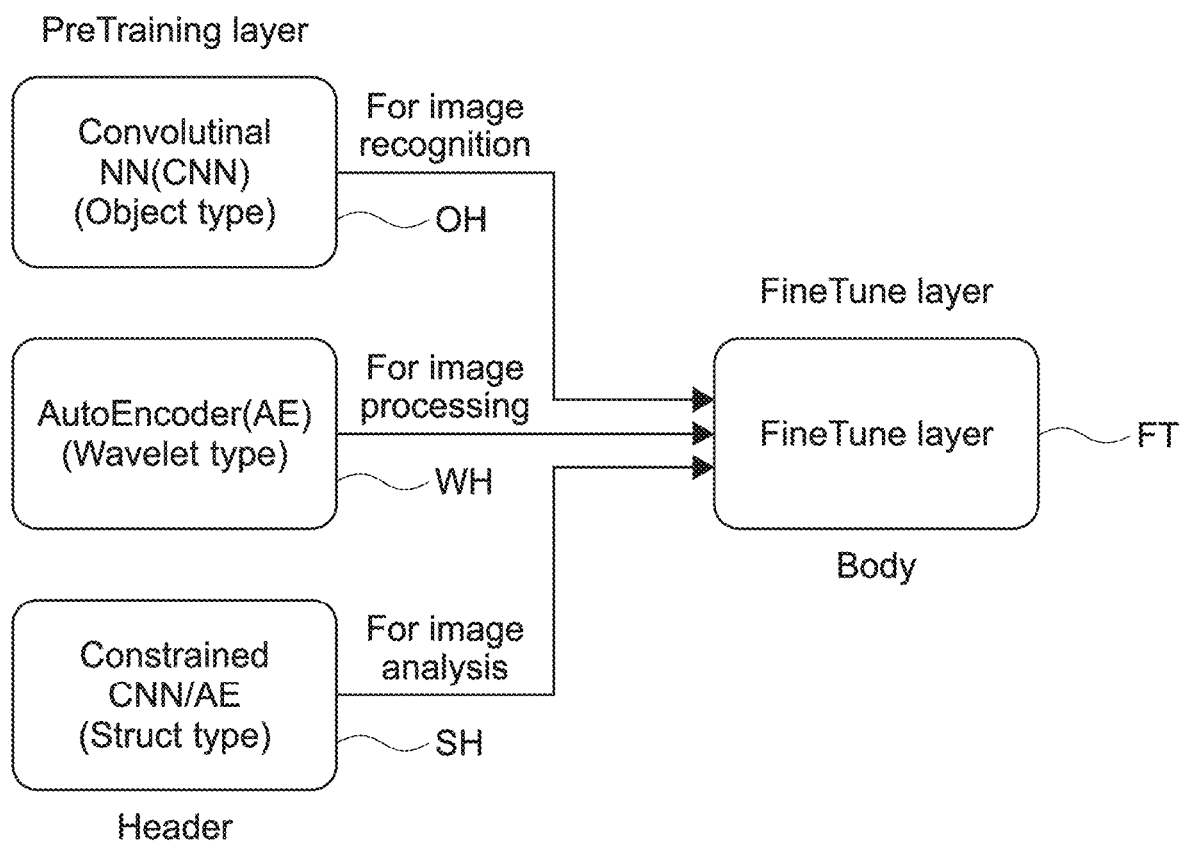
[FIG. 5] A diagram showing the types of headers that can be set as a PreTraining layer PT in the mechanical learning module 10.

FIG. 5 is a diagram showing the types of headers that can be set as the PreTraining layer PT in the mechanical learning module 10.

As shown in the figure, in this embodiment, an object type header OH, a wavelet type header WH, and a struct type header SH are prepared as the headers that can be set as the PreTraining layer PT, corresponding to the three kinds of image operations of the "image recognition", the "image processing", and the "image analysis".

The object type header OH is a header optimal for image recognition hierarchized using the CNN. The wavelet type header WH is a header optimal for image processing of decomposing into frequency level layers by using the AutoEncoder. The struct type header SH uses both the constrained AutoEncoder and the CNN and is a header optimal for image structure analysis. Details of each header will be described later.

The object type header OH, the wavelet type header WH, or the struct type header SH is selected in accordance with an algorithm of image operation which is a developer's target.

The three types of headers are required to be compatible with the FineTune layer (body) FT continuous with the post-stage. Further, regarding these three types of headers, a plurality of headers may be employed at the same time in a manner that depends on purposes to synthesize an algorithm.

[Wavelet Type Header]

Figure 6:
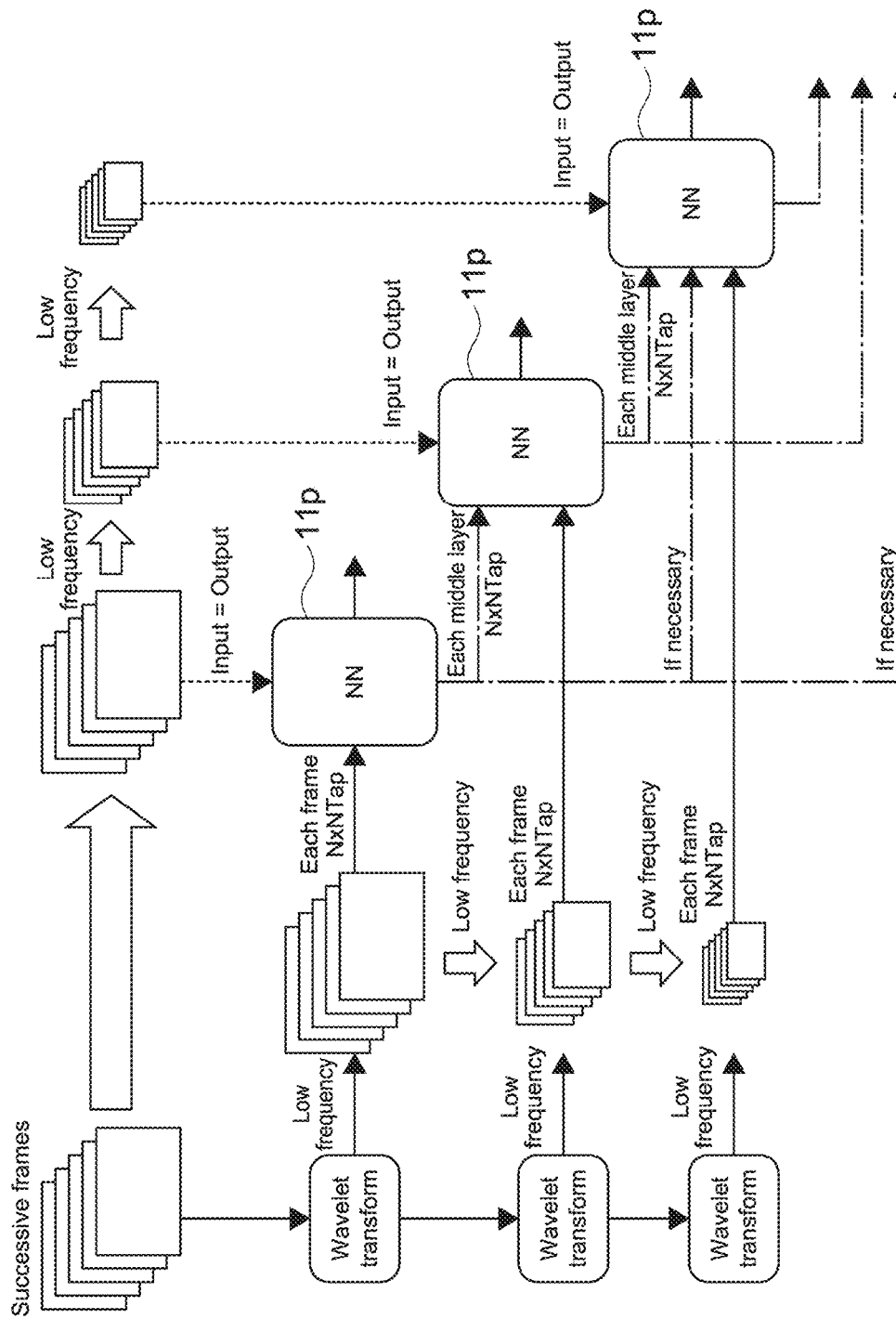
[FIG. 6] A block diagram of a wavelet type header WH.

The wavelet type header WH is aimed at image processing and is a header for constructing the PreTraining layer PT. FIG. 6 is a block diagram of the wavelet type header WH.

As shown in the figure, images of successive five frames are provided as inputs, and the number of taps in the middle layer in the PreTraining layer PT is suitably constrained. Note that the number of taps set forth herein refers to an input range.

With the constraint of the number of taps, components are extracted as features in the middle layer due to an dimensional compression effect by the AutoEncoder, and components with time and space information mixed are extracted.

Each frame that is the input is convoluted every predetermined N×N taps (N is the number of taps), and the AutoEncoder is executed such that 1 tap at the center can be obtained. Frequency components are considered regarding the input and the supervisory signal provided to each layer.

A still, imaged object is extracted as a high-frequency component at the pre-stage. The motion of the imaged object, which is a large motion over a wide range, is extracted by the AutoEncoder that extracts a low-frequency component.

Note that a low-frequency image that is input into each layer is generated by extracting an LL component in a wavelet transform section 11w inside a mechanical learning module 11.

By the way, in order to synthesize the image processing algorithm, a necessary requirement is that the component extracted in this manner has all decomposed elements that can recover the same input image again.

If this necessary requirement is not satisfied, it is difficult to achieve high-precision image processing in the DNN blocks 11p and the DNN blocks 11f at the post-stage.

When the input image is dimensionally compressed in the DNN blocks 11p at the first stage, the processed image is already deteriorated with respect to the input image.

Therefore, in order to recover the original image by gradually extracting low-frequency components associated with the large motion from this DNN block 11p, a plurality of DNN blocks 11p are hierarchically provided at the post-stage, to thereby provide multiple level layers.

In processing at the second stage and the following stages, if a differential image between the image decoded at the pre-stage and the supervisory signal is obtained, a more sparse component can be extracted in the middle layer, and the algorithm synthesis precision can be enhanced.

By extracting time and space information stepwisely from the high frequency to the low frequency in the multiple level layers, a decomposed image that can be recovered to the original image can be obtained.

In the above-mentioned procedure, a frequency decomposed image with a time and a space mixed from the high frequency to the low frequency is generated from the input image.

The component of the thus generated frequency decomposed image contributes to the algorithm synthesis in the FineTune layer FT at the post-stage.

In particular, in a case of synthesizing an algorithm of time control, it is necessary to cope with situations where the motion of the imaged object varies from a small motion to a large motion. By separating the frequency components by using the above-mentioned method, an algorithm that can control the time-phase resolution and the dynamic resolution can be synthesized in the FineTune layer FT with high quality.

[Object Type Header]

Figure 7:
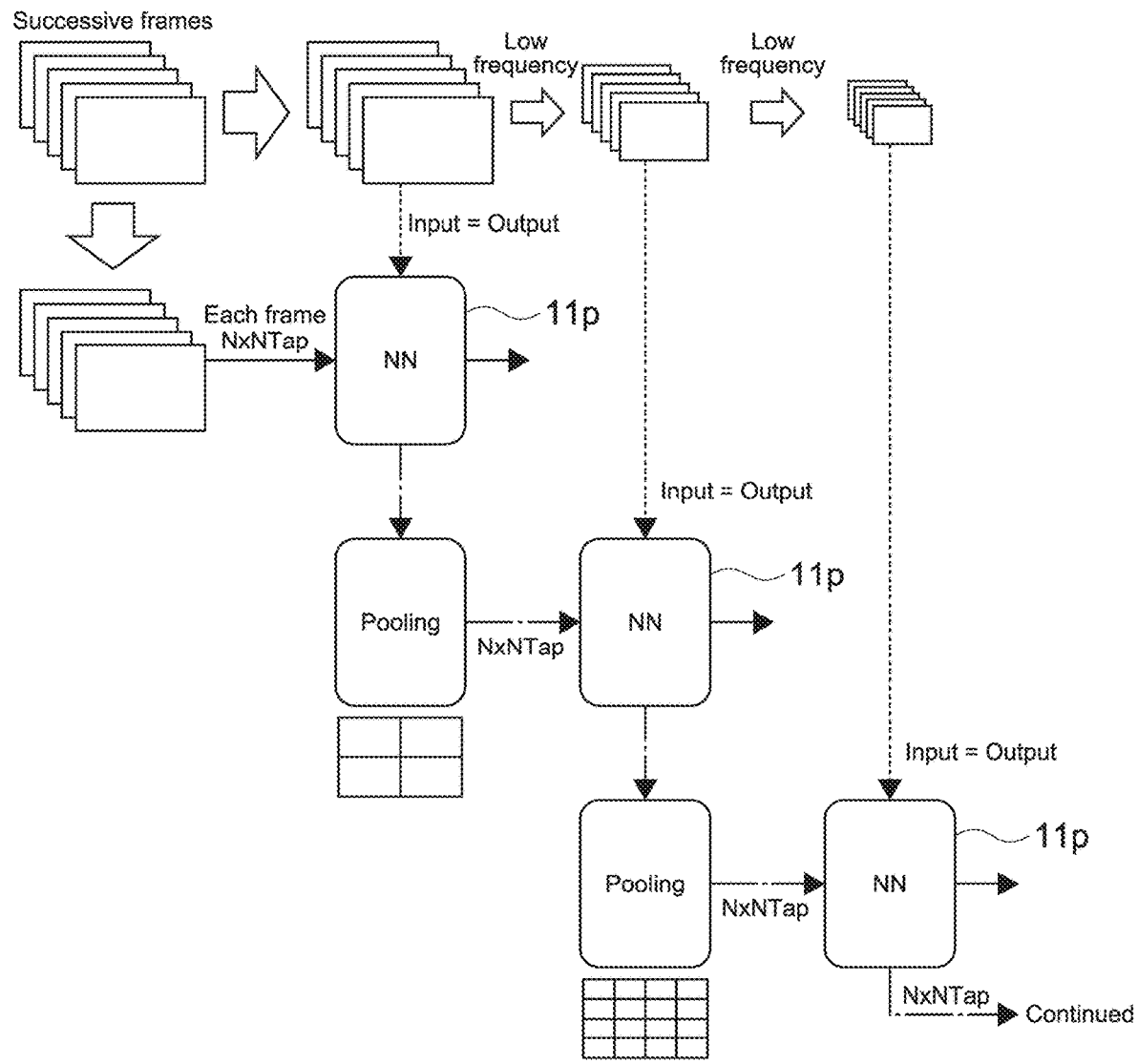
[FIG. 7] A block diagram of an object type header OH.

The object type header OH is a header for constructing the PreTraining layer PT mainly assuming the image recognition. FIG. 7 is a block diagram of the object type header OH.

The object type header OH performs convolution and pooling on the input image and decomposes the input image into an object tree structure. It is a most general method of the DNNs.

It should be noted that image processing at the object type header OH is assumed for the convolution unlike the typical CNN, and the pooling is considered with a concept of the frequency.

The first stage is the same as the configuration of the wavelet type header WH. At the second stage and the following stages, middle-layer data is averaged by pooling and downconverted into ¼ of the angle of view, each component is further convoluted, and decomposed images are generated at all times.

In order to provide consistency of the amount of data of the decomposed image among the respective stages, the output from the middle layer is increased from the first stage, as 4 taps, 16 taps, 64 taps, and 256 taps in the stated order, each of which is the quadruple of the previous one.

As the frequency becomes lower, the number of taps increases and the abstraction degree of the image recognition is enhanced. An inverse proportion configuration in which the resolution becomes lower as the abstraction degree increases is employed.

In this technique, the image is recognized as an object tree by hierarchically performing convolution, and an effect of enhancing the image recognition ability has been reported in various documents.

However, it is necessary to cope with the case where the imaged object moves in the wide range in the control in the time direction, which is the problem in this application.

Thus, it is difficult to perform pattern learning focusing on a limited patch region as in the conventional CNN.

In the present technology, it is necessary to ensure compatibility among the three types of headers and perform adequate image processing in all the headers.

In view of this, in order to reduce the amount of computation associated with the image processing in the object type header OH and provide consistency between the pooling and the frequency decomposition, the amount of computation is reduced by performing ¼ downconversion in each convolution, and the consistency with the wavelet transform is provided.

Regarding the supervisory signal to each DNN block 11p, the low-frequency component is generated by repeating the wavelet transform for each level layer, and is provided to each DNN block 11p as the supervisory signal.

Resources to be used for computation are limitative, which is a real problem in a case of using the object type header OH. Therefore, the number of level layers that constitute the PreTraining layer PT must be approximately 4 to 6 at most.

Therefore, although the image recognition ability is inferior in comparison with the general CNN, an effective recognition ability is provided regarding time control which is the target in this embodiment. It is also important that the consistency with other headers is provided.

[Struct Type Header]

As described above, in the wavelet type header WH, the frequency decomposed image is generated like the wavelet transform in which division into frequency components is performed. Further, in the object type header OH, the abstraction degree of the image recognition is analyzed, the object tree-like hierarchical structure is generated, and the image is recognized at a high abstraction degree.

However, in the technology of the computer vision in recent years, there are a variety of applications such as depth analysis and profile analysis of an image. In those applications, the object cannot be accomplished with the wavelet type header WH that analyzes the frequency components. On the other hand, with the object type header OH, the recognition ability is too redundant, and the overhead of computation is also large.

In order to perform the depth analysis, the profile analysis, the region analysis, and the like of an input image, the recognition ability with respect to the structure of the imaged object is required. It is the struct type header SH that extracts effective components in these analyses.

A learning technique using both the CNN and the AutoEncoder is employed in the struct type header SH. In addition, in the struct type header SH, an attempt is made to extract components suitable for image analysis by adding a constraint in learning in advance.

[Constrained Learning Method]

Learning in the wavelet type header WH and learning in the object type header OH are both unsupervised machine learning where input=output.

In contrast, in learning in the struct type header SH, mechanical learning is performed while constantly providing a learning constraint with respect to a particular parameter by deforming the shape of the input and performing learning, and the recognition ability with respect to that constraint is enhanced by applying convolution.

(Pre-Processing)

Figure 8:
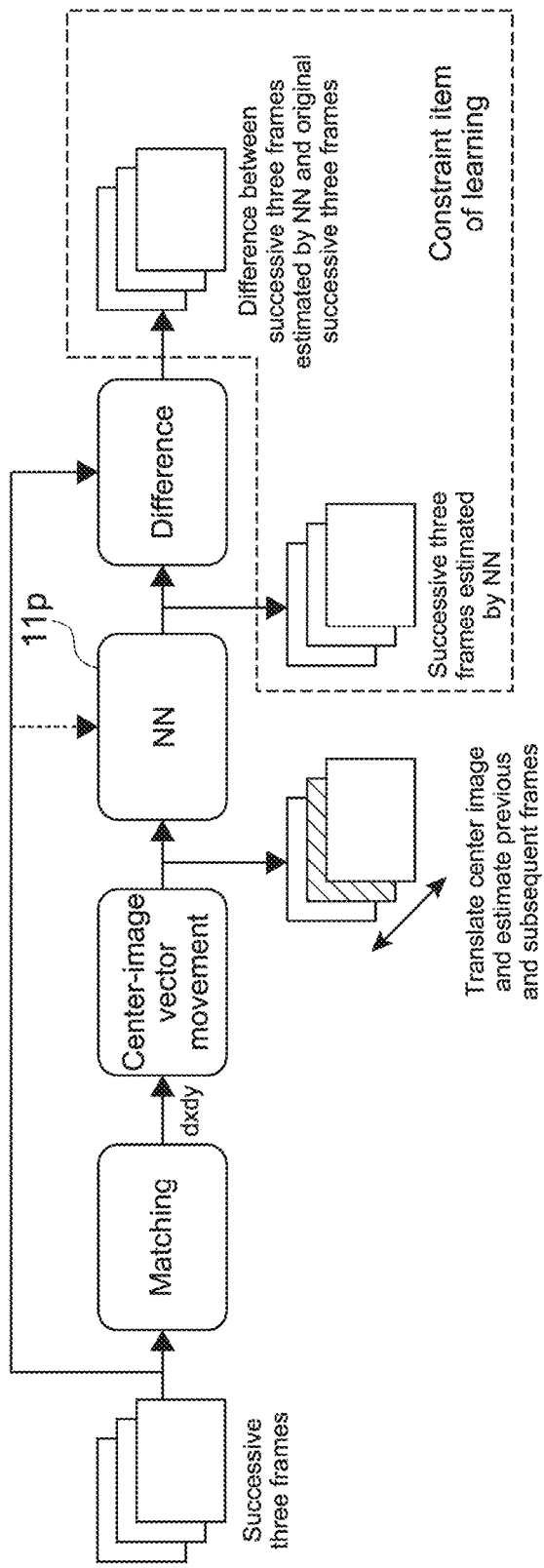
[FIG. 8] A diagram showing preprocessing for obtaining a supervisory image that becomes a constraint item of learning in order to construct a struct type header SH.

In order to construct the struct type header SH, it is necessary to obtain a supervisory image that becomes a constraint item of the learning. Pre-processing for obtaining the supervisory image will be described. FIG. 8 is a diagram showing the preprocessing for obtaining the supervisory image that becomes the constraint item of the learning in order to construct the struct type header SH.

As shown in the figure, in the preprocessing, motion vectors of the successive three frames (original three frames) are analyzed in advance, and the center image is converted into coordinates. In this manner, the previous and subsequent frames are generated as quasi-frames.

Next, from this center image and the quasi-frames, the three frames output after the learning (three frames after learning) is obtained by performing learning aimed at outputting the original three frames at the DNN block 11p.

These three frames after learning have differences from the original three frames. Therefore, a total of six components can be obtained by determining the differences between the three frames after learning and the original three frames. These six components has necessary and sufficient information with which reconstruction into the original three frames is possible.

(Configuration of Struct Type Header)

Figure 9:
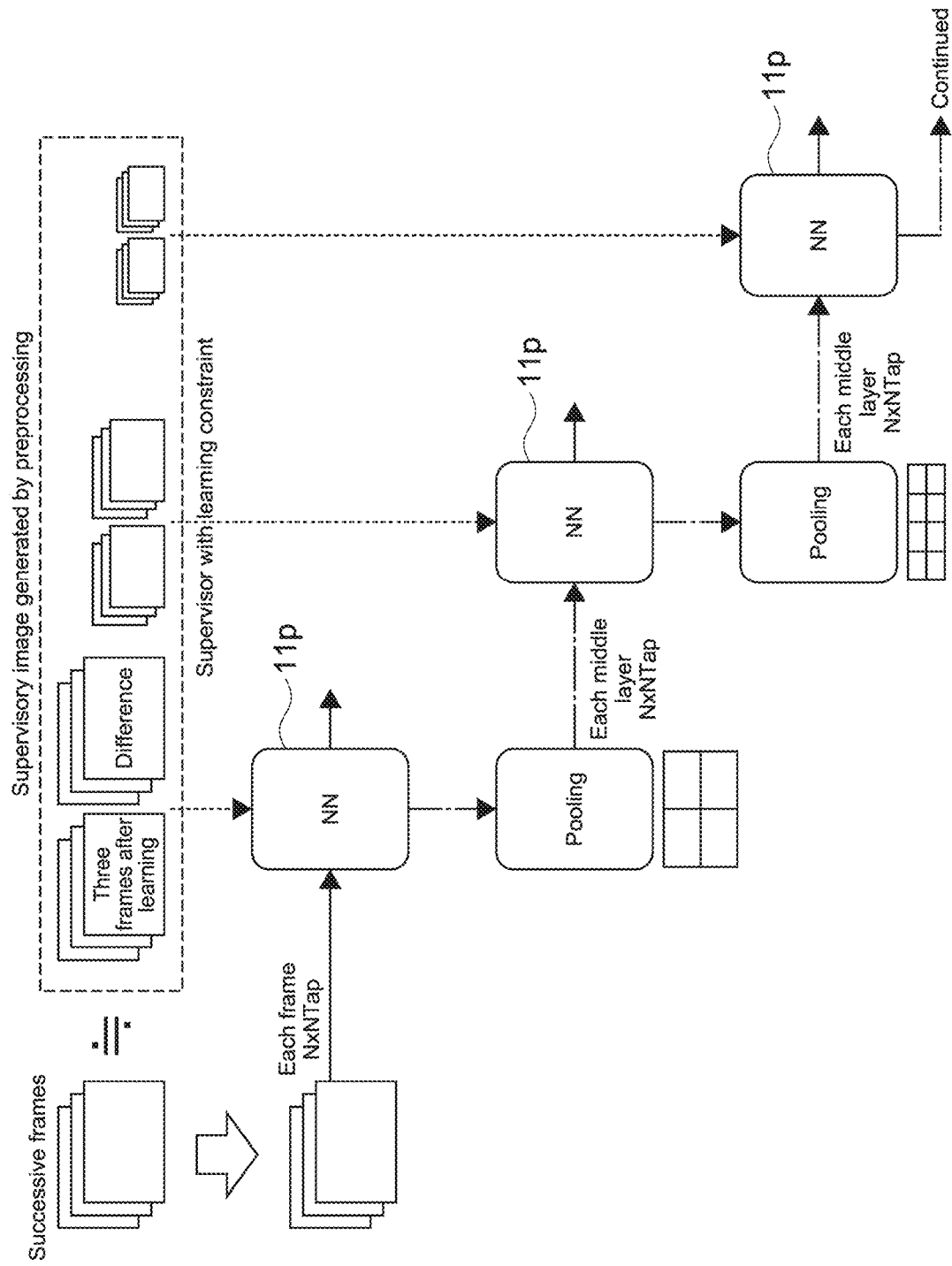
[FIG. 9] A block diagram showing a configuration of the struct type header.

A configuration of the struct type header will be described. FIG. 9 is a block diagram showing the configuration of the struct type header.

The three frames after learning estimated by the DNN blocks 11p in the preprocessing involves a vector and region information for which the intersection and deformation of the imaged object are not considered.

On the other hand, the difference involves information regarding the intersection, deformation, and occlusion of the imaged object.

In the AutoEncoder using the three frames after learning and the difference as the supervisory signal, information regarding the image structure is extracted as features in the middle layer.

Further, in the struct type header SH, the abstraction degree of the recognition is enhanced by hierarchization also using the CNN.

In the struct type header SH, component extraction of struct type on which the feature extraction mainly regarding the image structure has been performed is realized.

As shown in the figure, mechanical learning for synthesizing an algorithm that develops the above-mentioned six components obtained from the original three frames is performed.

The learning ensuring that the output can be obtained from the input is basically learning corresponding to the unsupervised machine learning. In this learning, convolution is performed while performing learning to determine a given constraint item.

Therefore, the dimensional compression and convolution are performed while considering a depth, a boundary plane, a region, a motion vector of the region, and occlusion of the image.

Therefore, the recognition ability with respect to the structure of the image is enhanced, and structure recognition required for the image analysis becomes possible.

In the struct type header SH, convolution is not applied many times in comparison with the object type header OH, and hence the ability of recognizing the object is inferior. The amount of computation of the image analysis performed in a wide range can be reduced to a practical level.

[Comparison of Amount of Computation of Each Header]

Figure 10A:
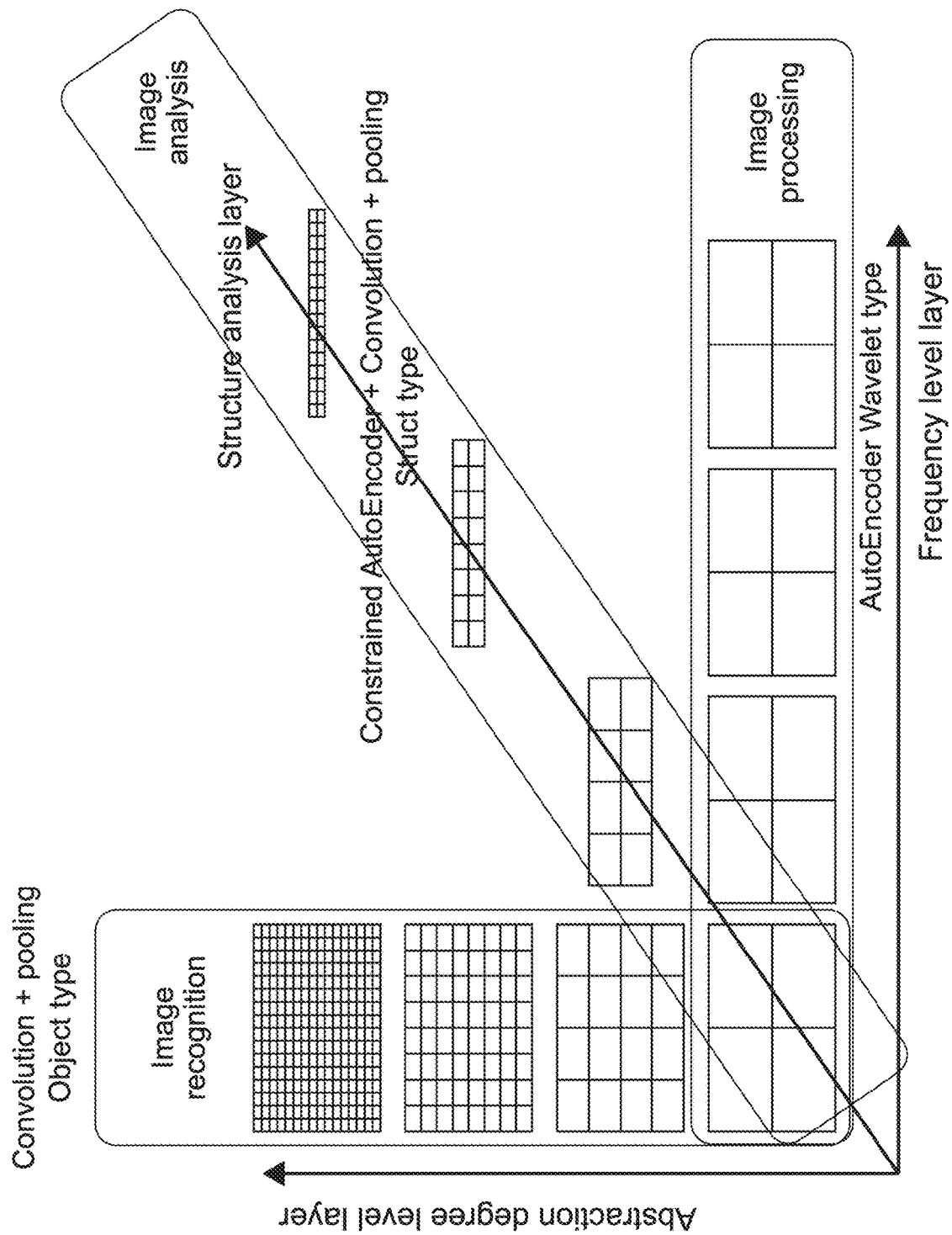
[FIG. 10A] A diagram showing relationships between an abstraction degree, a frequency, and an amount of computation of the three headers.

Next, relationships between the frequency, the abstraction degree, and the amount of computation in the wavelet type header WH, the object type header OH, and the struct type header SH, which are defined in the PreTraining layer PT, and various applications will be shown. FIG. 10A is a diagram showing relationships between the abstraction degree, the frequency, and the amount of computation of the three headers.

In the wavelet type header WH, the input image is decomposed into components in a frequency direction by using the AutoEncoder. It is utilized mainly for the synthesis of the image processing algorithm.

The amount of computation is a scale of O (N). The wavelet type header WH is capable of computation at a relatively high speed. Therefore, the wavelet type header WH is capable of synthesizing an algorithm that can perform wide-range image processing on a normal angle of view of HD.

The image recognition ability of the wavelet type header WH is inferior to that of other headers. The abstraction degree of the data is just an abstraction degree of an edge level handled in the wavelet transform.

In the object type header OH, the input image is decomposed into components in an abstraction degree direction by using the CNN. The object type header OH is utilized mainly for obtaining a super-resolution effect of the image recognition and the image processing.

The amount of computation is a scale of O (N*N), the computation is significantly heavy, and the input data size is limitative.

In the object type header OH, the abstraction degree of the image is increased in the order of an edge, a part, an object, and a scene, and the image information is decomposed into an object tree.

In the struct type header SH, component decomposition is performed both in the frequency direction and in the abstraction degree direction by using the constrained AutoEncoder and the CNN. The struct type header SH is utilized mainly for the analysis of the image structure.

The amount of computation is approximately O (N*log N). In the struct type header SH, the input image is gradually hierarchized in the both directions of the frequency and the abstraction degree from the abstraction degree of the edge.

Figure 10B:
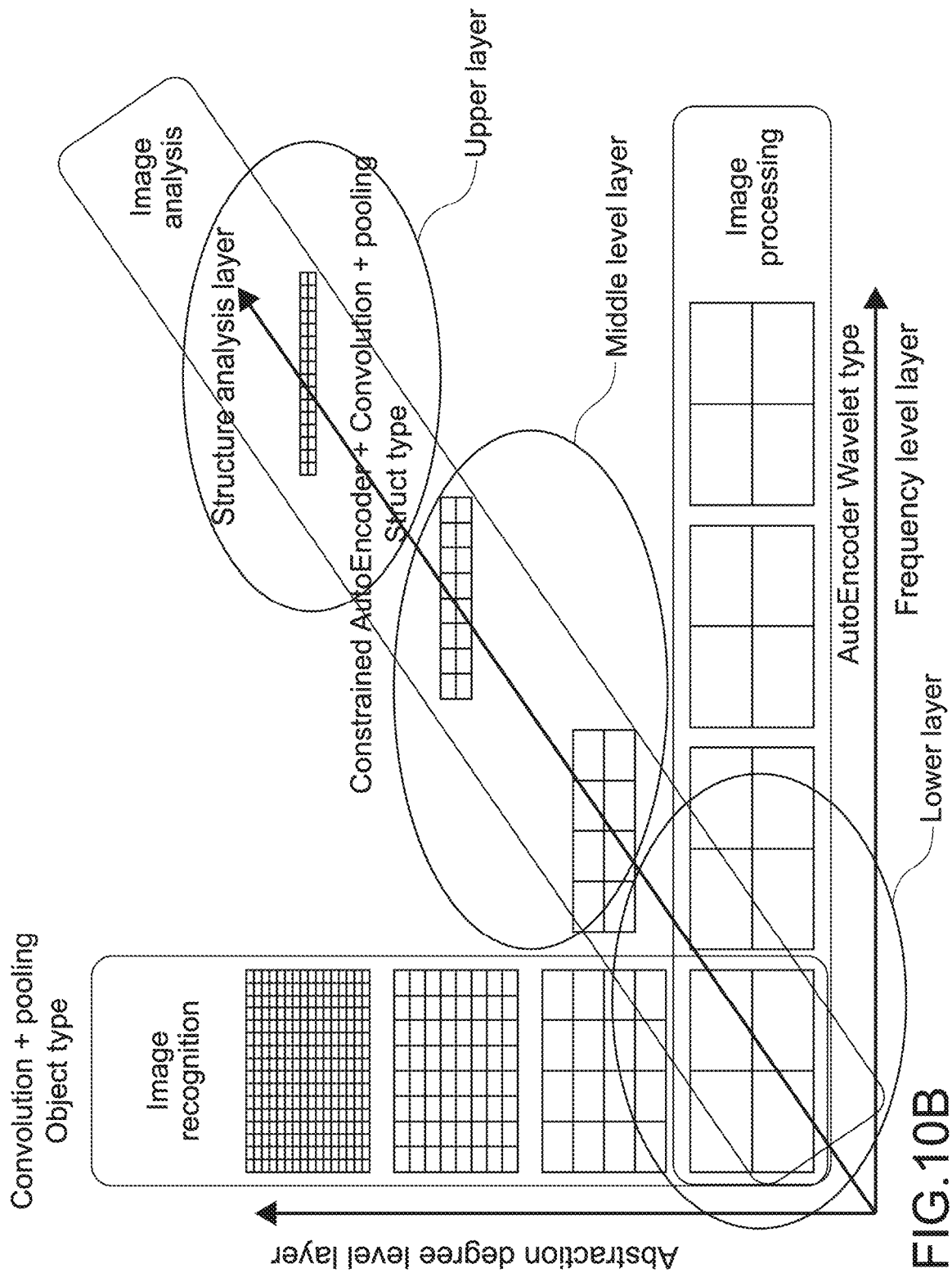
[FIG. 10B] A diagram showing separation of a lower layer, a middle level layer, and an upper layer in order from a lower left position along an axis of a structure analysis layer in the struct type header.

Note that FIG. 10B is a diagram showing separation of a lower layer, a middle level layer, and an upper layer in order from the lower left position along an axis of a structure analysis layer in the struct type header. In the middle level layer of the struct type header SH, components that become a motion vector, region information, and boundary information are extracted. In the upper layer, components of an optical flow, intersection collision deformation, depth information, and the like are extracted.

[Synthesis Flow of Algorithm]

Figure 11:
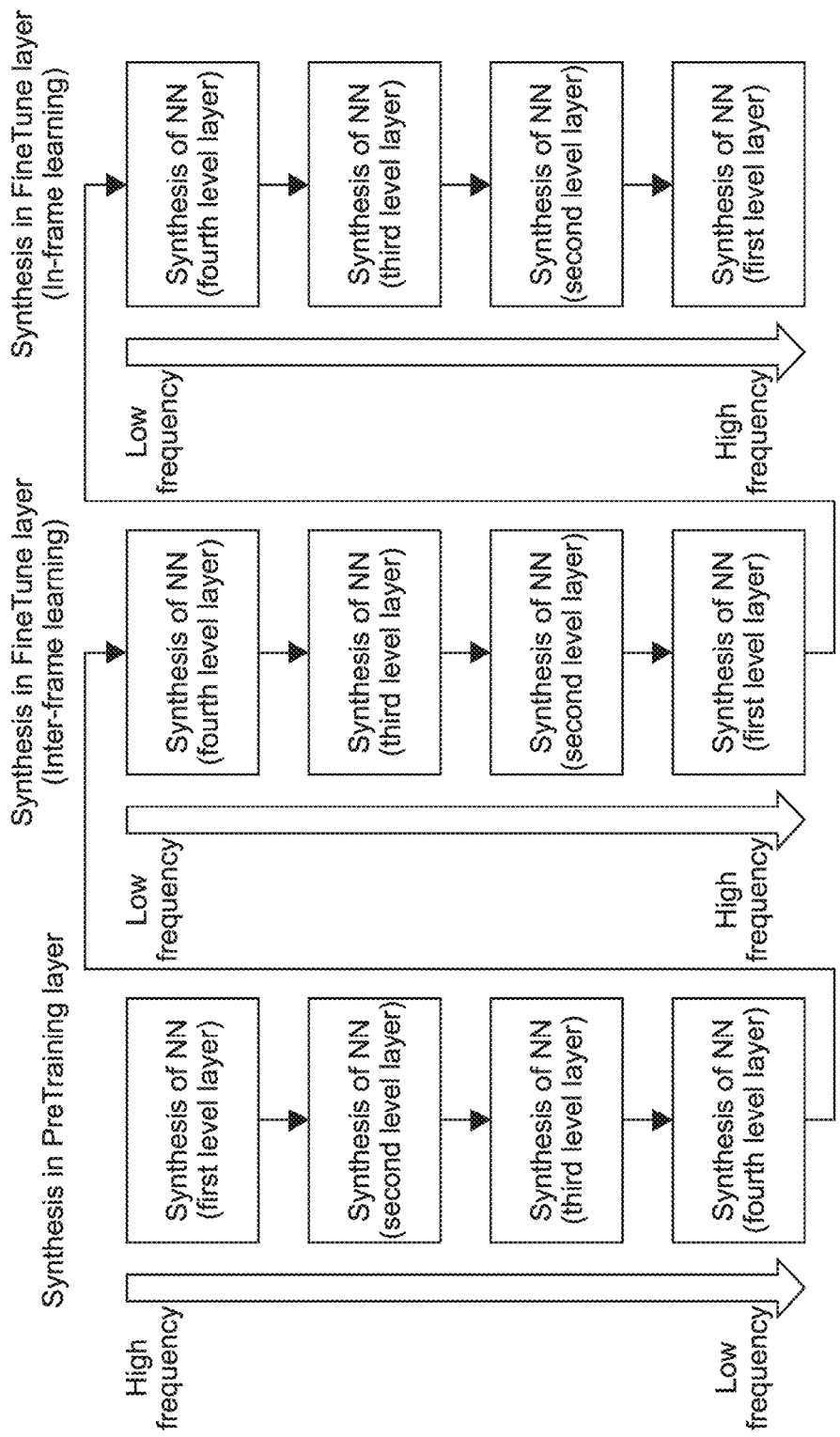
[FIG. 11] A diagram showing a flow of synthesizing an algorithm.

Next, a synthesis flow of the algorithm will be described. FIG. 11 is a diagram showing a flow of synthesizing an algorithm.

As the flow of the algorithm synthesis, the PreTraining is first performed by the unsupervised machine learning as in the general DNN. After that, the FineTune is performed by the supervised learning, and the algorithm synthesis is completed.

In the mechanical learning module 11 of this embodiment, as will be described later, a measure for increasing the precision of the algorithm synthesis is achieved by employing two steps of inter-frame learning and in-frame learning when synthesizing the algorithm in the FineTune layer FT.

Also in the FineTune layer FT, a configuration hierarchized in order from the low-frequency component to the high-frequency component for each frequency component is employed.

A structure in which the output from each middle layer of each DNN block 11f in the FineTune layer FT is convoluted by a convolution unit 11c continuous to the post-stage is employed.

A configuration in which the FineTune layer FT also functions as the PreTraining layer PT is employed.

[Order of Component Decomposition and Reconstruction]

Upon component decomposition in the PreTraining layer PT, the DNN blocks 11p are hierarchized from the high-frequency component to the low-frequency component.

On the other hand, in image reconstruction in the FineTune layer FT, decomposed components from the low-frequency component to the high-frequency component are reconstructed.

This is the same consideration as the general wavelet transform.

This order finally makes the quality in developing a high-framerate image different.

Figure 12:
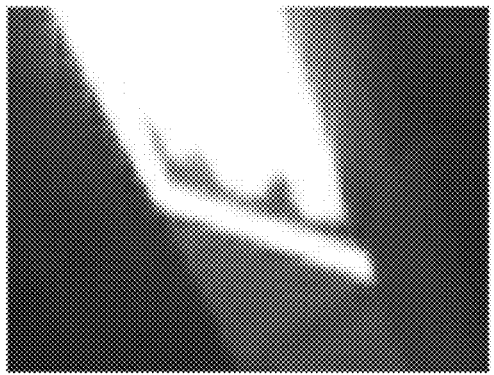
[FIG. 12] A diagram showing an example in which seamless connection has failed and an example in which seamless connection has succeeded.
Figure 12:
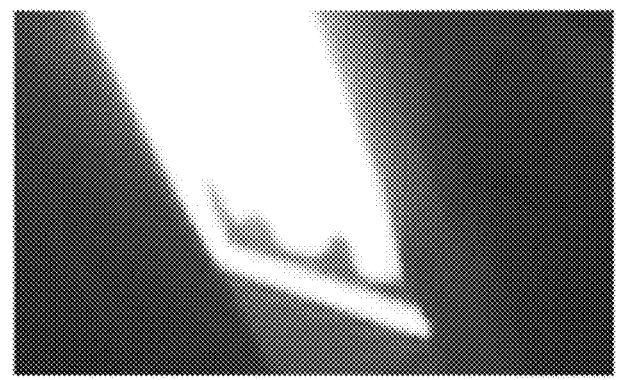

If the decomposition and the reconstruction of the image are not performed in order, a consistency cannot be provided at connection (seamless connection of the frequency components with the time and space mixed, and block noise occurs in the profile of a moving portion. FIG. 12 is a diagram showing an example in which the seamless connection has failed and an example in which the seamless connection has succeeded.

Regarding the interpolation precision of the moving portion, a fixed rule can be found in the hierarchization of the frequency components.

The above-mentioned decomposition and reconstruction have the same regularity as the wavelet transform. It is necessary to perform decomposition in order from the high frequency to the low frequency for wavelet transform, and to perform reconstruction in order from the low frequency to the high frequency for wavelet inverse transform.

If the processing is not performed in this order, block noise occurs in interpolation at a portion associated with a large motion.

[Inter-Frame Learning in FineTune Layer]

Figure 13:
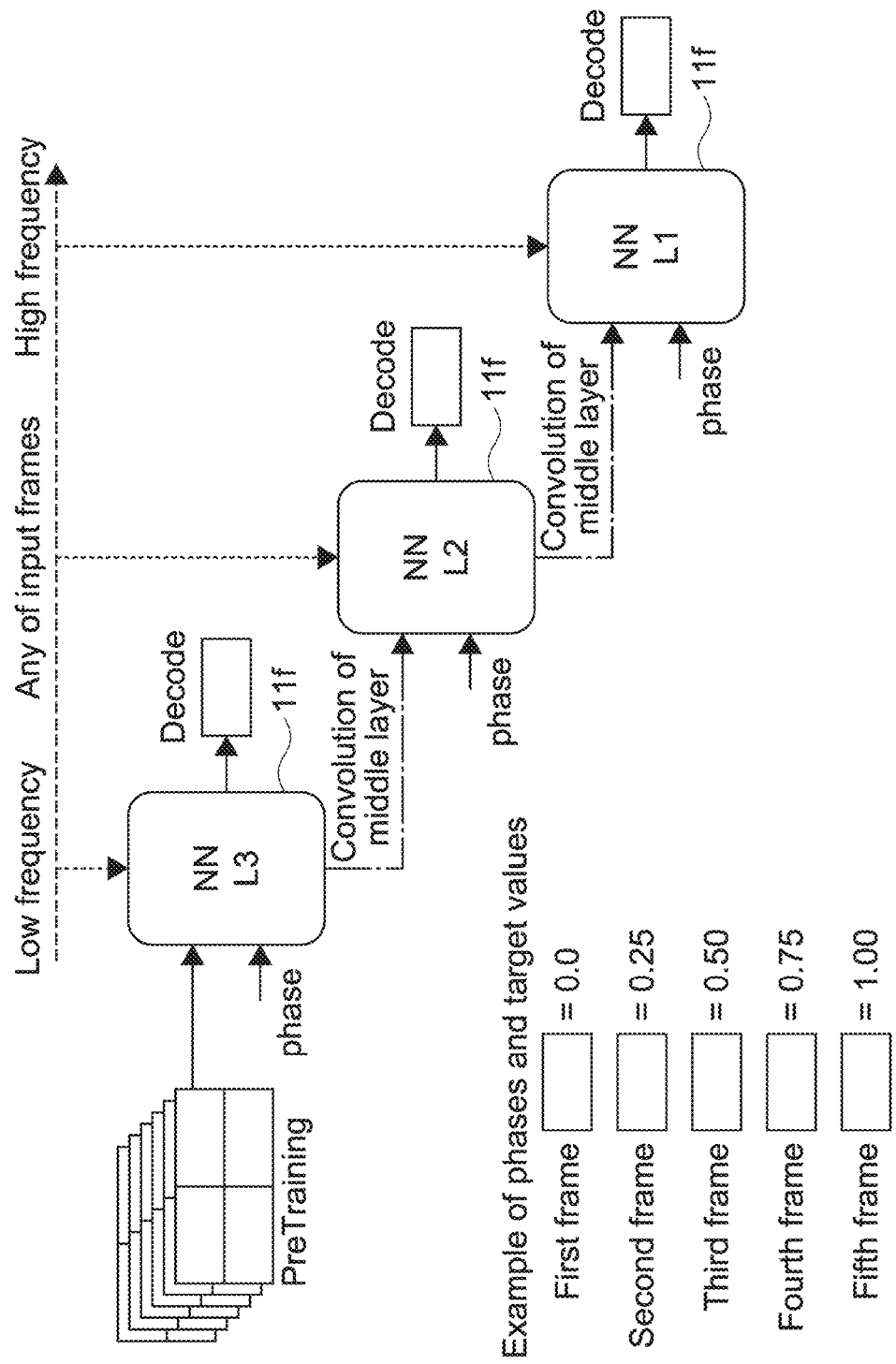
[FIG. 13] A diagram showing a state of inter-frame learning in a FineTune layer FT.

Next, the inter-frame learning in the FineTune layer FT will be described. FIG. 13 is a diagram showing a state of the inter-frame learning in the FineTune layer FT.

In the above-mentioned PreTraining layer PT, the learning to output all of the successive five frames is performed. Meanwhile, in the FineTune layer FT, a phase control item (designation of time phase) is provided, and learning to output any of the five frames in accordance with a phase signal is performed.

Successive three frames are input in a case of the struct type header SH. Therefore, the learning is performed with three control values.

That is, it is learning in which the phase control item becomes a selector and a particular frame is output.

Note that, in the FineTune layer FT, hierarchization is performed in order from the low-frequency component to the high-frequency component.

For example, an image at the periphery of the first frame where phase=0.0 or an image at the periphery of the third frame where phase=0.50 can be obtained.

Setting the phase=0.625, a frame between the third frame and the fourth frame can be obtained.

An interpolation image obtained here is an interpolation image that has completely different properties from a simple frame mix image, and is capable of freely controlling the time phase and the dynamic resolution according to a mechanism of multidimensional contrast correction of the above-mentioned multidimensional gradation.

By the inter-frame learning, a significantly robust result can be obtained in comparison with a time interpolation technology using conventional geometric transform, for example, intersection and deformation of the imaged object.

On the other hand, in a scene for which a solution cannot be obtained at an intermittent zone of imaging due to a shutter, a result equivalent to that of the frame mix can be derived and a significantly robust result that does not provide a failure image can be obtained.

In the FineTune layer FT, the phase control item is provided. Then, mechanical learning like switching processing to switch an input frame in accordance with an analog value input as the phase is performed.

For example, in a case where the input frame is successive five frames, the frames that are targets (supervisors) are assigned as shown in the lower left portion of the figure by changing the phase in a range of 0.0 to 1.0.

The algorithm to be synthesized outputs substantially the same image as the input image at each of steps in which the phase is 0.0, 0.25, 0.5, 0.75, and 1.0.

Here, for example, when the phase control value is set to 0.125, a frame in a phase between the first frame and the second frame is generated.

By the inter-frame learning, it first becomes possible to roughly control the time phase.

[In-Frame Learning in FineTune Layer]

The high-framerate development by the control of the time-phase resolution is originally an inverse calculation problem, and is originally a problem where a solution cannot be uniquely determined. Therefore, an artifact necessarily occurs in the result of development.

Further, in the above-mentioned inter-frame learning, phases other than the phases between the input frames is not learned.

Therefore, if development is performed in the phase other than these learned phases, an unstable artifact basically occurs.

It is known that the filter characteristics of this artifact have different results in each algorithm synthesis, and the reproducibility is an important problem for the image processing algorithm generation apparatus 1.

Figure 14:
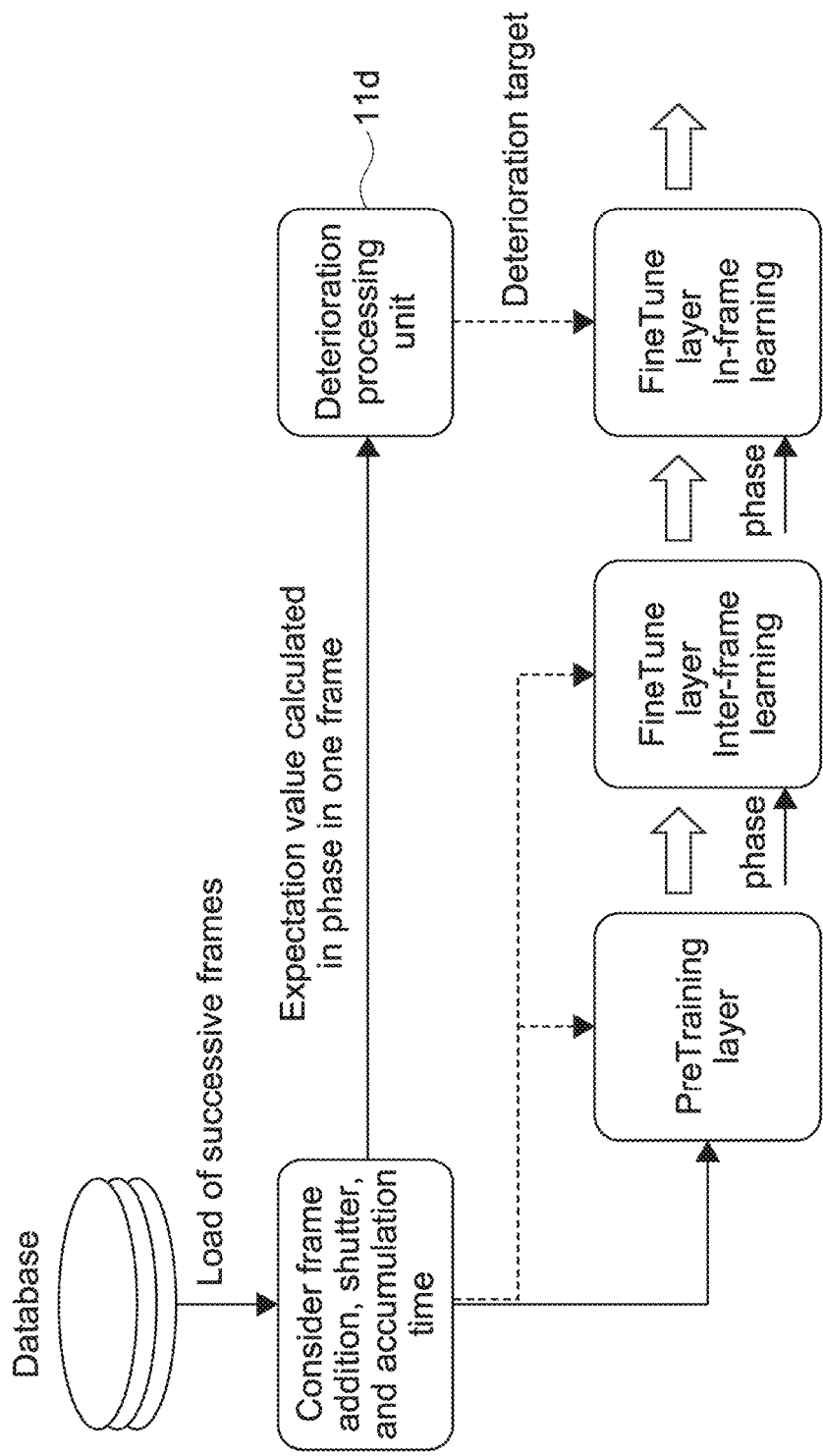
[FIG. 14] A diagram showing a state in which intensive in-frame learning is performed at a post-stage of the inter-frame learning.
Figure 15:
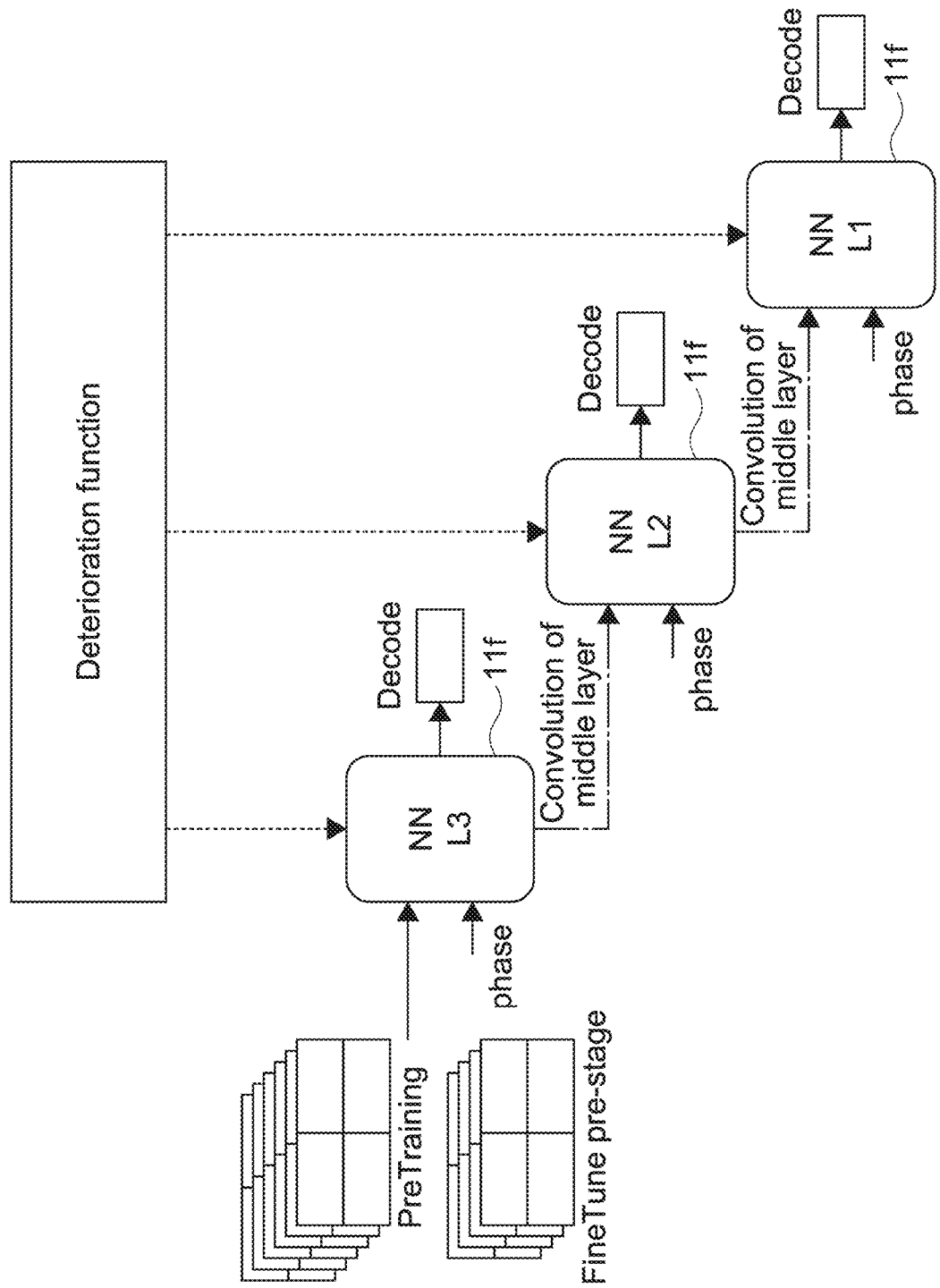
[FIG. 15] A diagram showing a state in which intensive in-frame learning is performed at the post-stage of the inter-frame learning.

In order to solve this problem, at the post-stage of the inter-frame learning, the DNN blocks 11$f$ that perform intensive in-frame learning in a phase of ±180 degrees within one frame, i.e., by using the third frame that is the center image of the successive five frames as the center are further provided. FIGS. 14 and 15 are diagrams showing a state in which the intensive in-frame learning is performed at the post-stage of the inter-frame learning.

An algorithm having a filter characteristic desired by a designer is synthesized by providing the DNN blocks 11$f$ with a supervisory image provided with a particular deterioration target and making the intensive in-frame learning progress.

[Trade-Off Control Based on Commutative Law of Information]

When the mechanical learning is made to progress with respect to the inverse calculation problem in the time direction, the gain is gradually lowered with respect to patterns for which solutions cannot be obtained due to equalization of those patterns, and deviation from a target value occurs.

Figure 16:
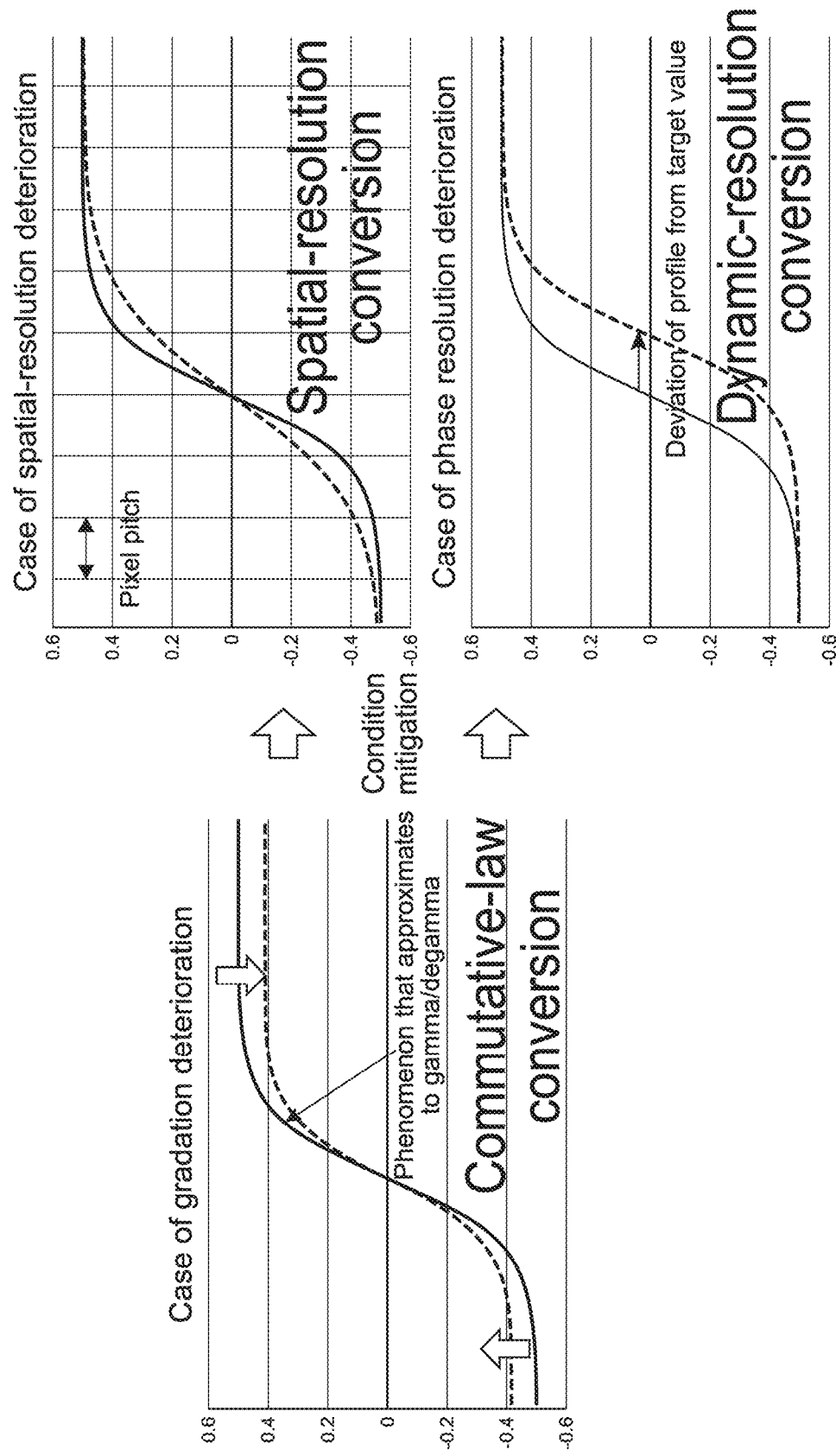
[FIG. 16] A diagram showing a state in which mechanical learning made to progress with respect to an inverse calculation problem in a time direction, a gain is gradually lowered due to equalization of patterns for which a solution cannot be obtained, and deviation from a target value occurs.

FIG. 16 is a diagram showing a state in which the mechanical learning is made to progress with respect to the inverse calculation problem in the time direction, the gain is gradually lowered due to the equalization of the patterns for which the solution cannot be obtained, and the deviation from the target value occurs.

First of all, as shown in the figure, if the gain of the entire low-frequency component is lowered with respect to the target value, gradation deterioration like gamma and degamma occurs in color characteristics of the image.

It is necessary to deteriorate the target value down to an adequate level in order to prevent this gradation deterioration. By lowering the target value of the spatial resolution or the dynamic resolution, the gradation deterioration can be overcome in some degree.

Although a deterioration method differs in each application, we will focus on control of the spatial resolution and the dynamic resolution in the time control that is the embodiment in this application.

In a case where a deterioration target value of the spatial resolution is provided, it can be considered that the spatial resolution is resolution-exchanged to the time-phase resolution.

In a case where the dynamic resolution is deteriorated, it can be considered that the dynamic resolution is resolution-exchanged to the time-phase resolution.

In the spatial-resolution conversion, resolution exchange of a moving image of 4K-60 P to 2K-240 P of ¼ of the angle of view, for example, is possible. This can be utilized for, for example, an application in which high-resolution images such as super Hi-Vision in the next generation is smoothly slowly reproduced in a television of the angle of view of the HD.

The dynamic-resolution conversion becomes trade-off with the SN ratio. It can be utilized for an application in which images are made clear by controlling the dynamic resolution.

Figure 17:
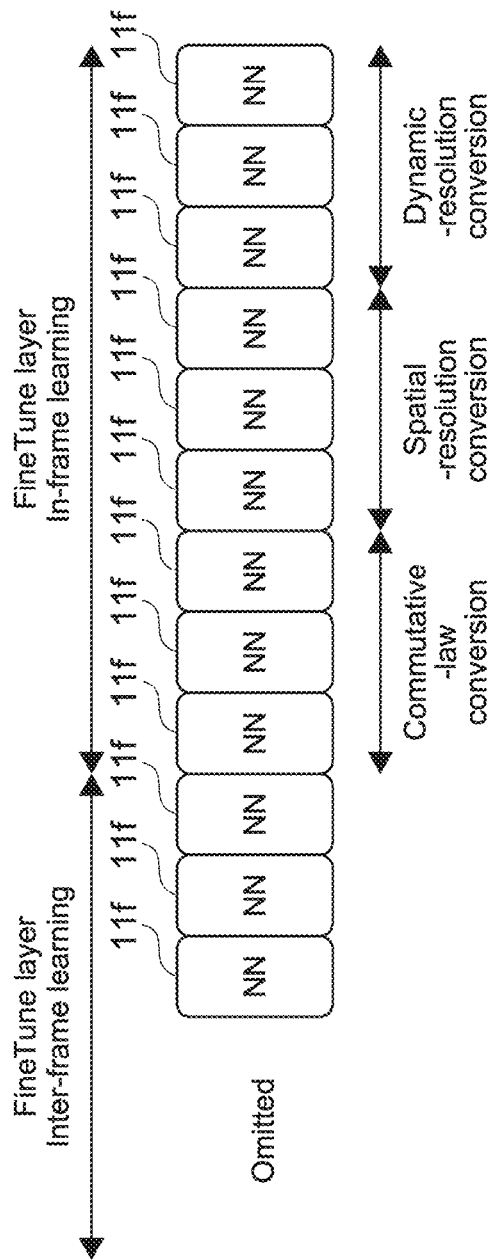
[FIG. 17] A diagram showing a state in which DNN blocks 11$f$ are connected in the order of commutative-law conversion, spatial-resolution conversion, and dynamic-resolution conversion.

In general, the degree of difficulty of the algorithm synthesis increases in the order of the commutative-law conversion, the spatial-resolution conversion, and the dynamic-resolution conversion. Therefore, in this embodiment, the DNN blocks 11$f$ are connected in the order of the commutative-law conversion, the spatial-resolution conversion, and the dynamic-resolution conversion. FIG. 17 is a diagram showing a state in which the DNN blocks 11$f$ are connected in the order of the commutative-law conversion, the spatial-resolution conversion, and the dynamic-resolution conversion.

That is, also in the FineTune layer FT, the precision of the algorithm is enhanced by configuring, at the post-stage, finite impulse response (FIR) filters having multiple resolutions that pass the middle-layer outputs to the next DNN blocks 11$f$.

[Tuning of Synthesized Algorithm]

The precision of the algorithm to be synthesized is increased by connecting the DNN blocks 11$p$ and the DNN blocks 11$f$ as multiple level layers in accordance with the above-mentioned method.

However, as mentioned above, the time control is originally the inverse calculation problem, and the artifact occurrence cannot be essentially avoided.

Therefore, fine adjustment (tuning) is finally manually performed on the algorithm synthesized by mechanical learning.

Figure 18:
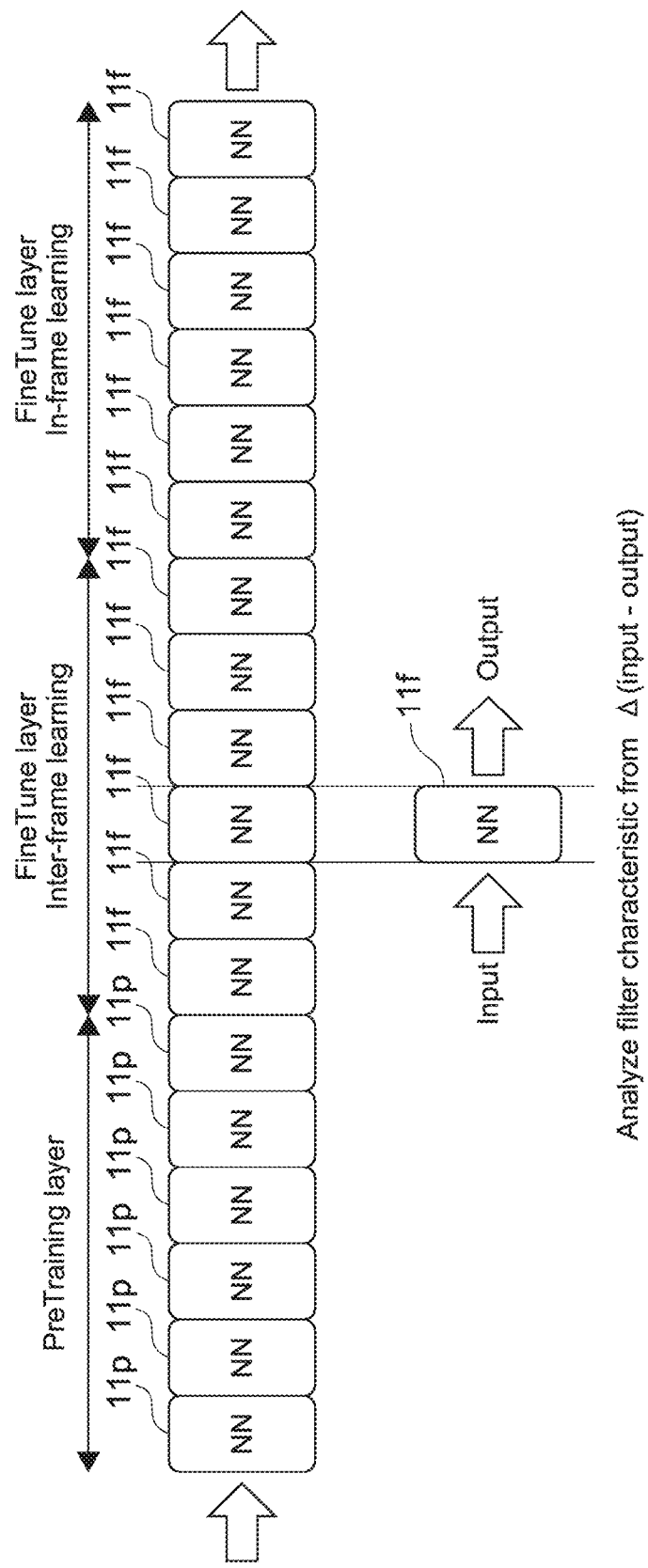
[FIG. 18] A diagram showing a state focusing on analysis of a difference between input data and output data of each DNN block 11$p$, 11$f$.

Here, for providing a tuning means, we focus on analysis of the difference between the input data and the output data of each DNN block 11$p$, 11$f$. FIG. 18 is a diagram showing a state focusing on the analysis of the difference between the input data and the output data of each DNN block 11$p$, 11$f$.

By analyzing a relationship between the difference between the input data and the output data and the control item, two independent orthogonal components are extracted, and an extended wavelet transform is derived.

Then, fine tuning is performed by adjusting elements of the extracted orthogonal components.

[Derivation of Extended Wavelet Transform]

Figure 19A:
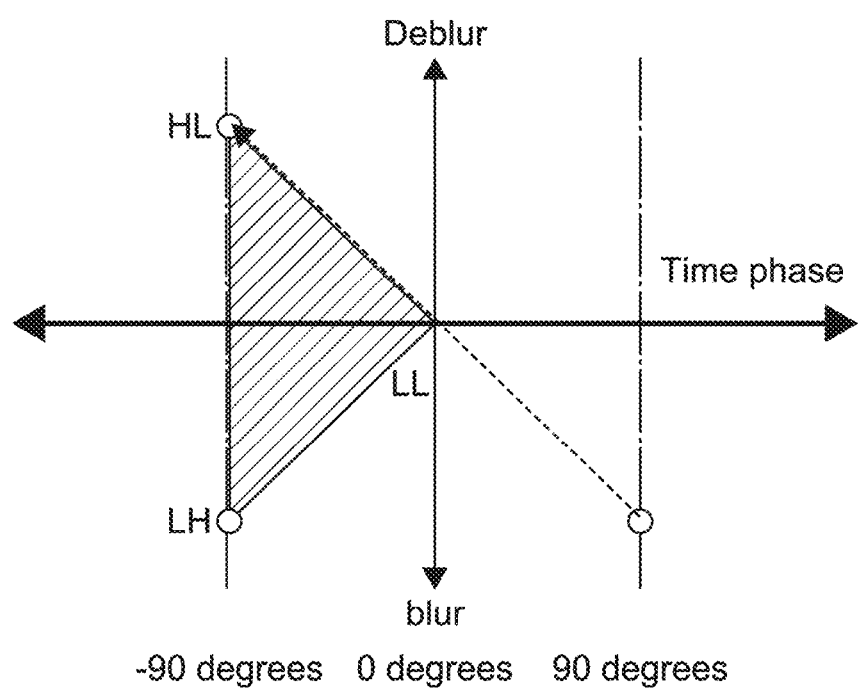
[FIG. 19A] A diagram showing a calculation method of extended wavelet transform.
Figure 19B:
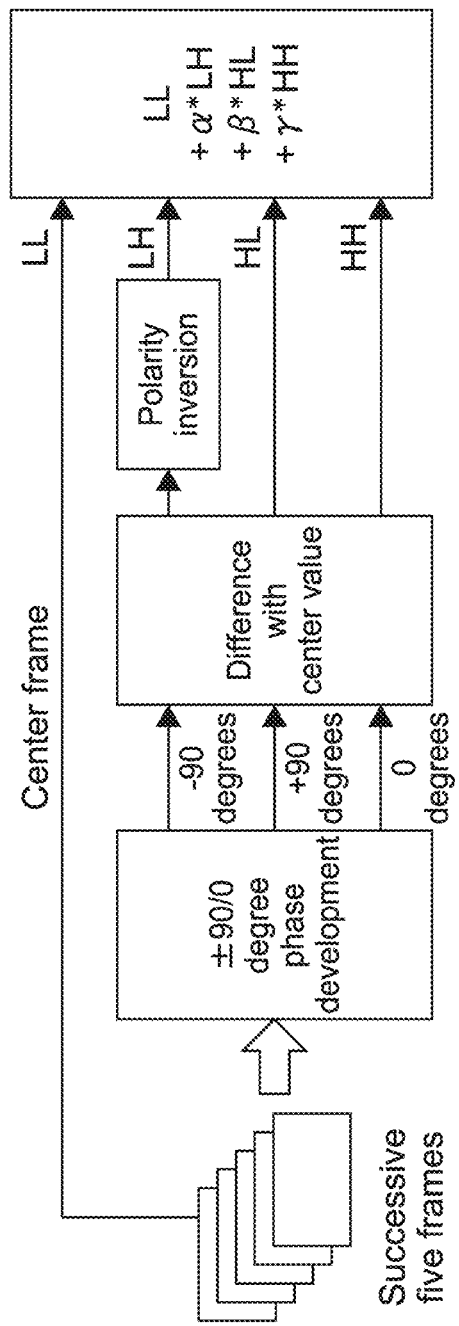
[FIG. 19B] A diagram showing the calculation method of the extended wavelet transform.
Figure 20:
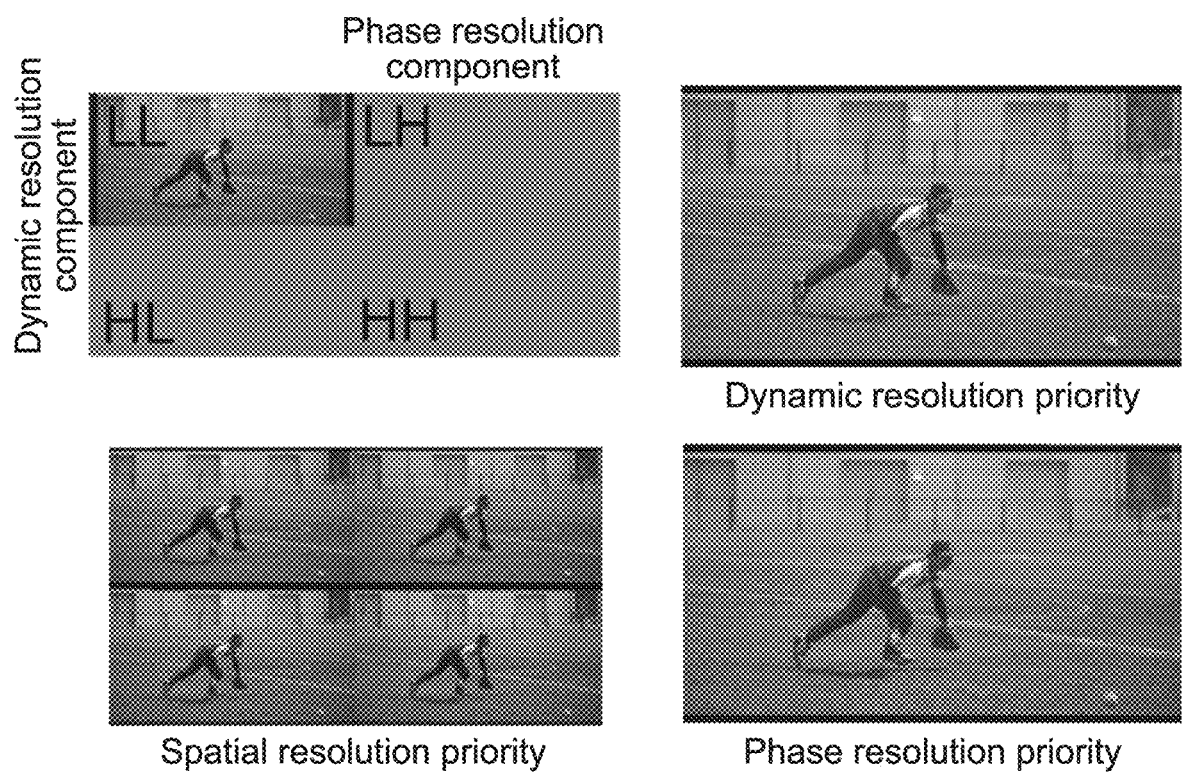
[FIG. 20] A diagram showing an extended wavelet transformed image that is a result of calculation.

Next, a method of the extended wavelet transform will be described. FIGS. 19A and 19B are diagrams showing a calculation method of the extended wavelet transform. Further, FIG. 20 is a diagram showing an extended wavelet transformed image that is a result of calculation.

The frame of the −90 degree phase will be mainly explained.

First of all, two images of the ±90 degree phases are obtained by the synthesized algorithm.

Due to the inverse calculation problem, a low pass filter (LPF) effect acts on the algorithm, and the phases of the both images move while the spatial resolution, the dynamic resolution, and gradation resolution are deteriorated by about 6 dB with respect to the original image.

Here, by determining a difference between an image of a +90 degree component and an image of the 0 degree phase, here, a difference corresponding to the phase and a difference corresponding to the deterioration are observed.

When the polarity of this difference information is inversed, the phase becomes in turn −90 degrees, the gradation is deteriorated in an opposite direction, and an image with the dynamic resolution and the spatial resolution excessively increased is obtained.

Non-interference control of the dynamic resolution and the phase resolution becomes possible at a mix ratio of the −90 degree component originally developed and the 90 degree component polarity-inversed.

That is, as an LL component used for calculation, the third frame that is the center image of the input frames that are the successive five frames is used.

As LH/HL components, a difference value where a phase item is +90 degrees and a value obtained by inversing the polarity of a difference where the phase item is −90 degrees are used.

As an HH component, a difference value between a development value of the 0 degree phase and an input center image is used at a position of a terminal end.

When the gain of the LH/HL components is increased and added to the LL component, the time phase is moved.

When the blend ratio of the LH/HL components is changed and added to the LL component, the dynamic resolution can be controlled.

In this manner, it is possible to individually orthogonally control the time phase and the dynamic resolution.

If the rate of the HL component is high, it acts in a deblur direction and the dynamic resolution becomes higher. The entire image starts to be gradually deteriorated in a gamma direction.

On the contrary, if the rate of the HL component is low, it acts in a blur direction. A characteristic that the gradation entirely drops in a degamma direction is observed.

The HH component is a difference value between the development value of the 0 degree phase and the LL component.

As described above, the image developed by the algorithm synthesized by the mechanical learning module 10 is hierarchized on the basis of the commutative law of the information and the precision is enhanced.

However, essentially due to the inverse calculation problem of the light exposure phenomenon, an image including an artifact with the dynamic resolution and the spatial resolution slightly rounded in both the phases of ±90 degrees is developed.

In view of this, for example, when a difference between the phase on the +90 degree side and the center image is determined, an amount of movement of the profile from 0 degrees to +90 degrees and amounts of deterioration of the spatial resolution and the dynamic resolution are obtained.

By performing polarity inversion on this difference information and adding it to the center image, an image with the phase moved in a −90 degrees direction and the dynamic resolution and the spatial resolution increased is obtained.

Here, provided is a system capable of independently controlling the phase resolution and the dynamic resolution in a non-interference manner by mixing the −90 degree developed image and the −90 degree image obtained by performing the polarity inversion on the +90 degree side at an arbitrary ratio.

[Hierarchical Representation in Extended Wavelet Transform]

Figure 21A:
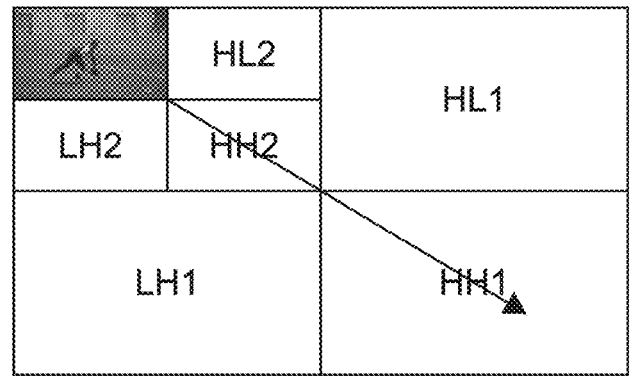
[FIG. 21A] A diagram showing a state in which a hierarchical structure is constructed while downsizing in a low-frequency direction in conventional wavelet transform.

For hierarchization in conventional wavelet transform, it is possible to construct a hierarchical structure while downsizing in the low-frequency direction. FIG. 21A is a diagram showing a state in which the hierarchical structure is constructed while downsizing in the low-frequency direction in the conventional wavelet transform.

Figure 21B:
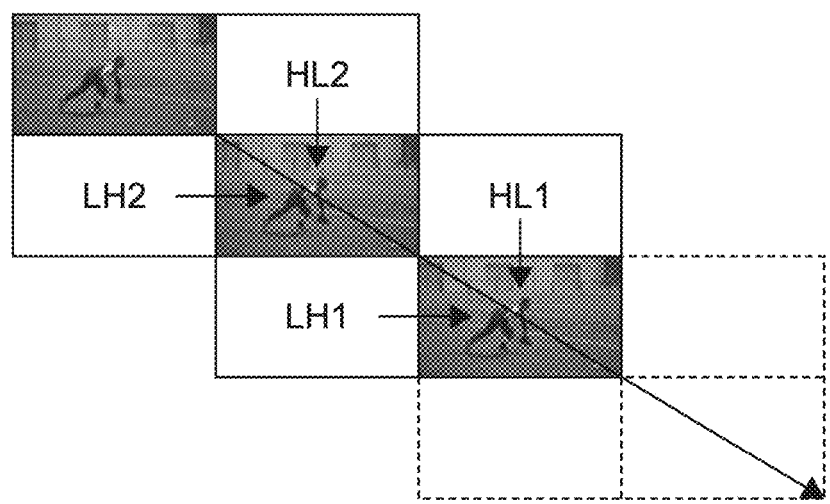
[FIG. 21B] A diagram showing a staircase structure in the extended wavelet transform.

In contrast, in the extended wavelet transform, the time and the space are mixed. Therefore, it is difficult to change the angle of view. Therefore, it is represented as a staircase structure, not as the hierarchical structure. FIG. 21B is a diagram showing the staircase structure in the extended wavelet transform. In the staircase structure, the HH component is omitted for the sake of convenience.

Figure 22A:
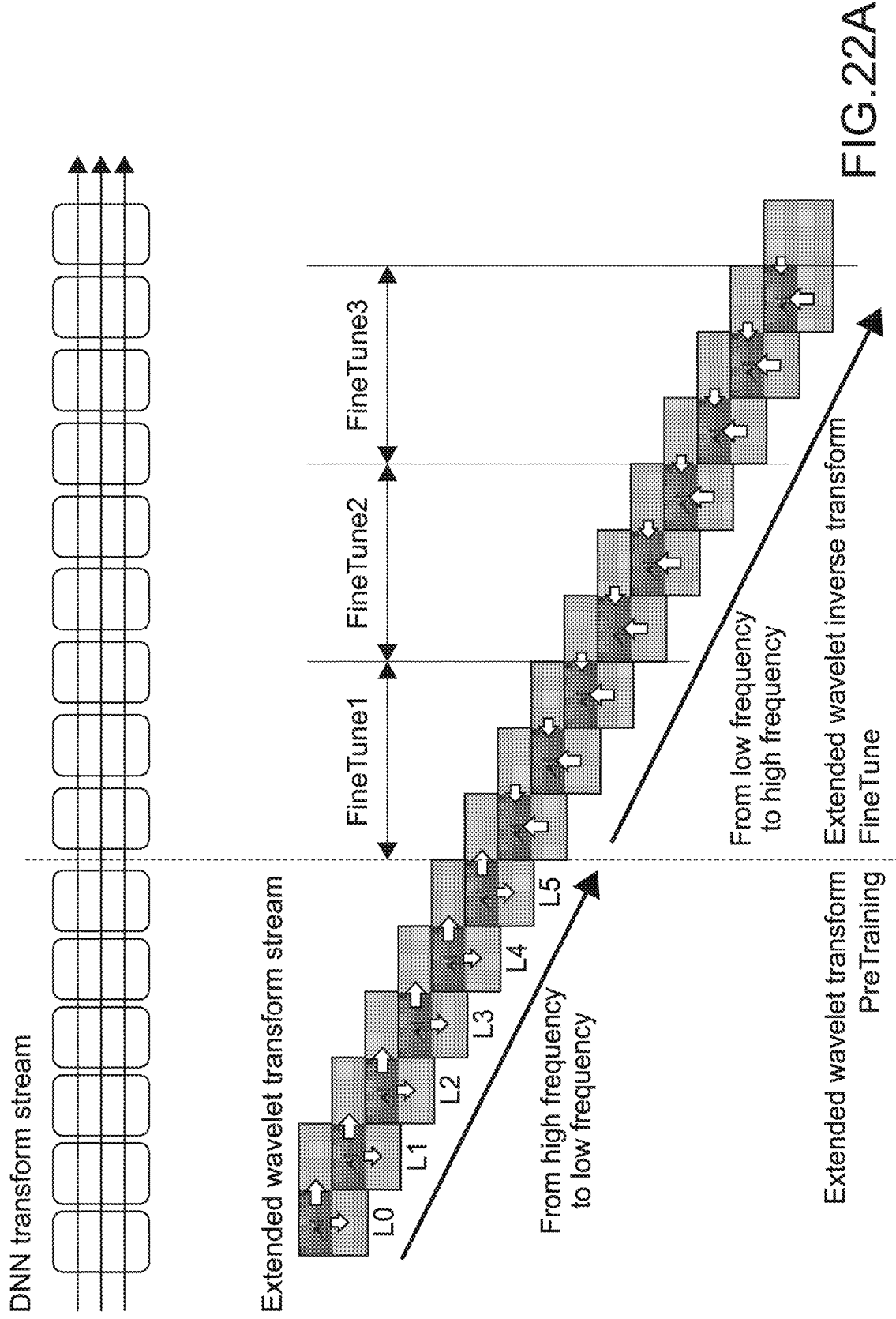
[FIG. 22A] A diagram showing an extended wavelet transform stream.

By hierarchically connecting the extended wavelet transform in which a DNN transform stream has been tuned (subjected to reverse engineering) in accordance with this representation, an extended wavelet transform stream can be obtained. FIG. 22A is a diagram showing the extended wavelet transform stream.

In this manner, by overlooking and tuning the dynamic-resolution component and the time-phase resolution component of each level layer, the debugability can be enhanced.

Figures 22B, 22C:
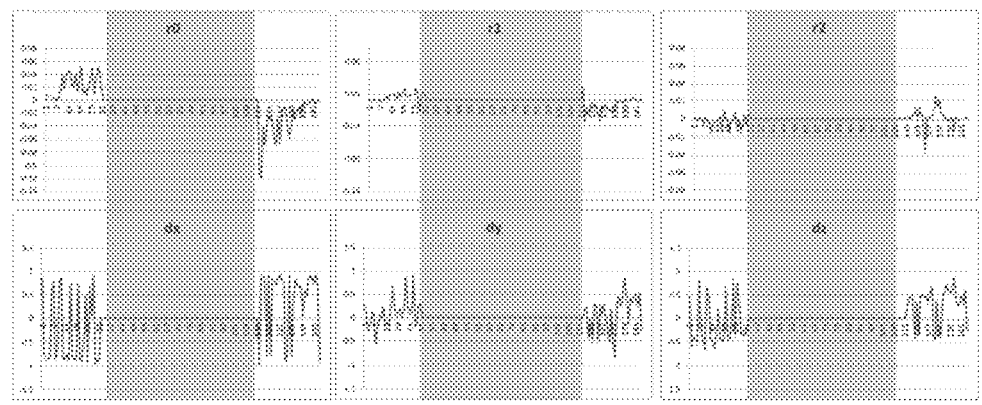
[FIG. 22B] A diagram showing an experiment result according to a conventional matching technique.
[FIG. 22C] A diagram showing an experiment result according to analysis by mechanical learning.

Here, an experiment result in a case where the mechanical learning of the first embodiment was performed and an experiment result according to a conventional matching technique will be described. FIG. 22B is a diagram showing the experiment result according to the conventional matching technique. FIG. 22C is a diagram showing the experiment result according to the analysis by mechanical learning.

Both the diagrams estimate six axes (dx/dy/dx/roll angle/yaw angle/pitch angle) from the successive frames.

In the mechanical learning, a relatively favorable image pattern is provided. An essential matrix is calculated by a conventional matching method, six-axis information is obtained from this through singular value decomposition, and the mechanical learning is performed on it.

In the conventional matching method, a favorable result is provided in a case of a monochromatic pattern. However, if there are similar patterns of a carpet or the like, these become matching errors and the analysis fails.

The result of analysis by the algorithm obtained by mechanical learning has no failures, and motion data of the six axes is well analyzed.

The mechanical learning of this embodiment is originally one obtained by learning the result of the conventional matching method. However, once the learning is completed, the mechanical learning has fewer matching failures in comparison with the conventional technique, and a robust result can be obtained.

Hereinabove, the first embodiment has been described.

Second Embodiment

Next, a second embodiment will be described. Note that, in each of embodiments below, descriptions will be given in the order of Problem of Typical Technology, Means for Solving Problem, and components of the embodiment.

In the second embodiment, an effect obtained by superposing a plurality of algorithms regarding the algorithm to be synthesized in the mechanical learning module 10 will be described.

[Problem of Typical Technology]

The DNN technology is a technology that enables the artificial intelligence to find a solution by itself.

It is an effective method that may be capable of easily solving an inverse calculation problem which is highly difficult to solve by design by people in some problems in future.

In the field of the algorithm design, a design style in which even a person who is not with experience and does not have mathematical knowledge can obtain an approximation expression through mechanical learning by providing only an input and an expectation value (supervisory signal) becomes possible.

The DNN technology can lower the technical stakes of the algorithm development.

However, the entire overhead tends to become larger in the algorithm development based on the mechanical learning. If a person can theorize and design, there is a high possibility that the algorithm development can be performed with more compact resources in comparison with the DNN.

This point is one of obstacles for DNN propagation.

[Means For Solving Problem]

The DNN has a large overhead if it concentrates only on realization of one algorithm. However, it can provide a plurality of algorithms in one neural network, and a Heterogeneous type DNN is generally known.

In the Heterogeneous type DNN, the plurality of algorithms are thus constructed in such a manner that the PreTraining layer PT at the pre-stage is shared as a common recognition module and each DNN block 11*f* is provided for each algorithm in the FineTune layer FT at the post-stage.

In this manner, if the plurality of algorithms can be simultaneously executed in the same neural network, the entire system can disperse and evaluate the overhead of the single algorithm.

Therefore, it becomes motivation to propagate the algorithms of the mechanical learning.

Further, in addition to the Heterogeneous type DNN, the DNN includes a method for causing a plurality of algorithms to coexist in a neural network, for example, a simultaneous type DNN and a compression signal processing type DNN. By providing these DNNs, it is possible to further propagate the DNN technology.

[Realization Method]

Figure 23:
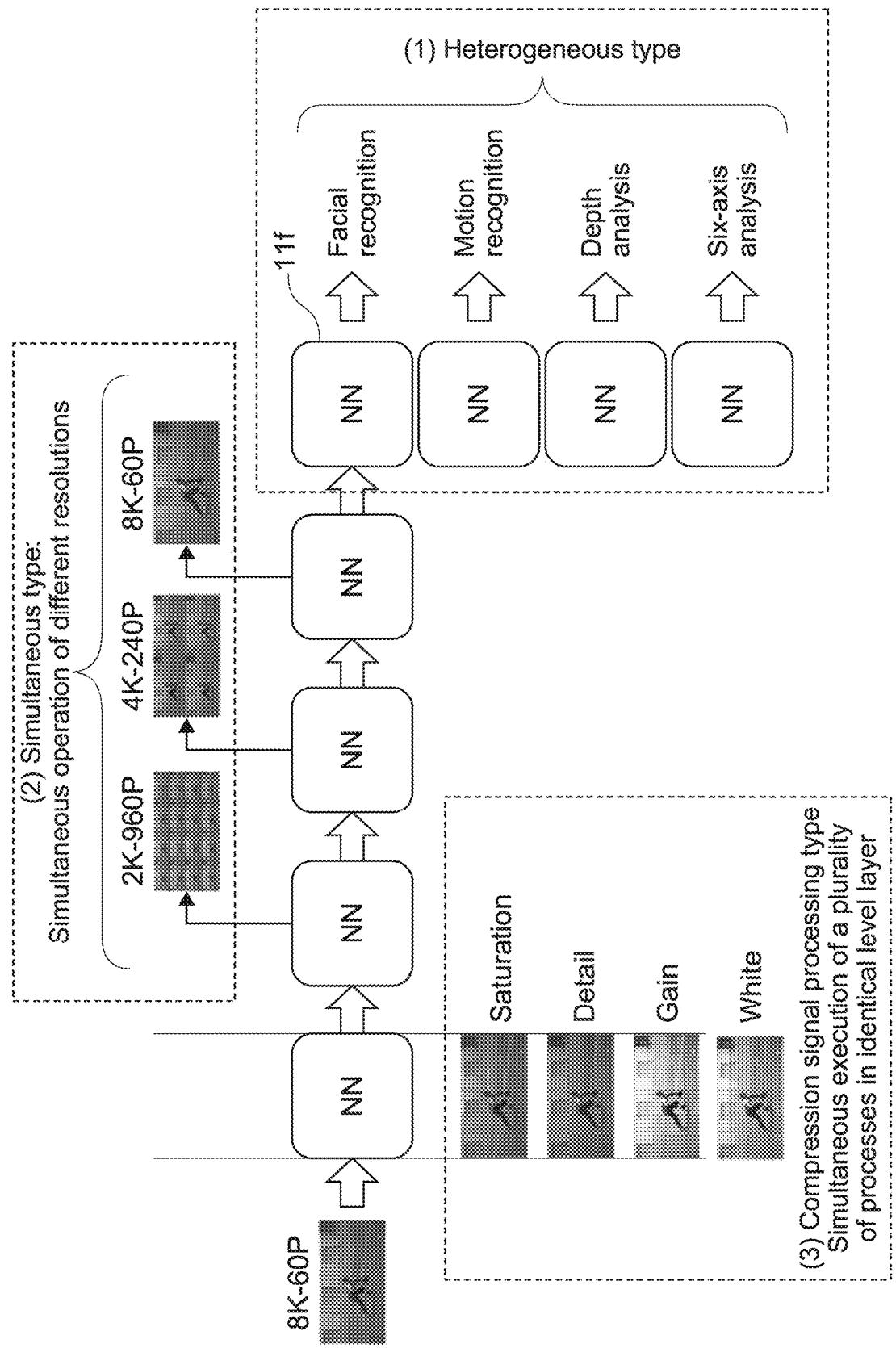
[FIG. 23] A diagram listing examples of algorithm superposition.

Next, superposition of algorithms in the mechanical learning module 10 will be described. FIG. 23 is a diagram listing examples of the algorithm superposition.

(1)

The Heterogeneous type DNN shares the PreTraining layer PT at the pre-stage, and includes, in the FineTune layer FT at the post-stage, the DNN blocks 11*f* for the respective algorithms. By synthesizing algorithms in this manner, the plurality of algorithms coexist in the same neural network.

(2)

The simultaneous type DNN utilizes the frequency level layer constructed in the DNN transform stream.

For example, by utilizing the above-mentioned DNN blocks 11*f* for spatial-resolution conversion, super Hi-Vision images of 8K-60 P in the next generation is used as an information source, and the resolution thereof can be converted into 4K-240 P, 2K-960 P. In the simultaneous type DNN, an application in which 8K broadcasting is effectively used in a Hi-Vision TV is assumed.

An application in which such images are simultaneously output through the DNN transform stream hierarchized for each frequency can be employed as the simultaneous type DNN. It can be defined as one of the methods for causing algorithms to coexist.

(3)

On the other hand, the compression signal processing type DNN executes a plurality of algorithms in an identical level layer at the same time.

Figure 24:
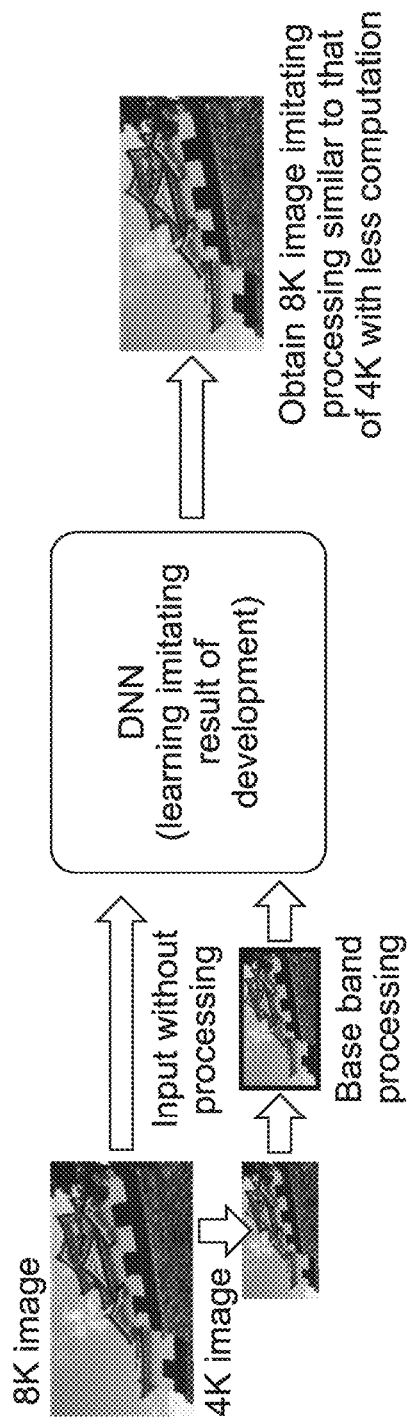
[FIG. 24] A diagram showing an example in which the amount of computation of camera process processing with respect to an 8K-60 P image is reduced.

For example, an example in which the amount of computation of camera process processing with respect to an 8K-60 P images is reduced will be described. FIG. 24 is a diagram showing the example in which the amount of computation of the camera process processing with respect to the 8K-60 P image is reduced.

In the example shown in the figure, a 4K-60 P image is obtained by downconverting the 8K-60 P image, and signal processing is performed only on the 4K image.

By inputting the 8K image not subjected to signal processing and the 4K image on which the signal processing has been performed into the mechanical learning module 10, an algorithm to imitate signal processing equivalent to that of the 4K image is constructed.

With this algorithm, the signal processing similar to that of the 4K image is performed on the 8K image.

This can be considered that a plurality of algorithms that perform a plurality of types of processing such as gamma processing, white balance processing, matrix processing, and detail processing are executed at the same time in an identical level layer.

As described above, under a condition that sufficient linear separation has been performed for the signal processing in a certain level layer, it means that the plurality of algorithms can be simultaneously executed in the identical level layer at the same time.

This is what the compression signal processing type DNN is.

As described above, the three types of algorithm superposition methods can be exemplified, which includes the Heterogeneous type DNN that constructs the respective algorithms by making the PreTraining layer PT at the pre-stage common and placing the dedicated DNN blocks 11*f* in the FineTune layer FT at the post-stage, the simultaneous type DNN that obtains and utilizes an output value for each frequency level layer, and the compression signal processing type DNN that performs the plurality of types of signal processing at the same time in the identical level layer.

It is possible to minimize the overhead of the DNN by providing an upstream design environment for managing a plurality of algorithms implemented in one neural network.

Hereinabove, the second embodiment has been described.

Third Embodiment

Next, a third embodiment will be described. In the third embodiment, considering the fact that development processing of the input image in the mechanical learning module tends to act like a low pass filter (LPF), a conventional type serial processing module that acts like a high pass filter (HPF) is added, LPF/HPF cooperative transform is performed, and the result of development is adjusted.

[Problem of Typical Technology]

In the control in the time direction, the 100% solution cannot be obtained as described above. In such a problem the solution of which cannot be uniquely determined, the filters are averaged in the learning process, and the entire system tends to function as the low-pass filter. Therefore, there are many cases where a sufficient precision cannot be obtained against designer's will.

[Means For Solving Problem]

In order to overcome such a low-pass effect in the entire system, filters having the high-pass effect that is a characteristic opposite to the low-pass effect are mixed in the DNN transform stream.

Implementation examples of the high-pass filter include a plurality of types, for example, a geometric transform type, a multigate type, a database reference type, and a CNN type.

Figure 25:
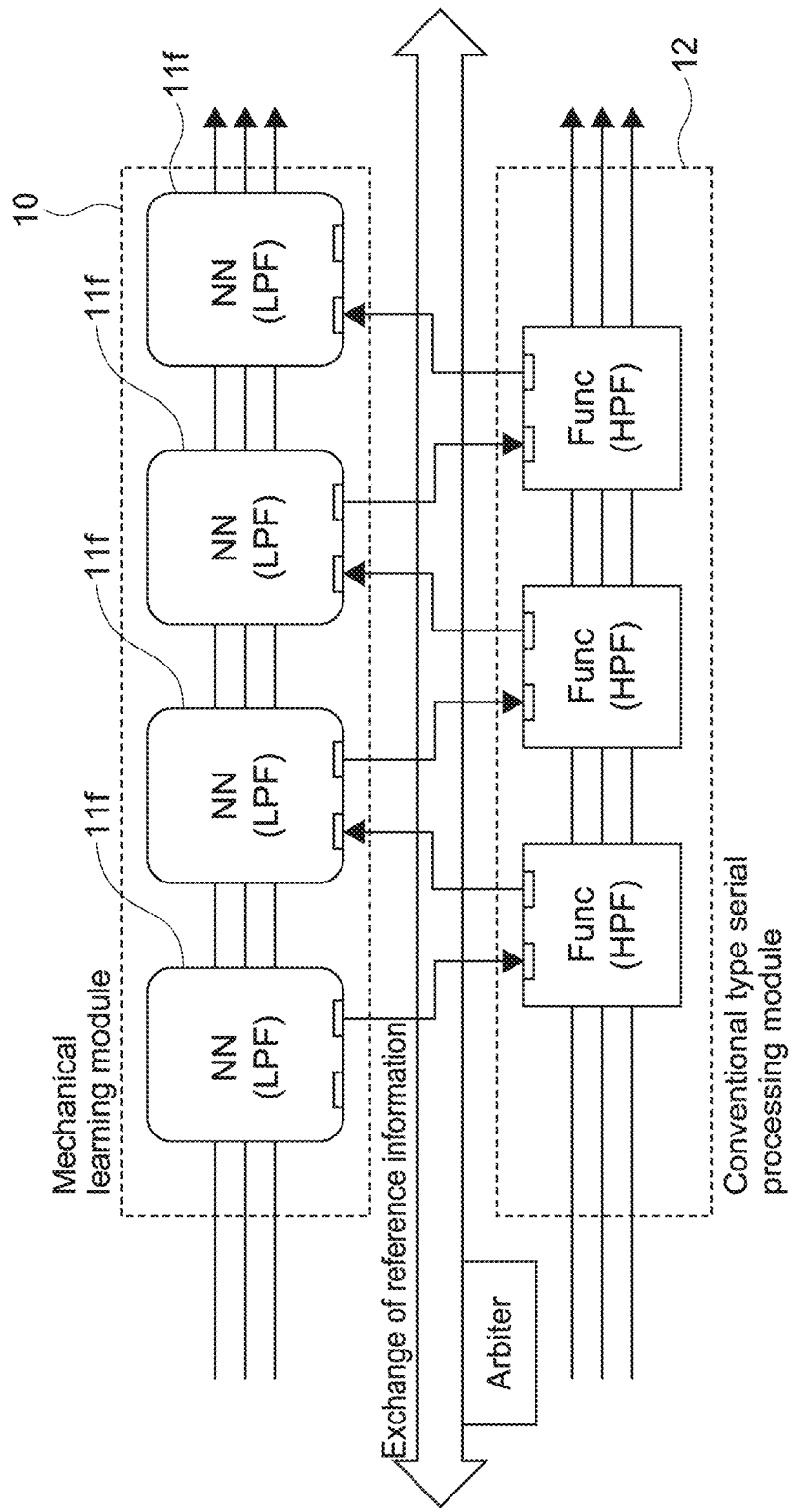
[FIG. 25] A block diagram showing configurations of the mechanical learning module 10 of this embodiment and a conventional type serial processing module 12.

By alternately arranging the DNN blocks 11 having the LPF effect and the modules having the HPF effect, it is possible to enhance the quality of the development. FIG. 25 is a block diagram showing a configuration of the mechanical learning module 10 of this embodiment and a conventional type serial processing module 12.

[Realization Method]

(Geometric Transform Type)

Figure 26A:
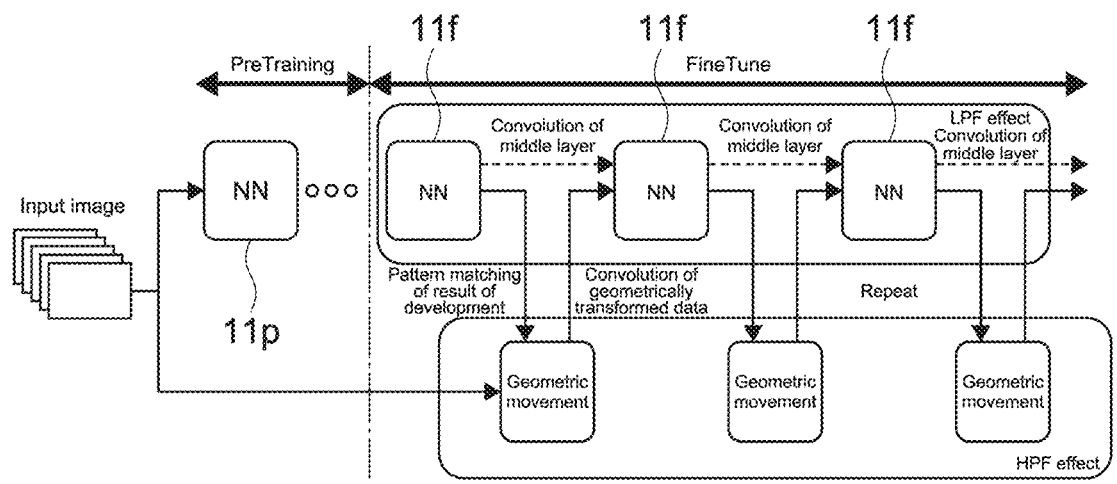
[FIG. 26A] A configuration example in a case of using a geometric transform module 13.

FIG. 26A is a configuration example in a case of using a geometric transform module 13.

Pattern matching is performed on the basis of the result obtained in the above-mentioned mechanical learning, and an image including an imaged object which has been geometrically moved corresponding to an amount of motion is generated.

Figure 26B:
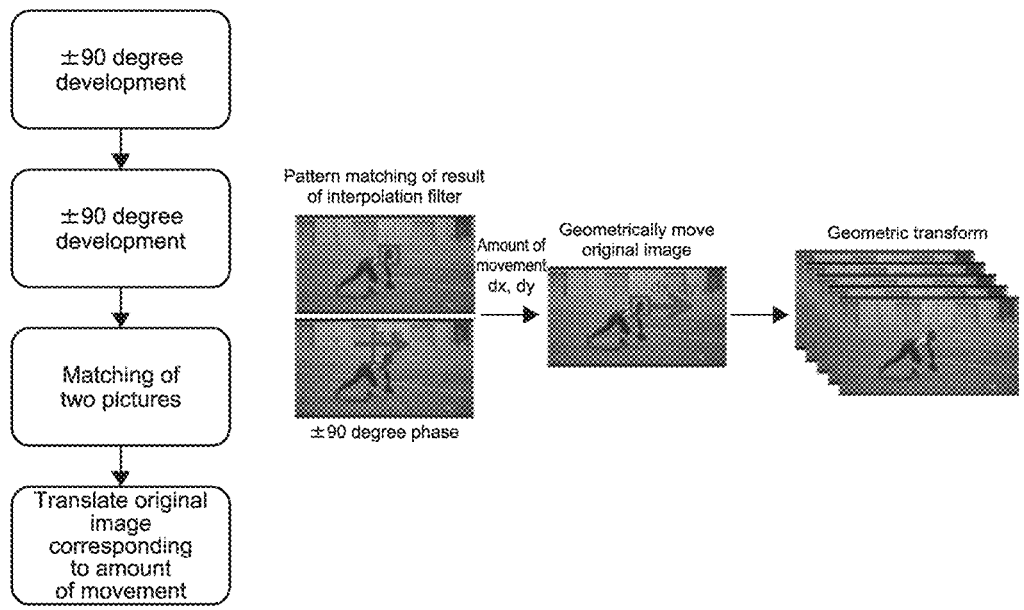
[FIG. 26B] A diagram showing details of geometric movement.

FIG. 26B is a diagram showing details of geometric movement.

A double-speed developed image obtained by the algorithm synthesized in the wavelet type header WH entirely has an insufficient resolution. However, it is very robust with respect to development of the intersection, collision, and deformation of the imaged object.

In a case where the double-speed image is developed by performing pattern matching of this result of development, calculating a motion vector quantity, and moving the original image by a distance corresponding to the motion vector, an image relatively robust against the intersection and collision, the resolution of which is maintained at the resolution of the original image, can be obtained.

However, an artifact such as some distortion occurs in the image obtained at that time. Therefore, it is further passed to the mechanical learning module 10 including the wavelet type header WH.

Then, by alternately repeating processing at the mechanical learning module 10 and the geometric transform module 13 while causing the LPF effect to act on this artifact, the algorithm synthesis precision is enhanced.

(Multigate Type)

Figure 27A:
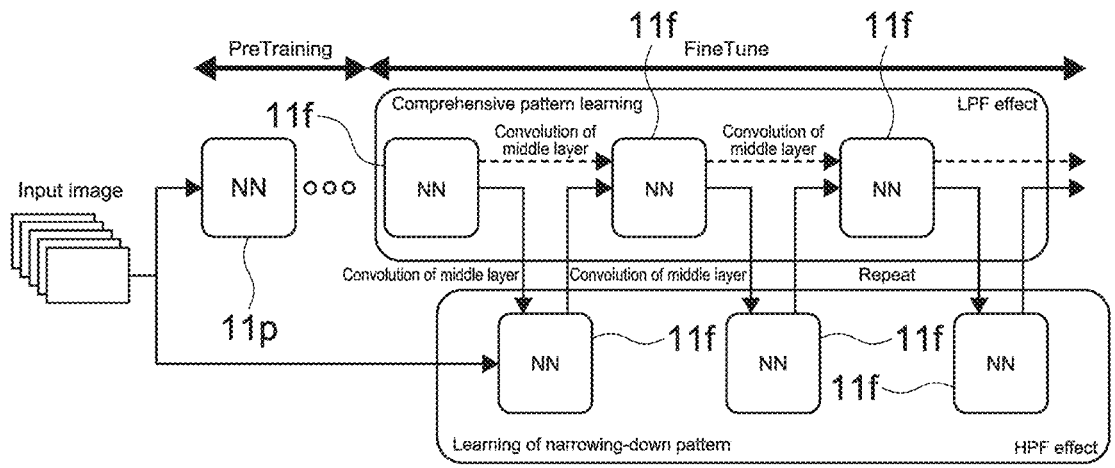
[FIG. 27A] A configuration example in a case of using a multigate type module.

FIG. 27A is a configuration example in a case of using the multigate type module.

In the multigate type, learning of narrowing-down a certain pattern is performed, and a high-precision filter is generated with respect to a particular pattern.

Figure 27B:
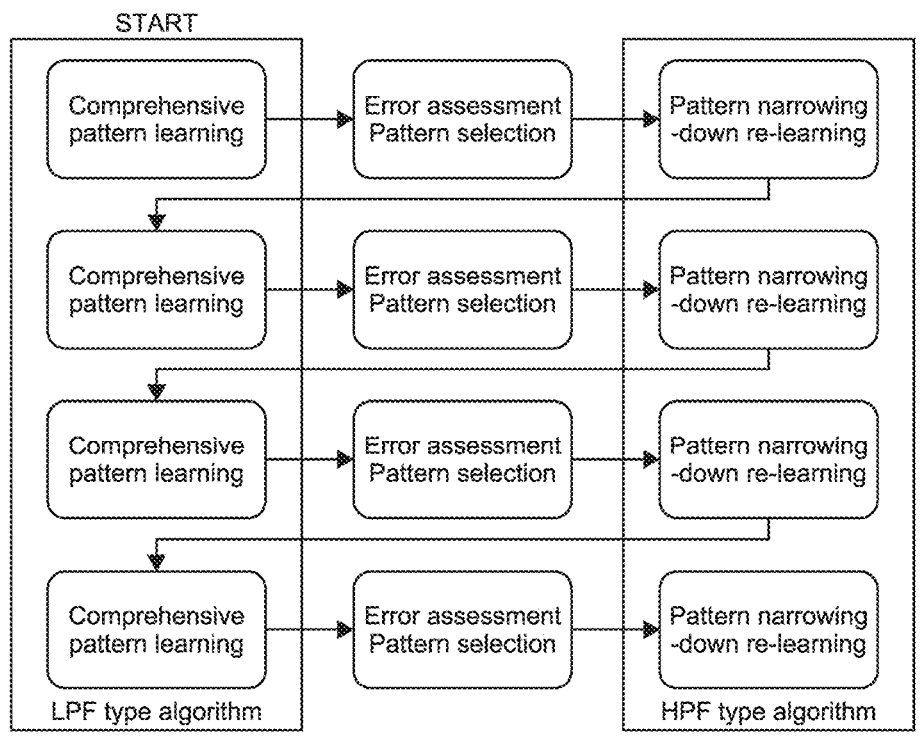
[FIG. 27B] A diagram showing details of a flow of multigate type processing.

FIG. 27B is a diagram showing details of a flow of multigate type processing.

Typically, development of various scenes is assumed in the algorithm synthesized by mechanical learning, and hence the learning pattern is comprehensively provided.

However, due to the characteristic of the inverse calculation problem, when the learning pattern is comprehensively provided, the algorithms are averaged with the pattern the solution of which cannot be uniquely obtained, and the LPF effect gradually is exerted.

On the other hand, when the learning is performed by narrowing down to a particular pattern, a filter having a high precision only for that particular pattern can be obtained.

This filter generates artifacts with respect to patterns not assumed.

By alternately repeating the two mechanical learning modules different in filter characteristics, the precision of the algorithm synthesis can be enhanced.

(Database Reference Type)

Figure 28A:
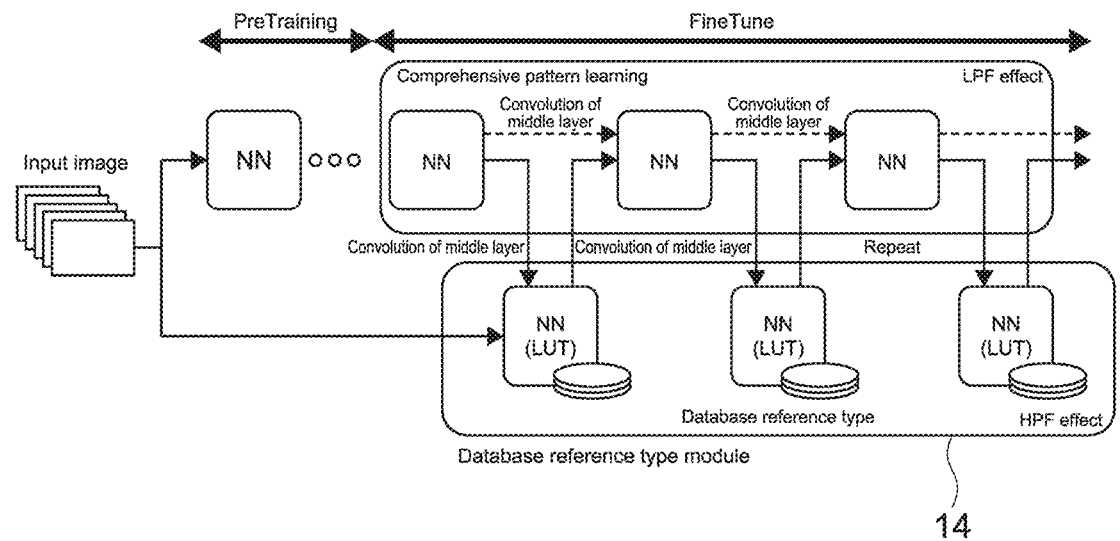
[FIG. 28A] A configuration example in a case of using a database reference type module 14.

FIG. 28A is a configuration example in a case of using a database reference type module 14.

The database reference type module 14 has a function of accumulating a learning database, and performs processing of increasing information in the neural network.

By employing an AutoEncoder that obtains sparse components, such as a SparseAutoEncoder to generate a sparse base (address with respect to the database). By referring to a database optimal for this base and performing 1:N (N>1) mapping on the post-stage, the HPF effect is realized.

Figure 28B:
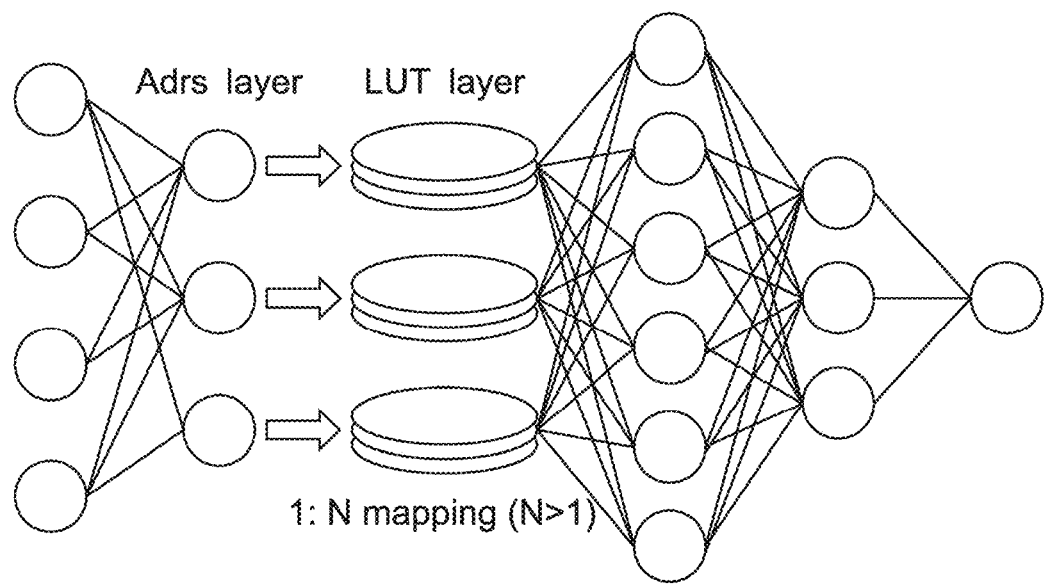
[FIG. 28B] A diagram describing a supplement relating to a look up table (LUT).

FIG. 28B is a diagram describing a supplement relating to a look up table (LUT).

The neural network includes a multiplier-accumulator circuit, and basically performs mapping conversion except for some filter technologies such as the CNN. Therefore, the amount of information, which has been input, is not increased at a certain time.

In order to increase the information, it is necessary to employ a configuration of 1:N mapping (N>1) by referring to the database (LUT).

In this configuration, base information of the image is first obtained in an address (Adrs) layer, database reference is performed in each neuron by using this base as the address of the database reference, and 1:N mapping is performed.

The LUT layer accumulates a rule-of-thumb database in accordance with a mechanical learning method such as a genetic algorithm, adds data to data of the same base, and passes them to the post-stage.

The LUT layer is also capable of providing an input image frame itself. Further, the LUT layer is also capable of processing geometric transform or the like which cannot be well handled by the neural network. In addition, the LUT layer is also capable of handling input data provided to the neural network, as a pointer in a program.

Figure 28C:
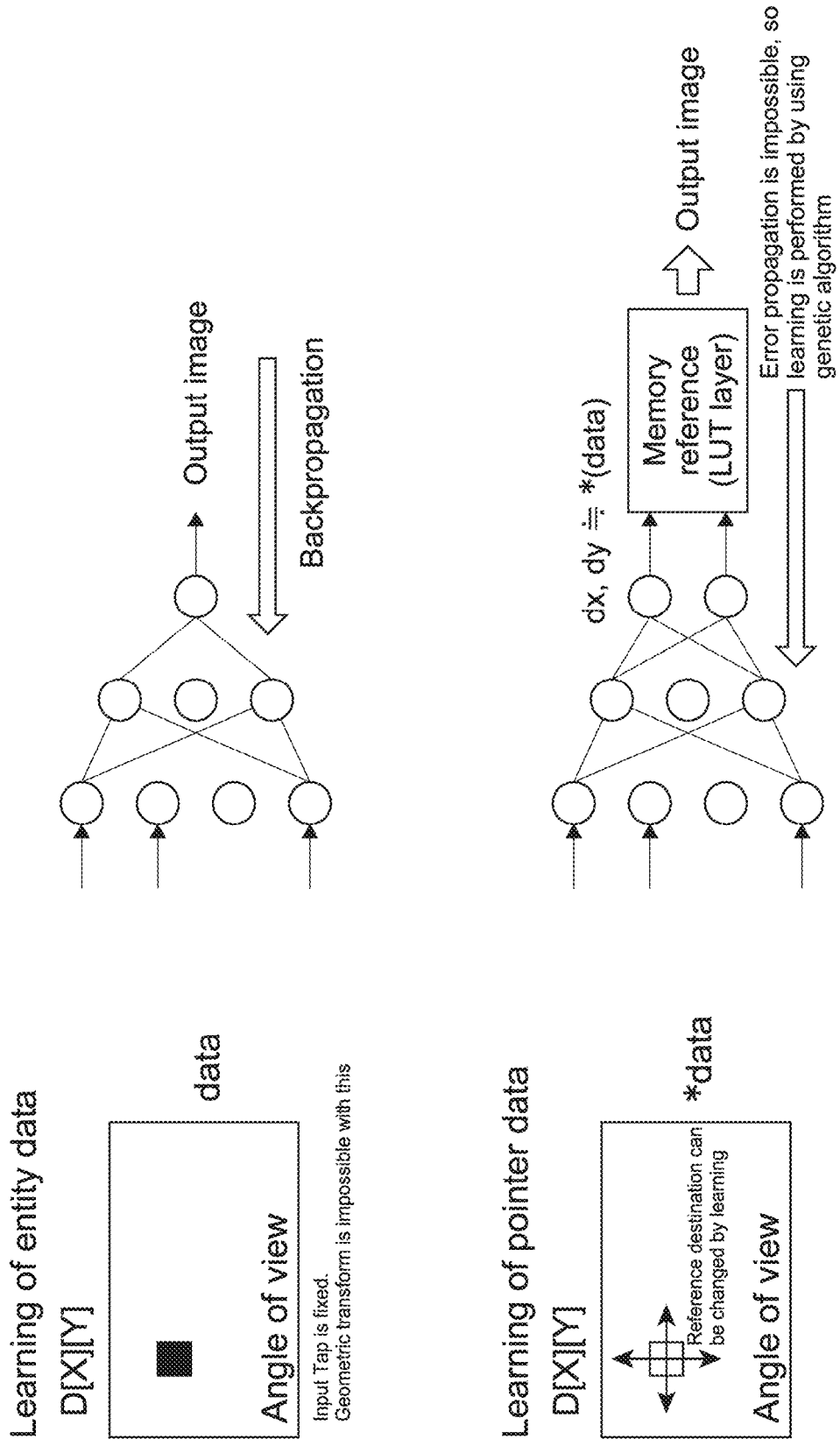
[FIG. 28C] A diagram showing a difference between learning of entity data and learning of pointer data.

Note that FIG. 28C is a diagram showing a difference between learning of entity data and learning of pointer data.

As shown in the figure, in learning of the conventional neural network, a configuration in which entity data is input and a solution is obtained therefrom is basically employed.

In such a configuration, learning relying on a range (D) of an image has been inappropriate in order to solve a problem including pixels over a wide range, for example, in a case of rotating an image of the angle of view of the HD by 180 degrees or the like. In order to solve the problem of the geometric transform, it is necessary to perform learning relaying on a domain (X, Y) of the image.

In this embodiment, a configuration in which input data is handled as a pointer and a pixel that is a reference destination is changed in the LUT layer is employed.

With this configuration, it becomes possible to cope with problems that require handling of a certain type of pointer, such as recursive processing problem and a list processing problem including the geometric transform.

(CNN Type)

Figure 29:
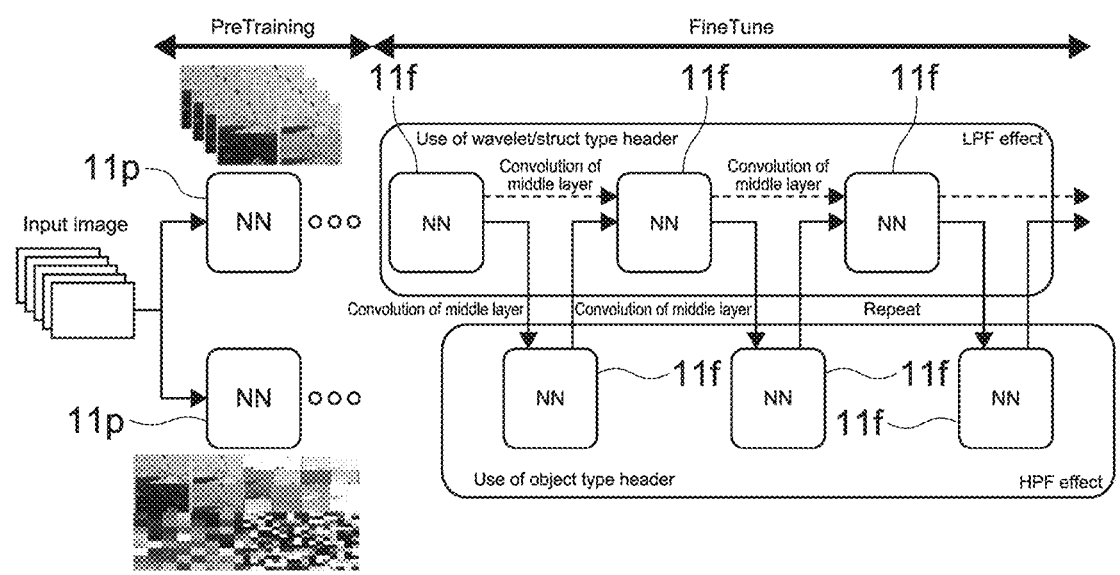
[FIG. 29] A configuration example in a case of using a CNN type module.

FIG. 29 is a configuration example in a case of using a CNN type module.

In the case of using the CNN type module, a CNN type header CH is employed as the header of the PreTraining layer PT, a filter that increases information as in the database type due to the super-resolution effect obtained by convolution of the CNN, and the HPF effect is provided.

Typically, the neural network is merely a multiplier-accumulator circuit. Therefore, processing performed by the neural network is basically mapping, and hence the amount of information of the output data hardly increases relative to the amount of information of the input data.

However, due to the effect that the object type header OH generated by the CNN repeats convolution, the synapse data itself functions as a database accumulating rules of thumb.

By repeating the multiply-accumulate operation of the synapse data through convolution with respect to the input information, an output value to which information has been added can be obtained.

Therefore, in a case of synthesizing an algorithm by using the object type header OH obtained by the CNN as an input while the overhead of the amount of computation increases, an algorithm synthesized by the wavelet type header WH on which the frequency decomposition has been performed by the AutoEncoder entirely acts in an LPF direction while an algorithm synthesized by the object type header OH acts in an HPF direction. Therefore, the algorithm synthesis precision can be enhanced.

Fourth Embodiment

Next, a fourth embodiment will be described. In the fourth embodiment, optimization of the mechanical learning module 10 will be described.

[Problem of Typical Technology]

The mechanical learning module 10 includes a plurality of level layers (DNN blocks 11) from a level layer that performs frequency decomposition, structure decomposition, or abstraction degree decomposition in the PreTraining layer PT to a level layer that reconstructs an image in the FineTune layer FT.

In order to synthesize a higher-precision algorithm, the number of level layers of the mechanical learning module 10 tends to be increased. However, when analyzing each level layer, there are also middle layers that hardly function. Therefore, optimization of the entire mechanical learning module 10 also becomes an important problem.

[Means For Solving Problem]

In the DNN transform stream in the mechanical learning module 10, in order to reduce the occurrence of various artifacts that derive from the inverse calculation problem, a measure is taken by hierarchizing the DNN blocks 11 at multiple levels. This measure is a main cause of the increase in level layers.

Therefore, a final output image obtained by the multi-level hierarchization is a result of development as a point of compromise in considering the various artifacts that derive from the inverse calculation problem.

In view of this, in a case of performing re-learning in another mechanical learning module 10' by using this output image as a supervisory signal, the supervisory image already includes a suitable artifact, and hence over-fitting and the like do not occur. Thus, a favorable algorithm can be synthesized with a more compact hierarchical structure in comparison with the initially synthesized algorithm.

[Realization Method 1]

Figure 30:
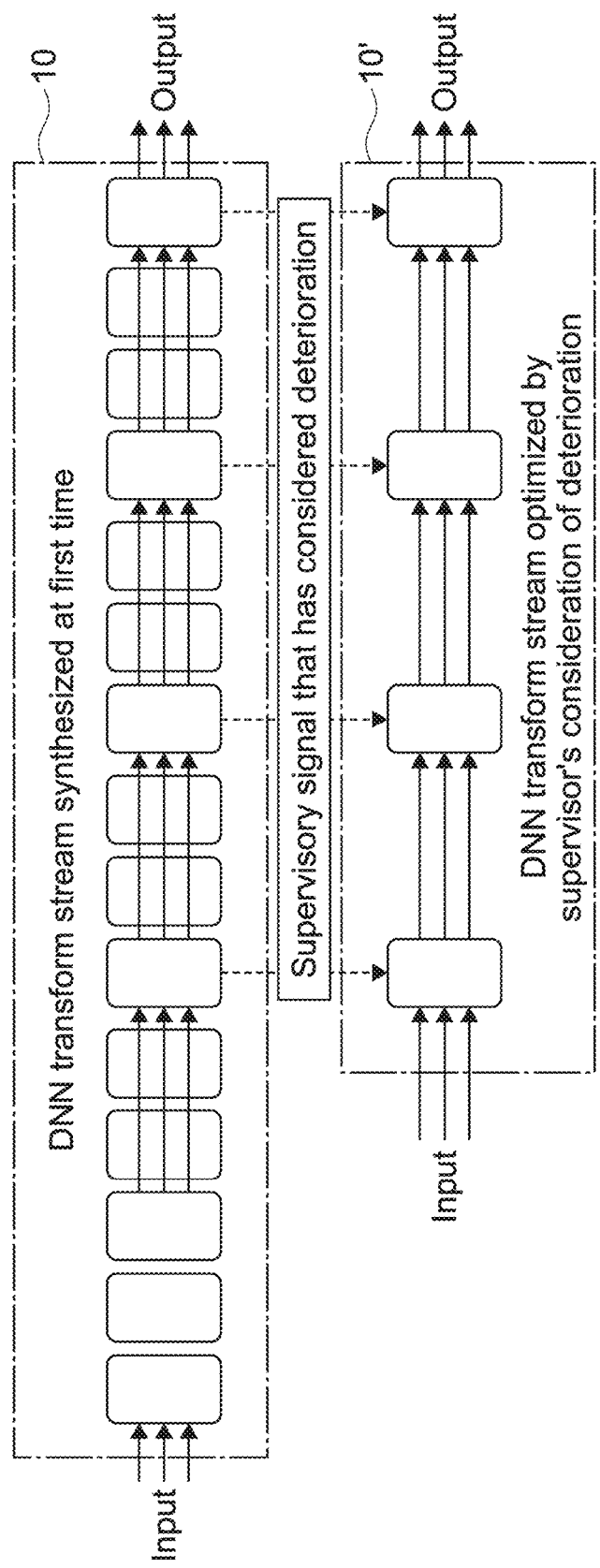
[FIG. 30] A schematic diagram of a first method that optimizes the mechanical learning module 10.

FIG. 30 is a schematic diagram of a first method that optimizes the mechanical learning module 10.

A supervisory image is obtained by an initially synthesized DNN stream. The supervisory image is used as a supervisory signal for the new mechanical learning module 10'.

By performing learning for obtaining the supervisory image from the same input with the configuration of the more compact mechanical learning module 10', the compact mechanical learning module 10' can be constructed.

[Realization Method 2]

Figure 31A:
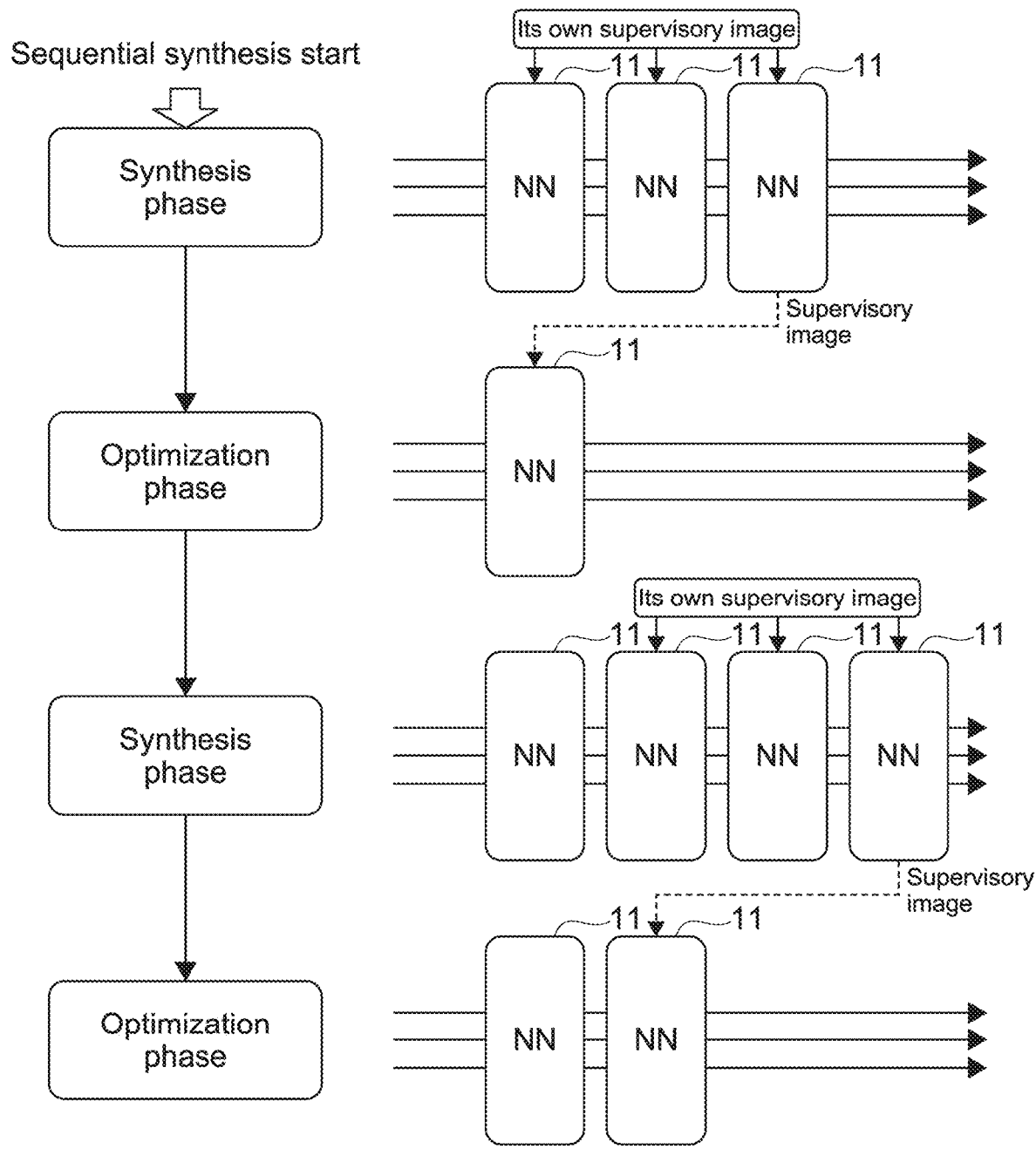
[FIG. 31A] A schematic diagram of a second method that optimizes the mechanical learning module 10.

FIG. 31A is a schematic diagram of a second method that optimizes the mechanical learning module 10.

Synthesizing the first DNN transform stream, which is used in the realization method 1, also becomes a large overhead.

In view of this, as shown in the figure, by employing an optimization method also when the first DNN transform stream is synthesized, the synthesis and the optimization are carried out for each DNN block 11.

In order to optimize the algorithm, several-level layers are provided, learning is performed, and a result is obtained as preprocessing.

A certain amount of level layers are synthesized, a result obtained therefrom is used as a supervisory signal, and an equivalent compact algorithm is obtained by a compact mechanical learning module having a smaller number of level layers than the certain amount of level layers.

Using these optimized level layers as the pre-stage, a certain amount of level layers is provided at the post-stage again, the mechanical learning is made to progress, and a result is obtained.

A compact algorithm is synthesized by using that result as a supervisory signal again.

By repeating the above-mentioned processes to thereby simultaneously carry out the optimization processing from the generation of the first DNN transform stream, the mechanical learning module 10 is optimized while shortening the synthesis time.

[Application Example of Optimization Method]

Next, an application example of the above-mentioned optimization method and factorization to the AutoEncoder of the CNN in the optimization method will be described.

As an application of the optimization method, by performing mechanical learning using the data of the above-mentioned header as an input and the result of the CNN as a supervisory signal, a result approximately equivalent to that of the CNN can be obtained.

It should be noted that the AutoEncoder technique that requires the real-time property, on which the present technology is based, the recognition performance equivalent to that of the large-scale CNN module cannot be realized.

Figure 31B:
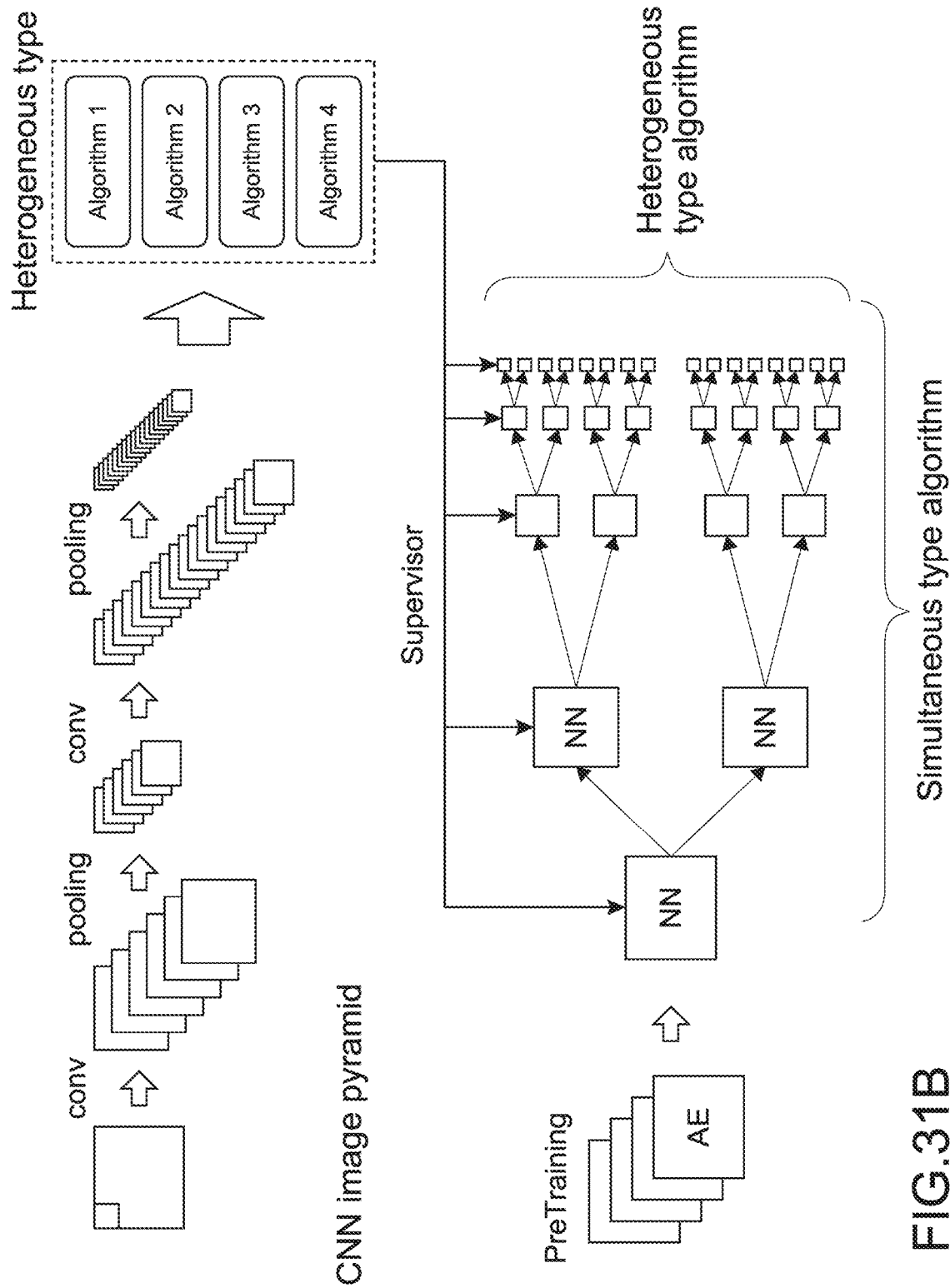
[FIG. 31B] A diagram showing a state in which a person defines the abstraction degree of recognition in advance and decomposition into a tree structure is performed by grouping easy to recognize.

In view of this, a person defines the abstraction degree of the recognition in advance, and decomposition into a tree structure is performed by grouping easy to recognize. FIG. 31B is a diagram showing a state in which the person defines the abstraction degree of the recognition in advance and the decomposition into the tree structure is performed by grouping easy to recognize.

Although the CNN has an excellent learning ability, the angle of view is limited due to the amount of computation, and there are many difficult problems especially in image processing and the like.

In view of this, a recognition algorithm is synthesized by performing learning in the CNN once.

When re-learning is performed by the system proposed in this embodiment by using a result of synthesis as a supervisory image in a way similar to that of the optimized algorithm, the synthesis of the algorithm is possible even with a relatively simple configuration of the AutoEncoder in comparison with the CNN, and a higher-speed algorithm can be synthesized.

It should be noted that the ability of linear separation is limited corresponding to the simplification.

Therefore, an image parse tree is configured by defining in each layer an abstraction degree that can be understood by a person and then successively performing decomposition.

For example, rough decomposition into the sea, the sky, the ground, natural objects, artificial objects, and the like is first performed. Next, at the node of the natural objects, decomposition into objects having a detailed abstraction degree, such as trees, grasses, and trunks is performed. Level layers that perform such decomposition are provided.

In the above-mentioned processes, factorization is performed approximately from the CNN algorithm to the algorithm in the format of the AutoEncoder.

The image parse tree is a parse tree generated in such a manner that respective layers are expressly classified by a person, and is capable of designing an algorithm by effectively using the respective layers.

The CNN is limited to the Heterogeneous type algorithm. On the other hand, in the image parse tree of the AutoEncoder, a simultaneous type algorithm can also be constructed in addition to this.

Figure 31C:
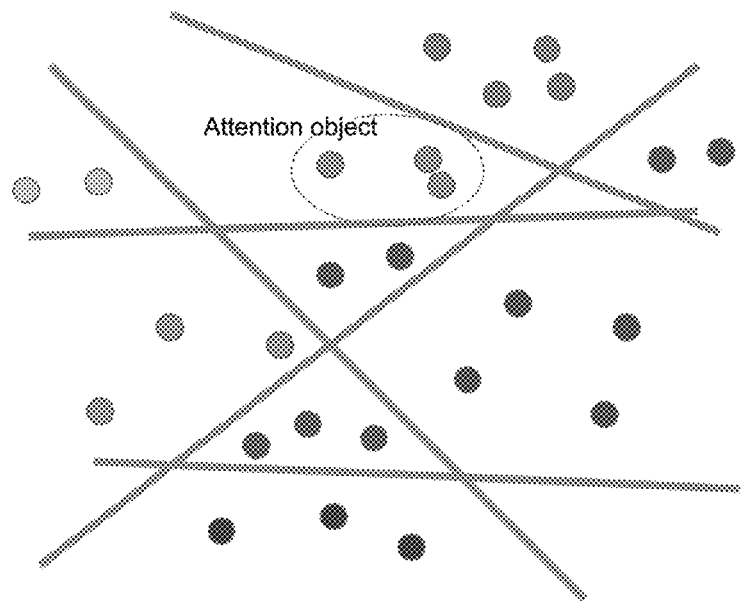
[FIG. 31C] A diagram showing a state in which the CNN learns all events in parallel at a tree post-stage.
Figure 31D:
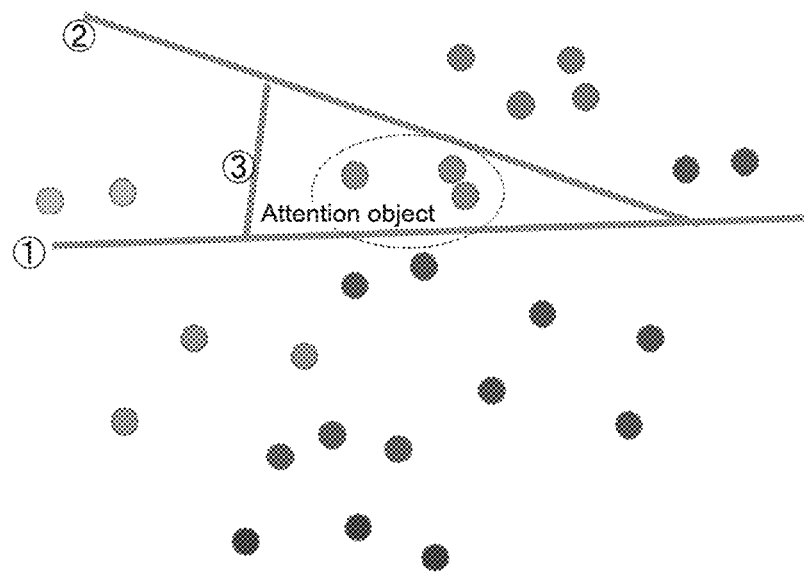
[FIG. 31D] A diagram showing a state in which learning of elements, which have been separated at the pre-stage, becomes unnecessary in a parse tree of an AutoEcnoder at a tree post-stage.
Figure 31E:
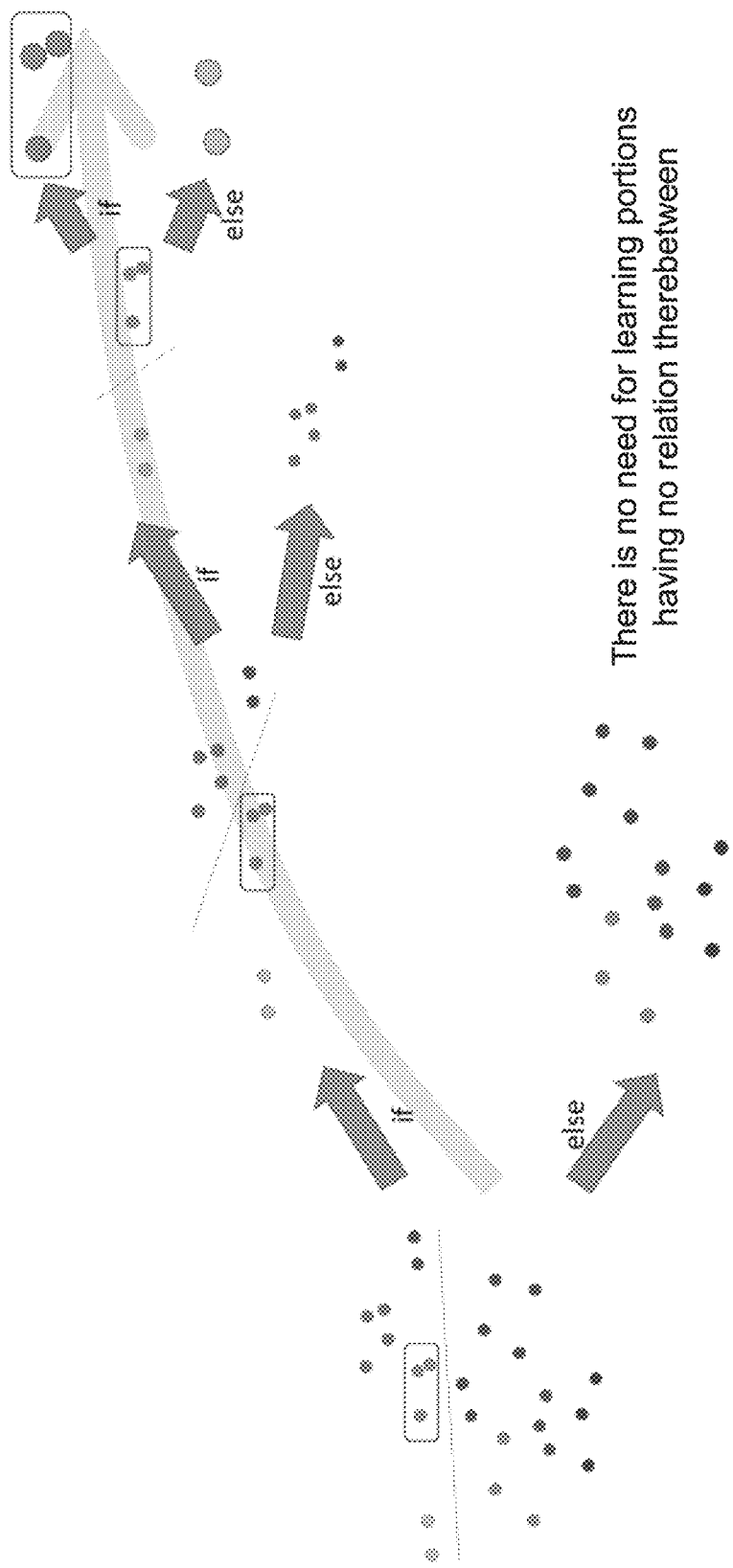
[FIG. 31E] A diagram showing a state in which learning of the elements, which have been separated at the pre-stage, becomes unnecessary in the parse tree of the AutoEcnoder at the tree post-stage.

At the tree post-stage, as shown in FIG. 31C, the CNN learns all events in parallel. On the other hand, as shown in FIGS. 31D and 31E, in the parse tree of the AutoEcnoder, it becomes unnecessary to learn elements separated at the pre-stage.

These three figures show clustering of the CNN and a multilevel hierarchy of the AutoEncoder.

The CNN performs clustering on images and performs recognition. On the other hand, the AutoEncoder performs clustering on images with the data structure obtained as the multilevel hierarchy by gradually performing decomposition from a higher abstraction degree.

It is unnecessary to classify objects which have been excluded from targets at nodes after decomposition. Therefore, it is also possible to greatly reduce resources necessary for learning.

That is, in the CNN clustering, an algorithm like a switch statement is constructed in a fully connected layer with all image information being in a parallel relationship.

In contrast, the image parse tree in the AutoEncoder constructs an algorithm that performs decomposition into if-else sentences.

Due to such a difference in learning, the amount of computation of the former is O (N*N) while the amount of computation of the latter is about O (N*Log N).

Thus, it is possible to perform recognition even though the amount of computation is reduced.

Figure 31F:
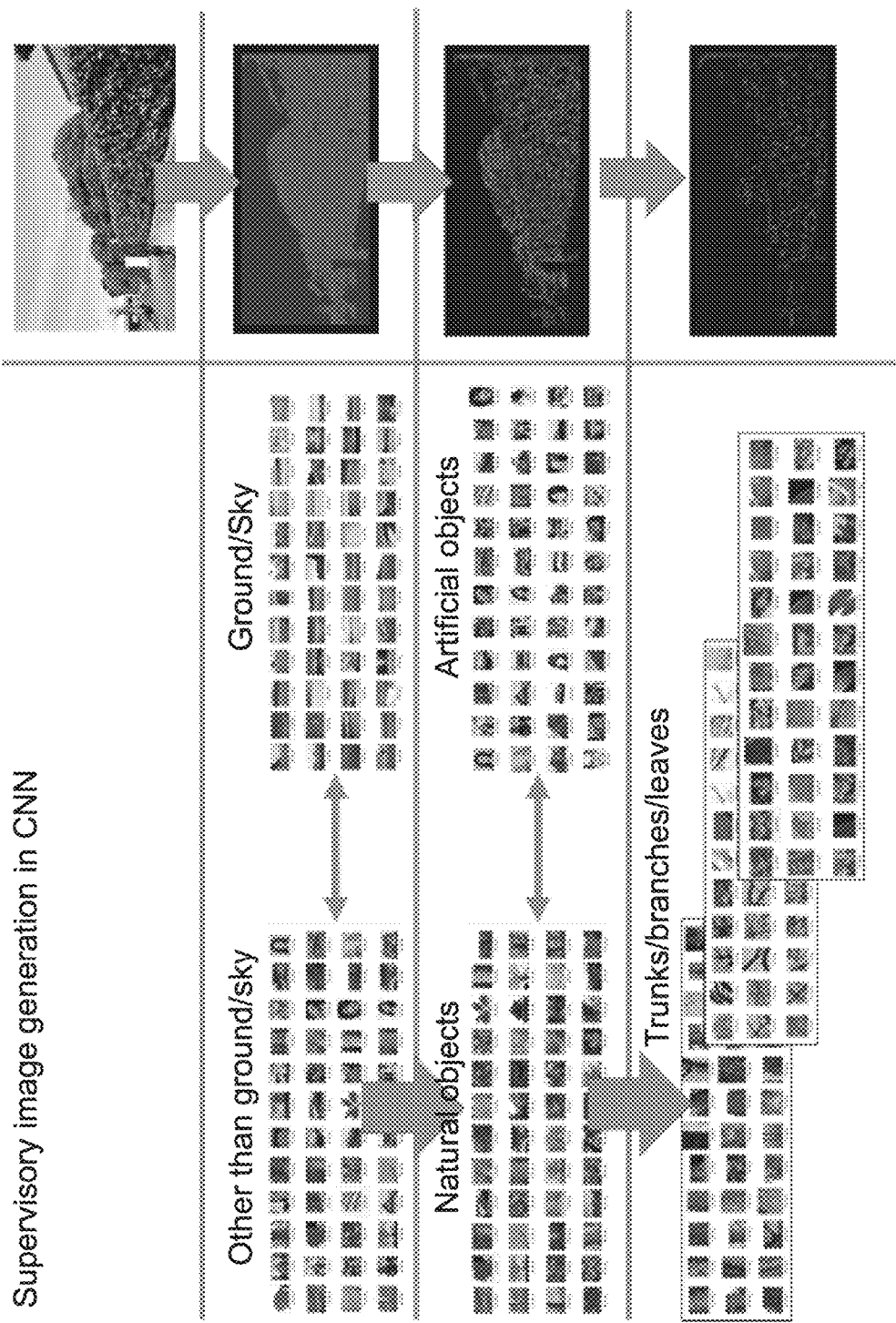
[FIG. 31F] A diagram showing of a result of decomposition.

Next, as shown in FIG. 31F, a recognition algorithm is designed while performing classification into genres in the CNN, and images are labeled.

The classification into genres in this case defines decomposition into genres, which can be understood by a person, by a person or a certain mechanical learning method.

Figure 31G:
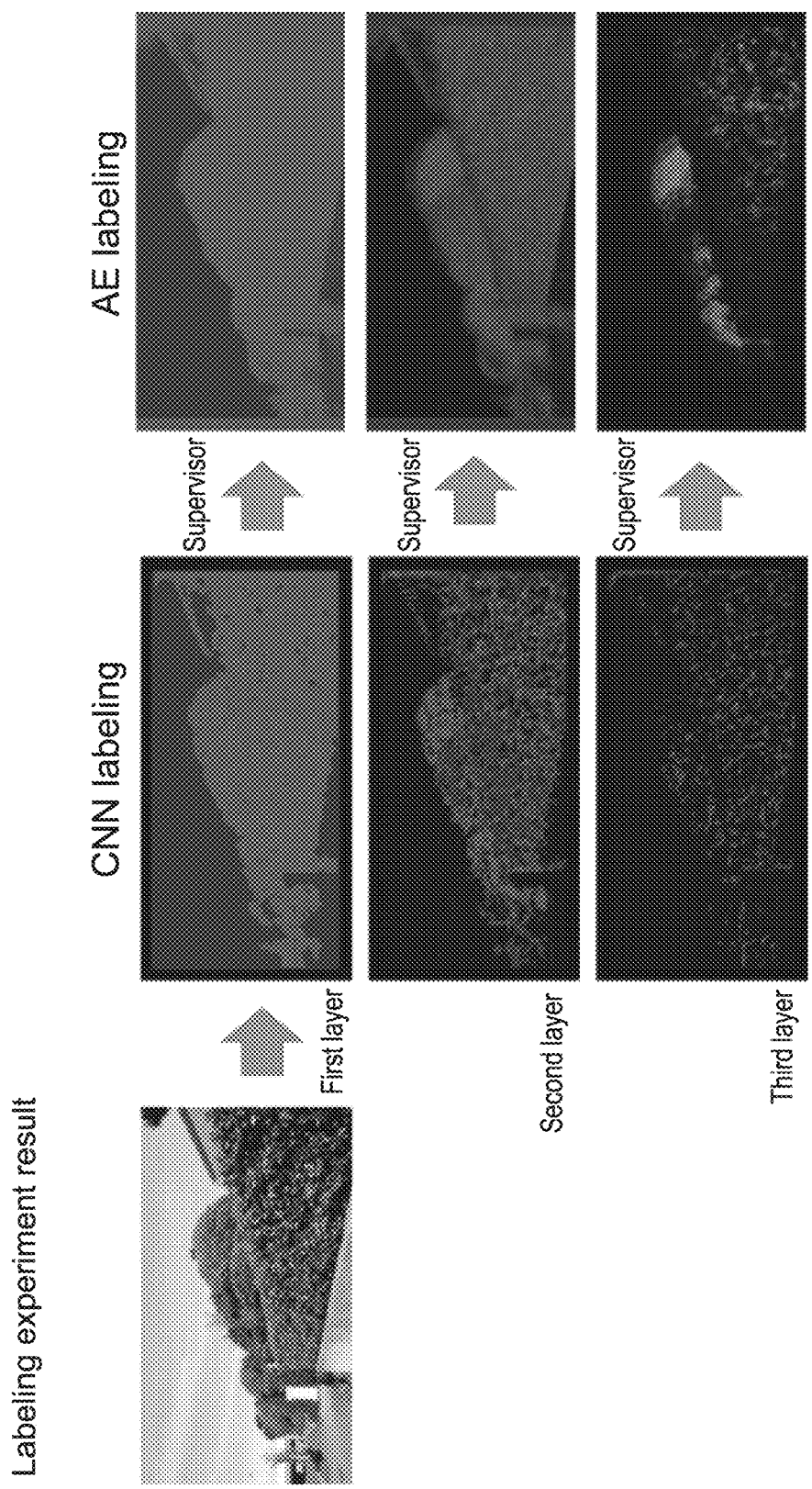
[FIG. 31G] A diagram showing of a result of decomposition.
Figure 31H:
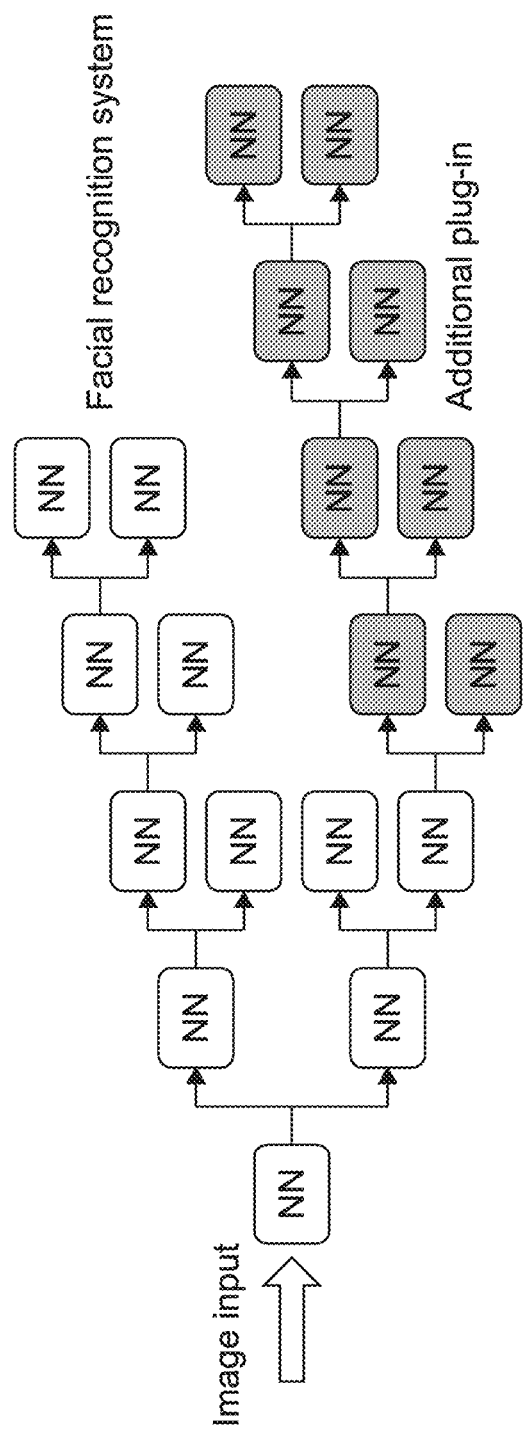
[FIG. 31H] A diagram showing a state of incremental development of the mechanical learning module.
Figure 31J:
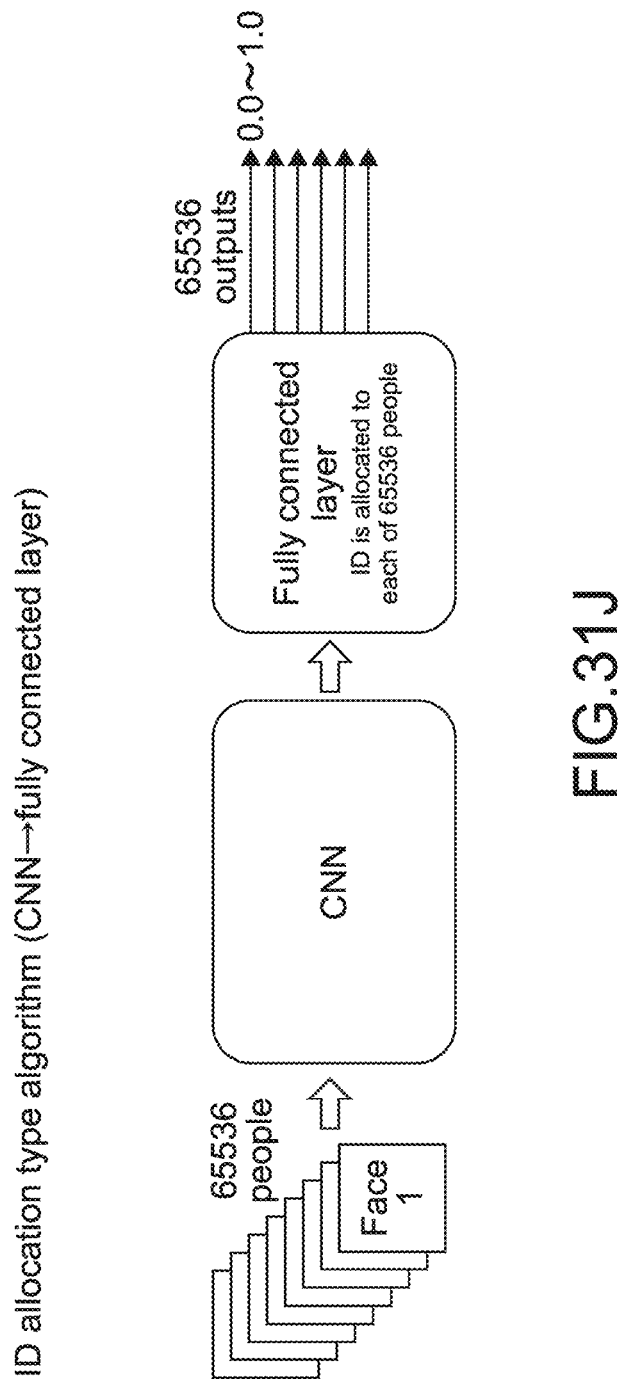
[FIG. 31J] A diagram showing an ID allocation type algorithm (fully connected layer from CNN).
Figure 31K:
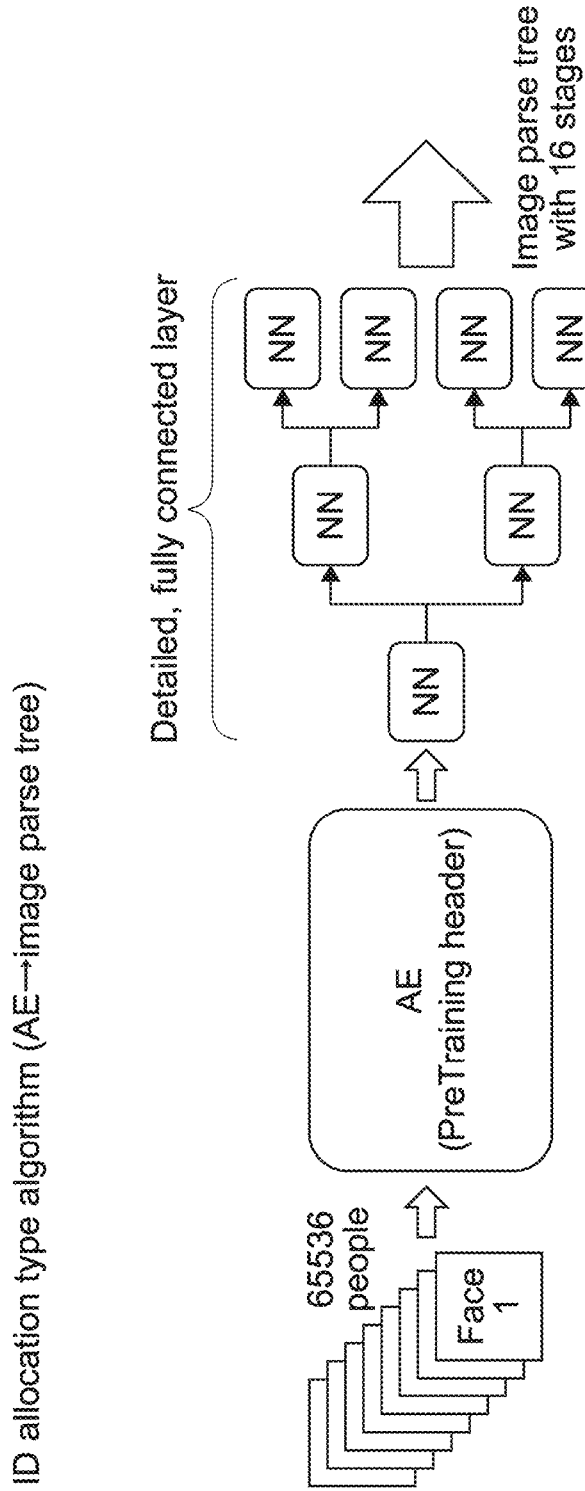
[FIG. 31K] A diagram showing an ID allocation type algorithm (image parse tree from AutoEncoder).

Next, FIG. 31G shows a result of hierarchization by causing the AutoEncoder to learn a result equivalent to that of the image labeling obtained in the CNN.

In a first layer, the sky/ground and the others are separated. In a second layer, the natural objects are finely separated and color-coded.

In this experiment, it was confirmed that the CNN and the AutoEncoder were able to realize approximately equivalent labeling.

Thus, it can be considered that the CNN is capable of approximate factorization to a plurality of AutoEncoders and, when the plurality of AutoEncoders are expanded on the contrary, approximate aggregation to the single CNN is possible.

The image parse tree is decomposed while a person gives a meaning to each of the layers. Thus, an algorithm can be designed in each layer, and it becomes easy to develop the simultaneous type algorithm.

Further, as shown in FIGS. 31H, 31I, 31J, and 31K, the image parse tree is effective in incremental development of the mechanical learning module and identification problem of numerous patterns. Note that the incremental development is a development style in which the functions is gradually extended.

In method of performing factorization on the synthesized algorithm to the AutoEncoder by using the CNN, the DNN blocks 11 can be plugged in, for example.

The functions can be increased by adding the DNN blocks 11 in an incremental manner without changing the DNN blocks 11 synthesized in the past. Thus, it is an effective method when the mechanical learning module 10 is developed in a team.

For example, it is assumed that a facial recognition type algorithm is developed at an initial stage, and then, it becomes necessary to newly add another function.

In that case, by extending a branch from newly associated another node to thereby add the DNN blocks 11 while the algorithm used in the facial recognition is left as it is, the functions can be extended keeping the resources in the past as they are.

Regarding the facial recognition using the CNN, excellent results in an algorithm that compares mainly two faces and evaluates whether or not they are an identical person have been reported.

However, for example, not in the comparison type algorithm, but in an algorithm that allocates individual IDs to all 65536 people, 65536 outputs are required in the fully connected layer of the CNN. Thus, in such mechanical learning, a massive amount of computation is required.

On the other hand, in a technique of performing optimization while generating a parse tree on the basis of the AutoEncoder, an algorithm that performs decomposition into a binary tree structure can be designed by providing thresholds in respective layers in terms of sex, hair color, and skin color, for example.

In this technique, IDs can be given to 65536 people by the algorithm including 16 level layers, which is more compact in comparison with the CNN technique.

As described above, under the condition that the CNN is subjected to factorization and hierarchized at multi levels, it can be considered that the CNN and the AutoEncoder have no special differences in the mechanical learning ability, and are suitable or unsuitable in a manner that depends on applications.

The CNN and the AutoEncoder are suitable or unsuitable in a manner that depends on targeted algorithms. Therefore, efficient design is possible by correctly combining both.

Fifth Embodiment

Next, a fifth embodiment will be described. In the fifth embodiment, implementation of an optical correction system will be described.

[Problem of Typical Technology]

When the mechanical learning module 10 capable of controlling development in the time direction is used, an image correction type algorithm that removes a flicker phenomenon, a noise phenomenon, and the like to a certain level by utilizing the correlation in the time direction can be synthesized.

On the other hand, regarding these phenomena, there may be a case where it is difficult to perform feature extraction in a manner that depends on scenes and strength of input images or there may be a case where these cannot be completely solved even by using mechanical learning and excessively corrected.

[Means For Solving Problem]

"Noise, etc." that fluctuates over time, such as flicker and noise, can be naturally removed in such a manner that the low-pass filter effect acts in the time direction by adding and accumulating frames, though a residual image is produced in the moving object.

In reduction of such noise, etc. by frame accumulation, it is also unnecessary to perform feature extraction of noise, etc.

In view of this, in this embodiment, proposed is an apparatus that reduces noise, etc. by exerting the frame-accumulation effect while keeping the profile and dynamic resolution of the motion as much as possible by using a technology of controlling the time phase also in a case where it is difficult to perform feature extraction of noise, etc.

[Realization Method]

Figure 32:
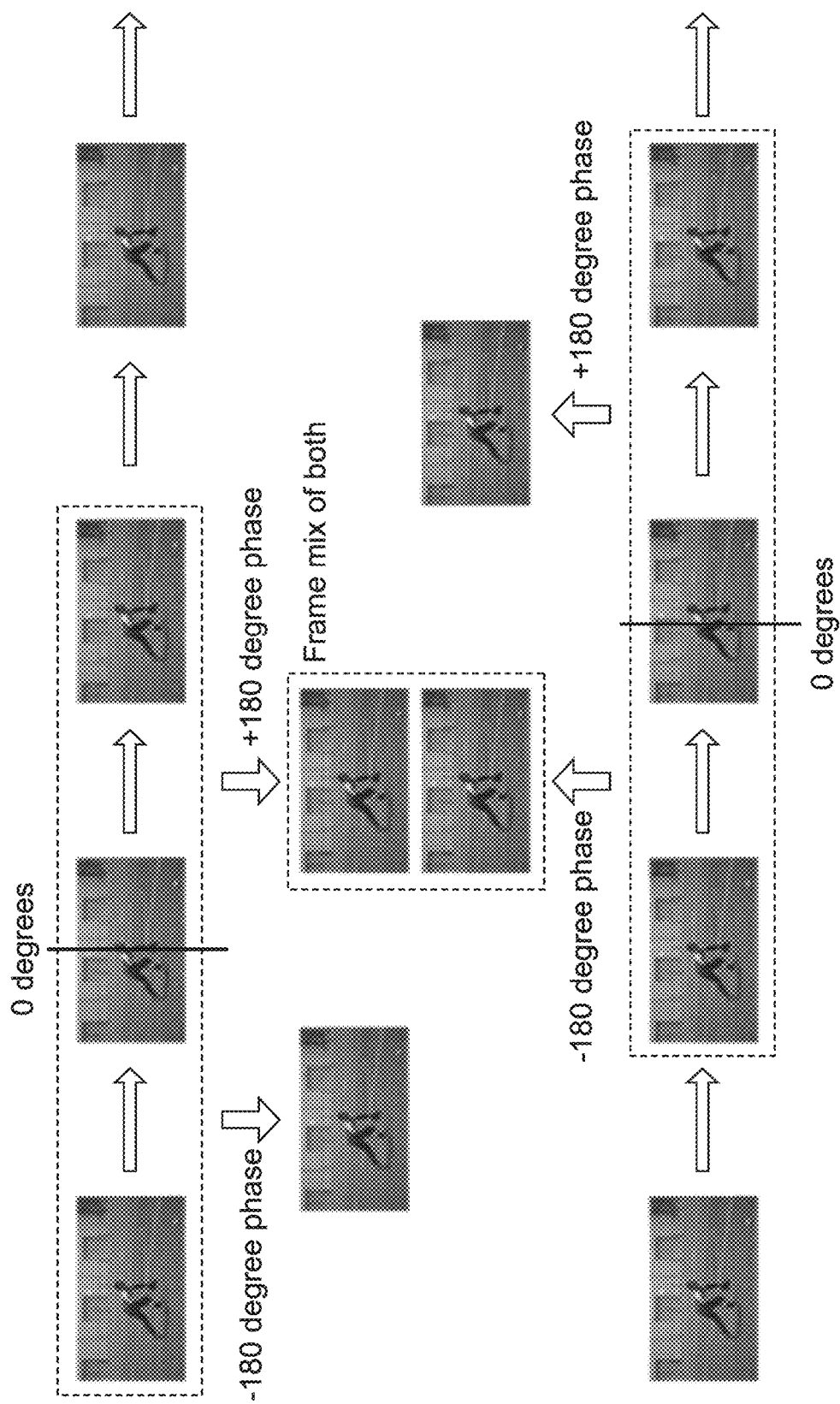
[FIG. 32] A diagram showing an example in which flicker is corrected.

Frames having phases obtained by respectively deviating the time phases of the frames adjacent to each other by ±180 degrees, are developed, and the developed frames are added. FIG. 32 is a diagram showing an example in which the flicker is corrected.

The profiles of the frames adjacent to each other substantially coincide with each other. Therefore, it is possible to reduce noise, etc. to about ½ due to the frame-accumulation effect while minimizing an increase of a residual image due to the frame accumulation and generation of artifacts such as double profiles.

As described above, in the mechanical learning module 10, flicker and noise components on which feature extraction has been succeeded can be coped with by the Heterogeneous type DNN blocks 11$f$ by providing a supervisory signal in the series of mechanical learning processing described above.

On the other hand, noise and flicker of a scene on which feature extraction has failed cannot be controlled also with a frame interpolation image with respect to the time phase, and are fixed points even if the time phase is moved.

Therefore, these noise, etc. can be reduced to about ½ due to the frame-accumulation effect by adding the frames developed by deviating the phases of the frames adjacent to each other by ±180 degrees.

Sixth Embodiment

Next, a sixth embodiment will be described. In the sixth embodiment, hybridization of the object type header and the wavelet type header will be described.

[Problem of Typical Technology]

The object type header OH is generally an effective means in the field of image recognition systems. However, in a case where the object type header OH is used in an image processing system, the amount of computation generally increases. Therefore, it is difficult to widely use the object type header OH in the image processing system, excluding reports about some successful cases, for example, spatial super-resolution, noise reduction, and information estimation based on peripheral pixels, and the like.

In the image processing, an approach of extracting frequency components by the AutoEncoder of the wavelet type header WH rather than the object type header OH and constructing images for each frequency is advantageous.

On the other hand, there is also a case where some image recognition is required also in the image processing, and there is also a case where the simultaneous use of both the headers is required if necessary.

However, employing both the headers at the same time is a very large overhead.

[Means For Solving Problem]

Figure 33:
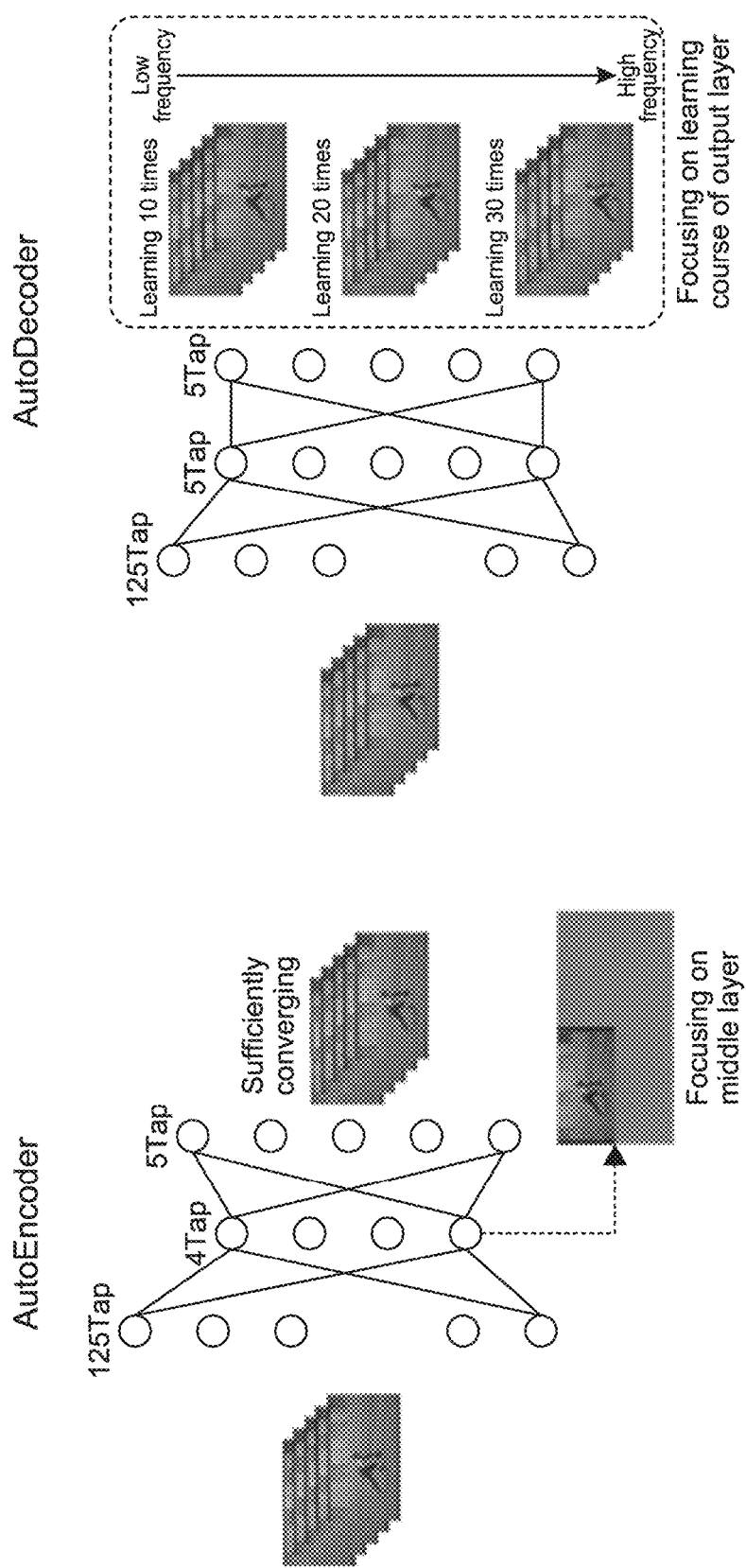
[FIG. 33] A diagram showing a difference between AutoEncoder and AutoDecoder with respect to frequency decomposition.

In view of this, regarding the wavelet type header WH, the DNN blocks 11$p$ are not hierarchized, and, while performing frequency decomposition by focusing on a learning course, the processing using the CNN is performed on the obtained frequency decomposed image. With this, the PreTraining of both the frequency level layer and the abstraction degree level layer is executed. Note that FIG. 33 is a diagram showing a difference between the AutoEncoder and the AutoDecoder with respect to the frequency decomposition.

[Realization Method]

The mechanical learning has a characteristic that the learning is preferentially made to progress from components having a larger gain. Focusing on a degree of progress of the mechanical learning, the learning is preferentially made to progress at an initial stage mainly with respect to the low-frequency component, and the high-frequency component is also recovered at a final stage.

By extracting an image for each of certain learning stages, images of a plurality of frequency components can be obtained.

Figure 34:
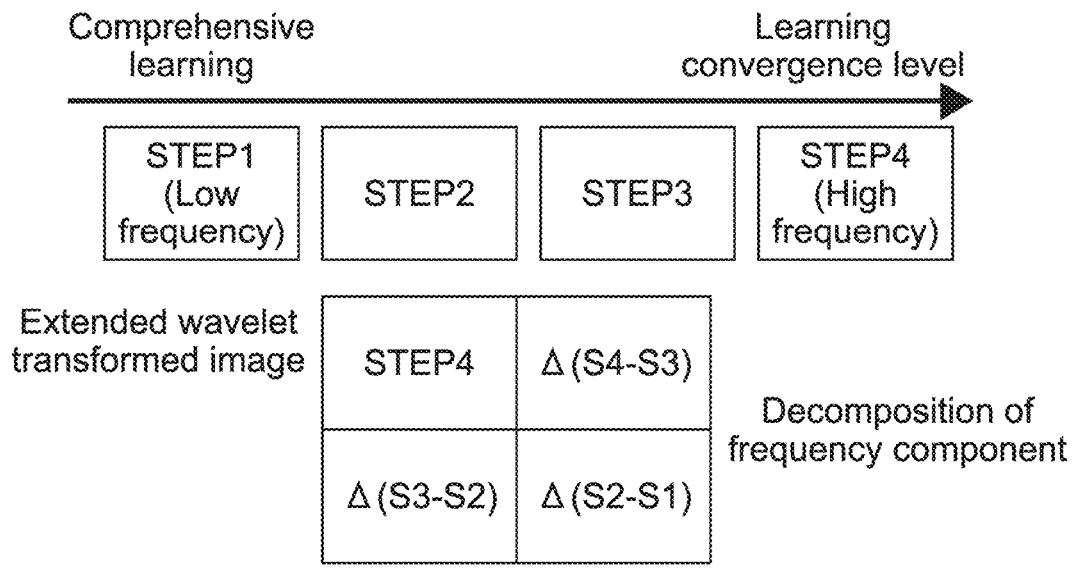
[FIG. 34] A diagram showing a state in which frequency components are decomposed.

By determining a difference between a supervisory image and a converged image at each stage (level layer), it is possible to extract components from the low frequency to the high frequency at each level layer and obtain frequency components. Note that FIG. 34 is a diagram showing a state in which frequency components are decomposed.

By repeating the CNN and the Pooling on these frequency components and performing hierarchization in the abstraction degree direction, two-dimensional PreTraining of frequency X abstraction degree is executed.

By the way, the generated algorithm involves the LPF effect in the inverse calculation problem as described above. Therefore, in a case where the frequency components are processed in a manner that depends on needs, the cooperative conversion is realized by defining the two DNN blocks 11 of the LPF type and the HPF type and alternately arranging these DNN blocks 11 in the above-mentioned embodiment.

In this embodiment, both the headers of the LPF type and the HPF type are obtained by operating the learning pattern.

When the pattern is comprehensively learned, a digital filter with the LPF effect exerted in the entire system can be obtained in the inverse calculation problem.

On the contrary, when learning of narrowing-down a particular pattern is performed, a high-pass filter effective only with a certain pattern and excellent in frequency response is generated.

Figure 35:
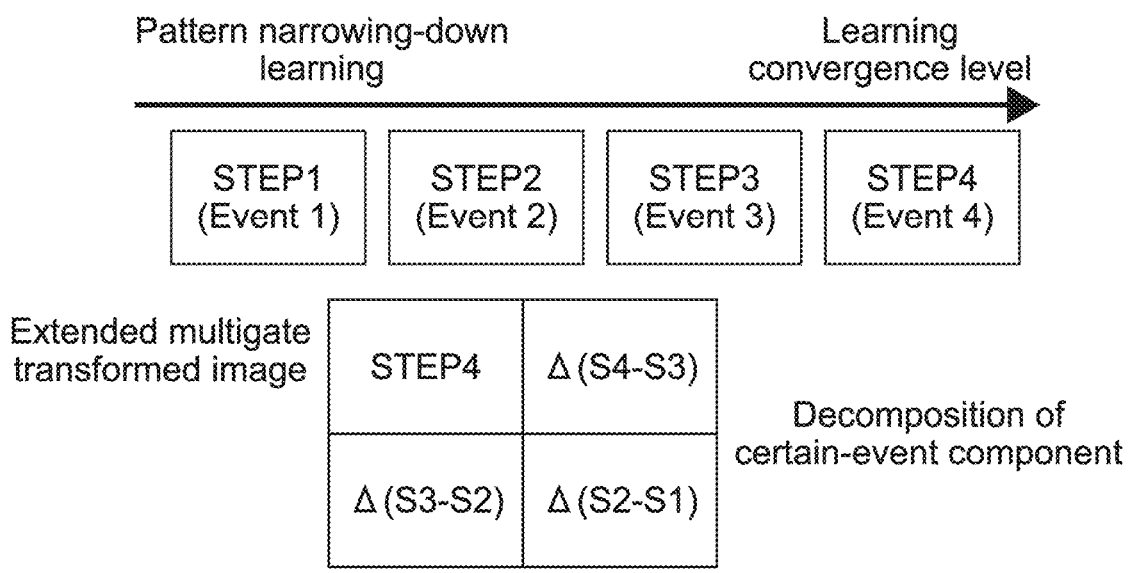
[FIG. 35] A diagram showing a state in which a particular event in a gate type header GH is decomposed.

The former digital filter having the LPF effect is defined as the above-mentioned wavelet type header WH. The latter high-pass filter is defined as a gate type header GH having a solution correct only in a particular region. Note that FIG. 35 is a diagram showing a state in which a particular event in the gate type header GH is decomposed.

In accordance with the above-mentioned method, the header that can perform two-dimensional (frequency level layer X abstraction degree level layer) processing by using both the wavelet type header WH and the gate type header GH can be obtained.

Seventh Embodiment

Next, a seventh embodiment will be described. In the seventh embodiment, image processing using symbol conversion will be described.

[Problem of Typical Technology]

The above-mentioned technology employs the configuration in which components decomposed by the object type header OH, the struct type header SH, or the wavelet type header WH obtained in the PreTraining layer PT are generated, and a decoded image, which is a target, is obtained by constructing these components in the FineTune layer FT.

In the method in which the decoded image is used as a direct target value in the FineTune layer FT in this manner, a final result is simply obtained by filtering many of components extracted as features in the PreTraining layer PT.

Therefore, once decoded data cannot be thereafter handled in the DNN blocks 11$f$ at the post-stage.

Further, if the target value is set to a constant decoded value, it becomes impossible to effectively use object information of the various headers originally obtained in the PreTraining.

[Means For Solving Problem]

In view of this, in this embodiment, in the FineTune layer FT, not a technique of obtaining a final decoded image from object tree information generated by the respective headers in the PreTraining layer PT, but a technique of converting the target value into object tree information decomposed in the same header system is employed.

In the FineTune layer FT, a final image is obtained by decode processing using each decoder synthesized at the same time as an encoder in the PreTraining layer PT after conversion into the object tree information.

Figure 36A:
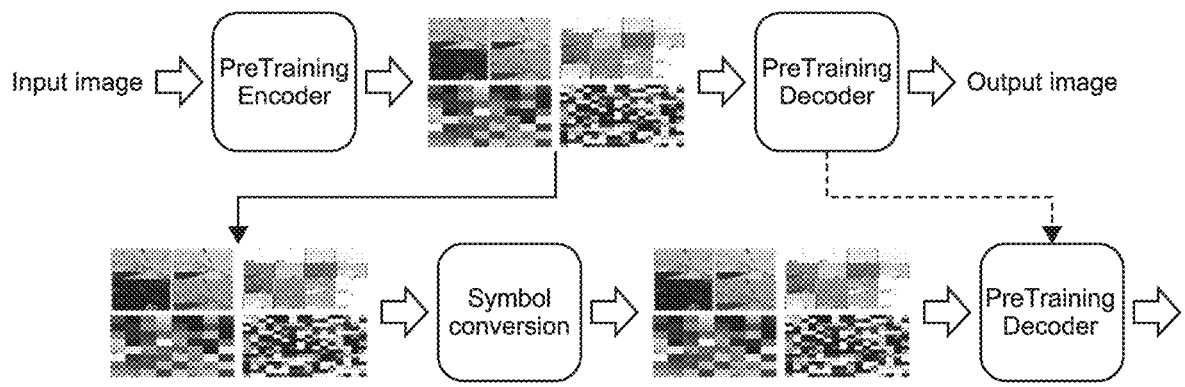
[FIG. 36A] A diagram showing the outline of symbol conversion with respect to an object tree.
Figure 36B:
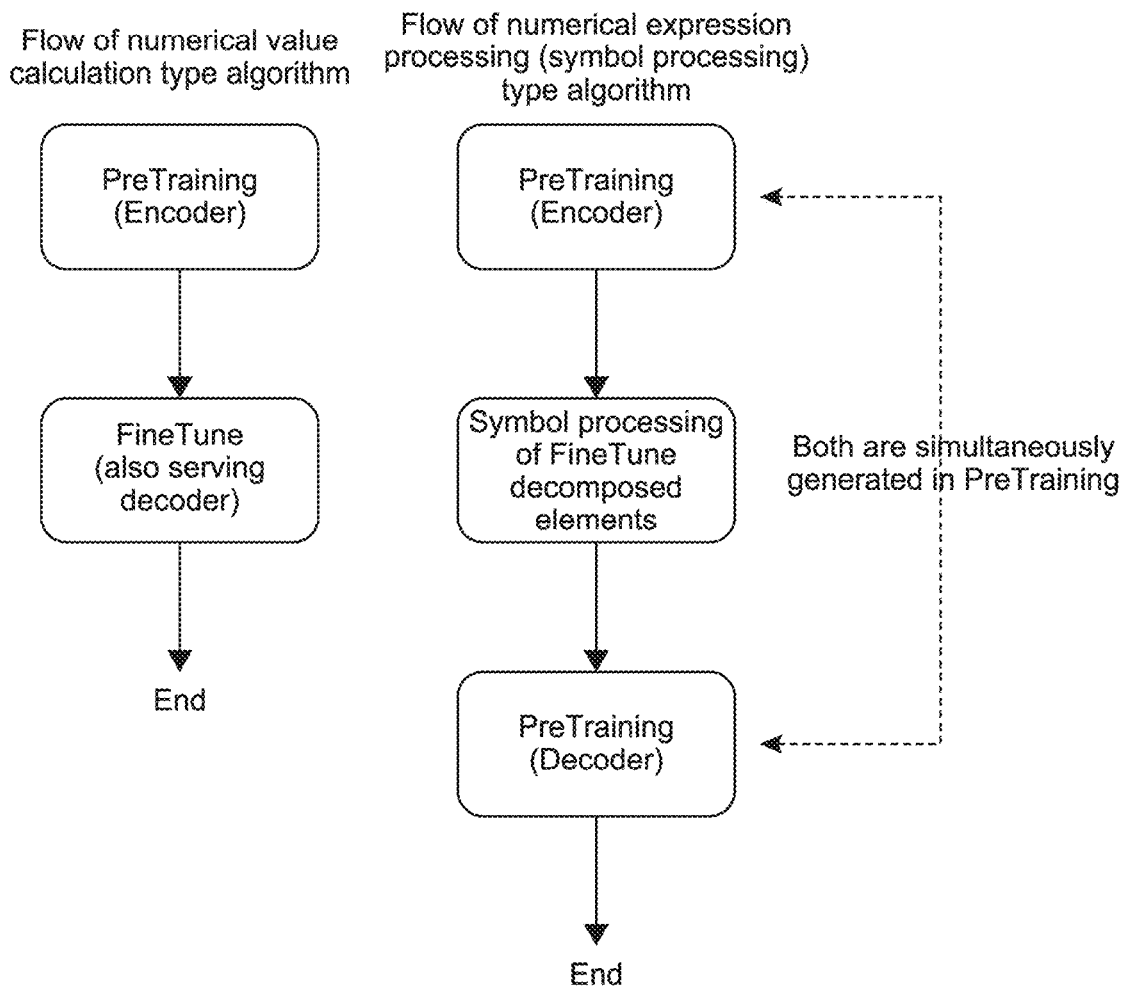
[FIG. 36B] A diagram showing a difference of a flow of processing between a numerical value calculation type algorithm and a numerical expression processing (symbol processing) type algorithm.

Note that FIG. 36A is a diagram showing the outline of symbol conversion with respect to an object tree, and FIG. 36B is a diagram showing a difference of a flow of processing between a numerical value calculation type algorithm and a numerical expression processing (symbol processing) type algorithm.

[Realization Method]

In the PreTraining layer PT, an object tree image is generated from an image of successive five frames. As a supervisory image provided to the FineTune layer FT, each object tree image is prepared from frames corresponding to a reproduction speed of −100%, −50%, 0%, 50%, and 100%, for example.

In a symbol processing type mechanical learning module 10$s$, learning for outputting an expectation-value object tree from an input object tree is performed.

The synthesized algorithm outputs a header image depending on a reproduction speed designated by a control item.

This object tree image becomes a slow image by passing through the decoder for each header already generated in the PreTraining layer PT.

In accordance with this method, a finer operation can be performed on each component with respect to header information in comparison with the method of performing development by setting the high-framerate image as the target directly in the FineTune layer FT. Therefore, the precision of the algorithm is enhanced, and there is a possibility that more complex image processing algorithm can be synthesized in future.

Figure 37A:
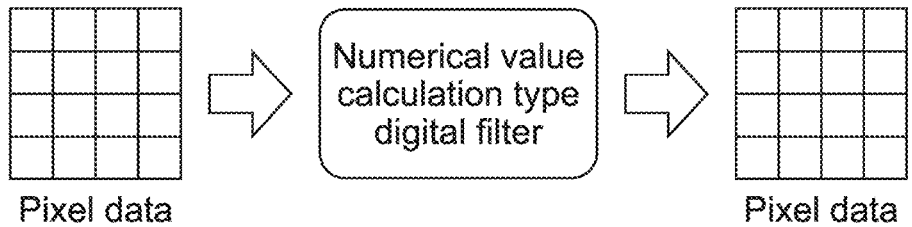
[FIG. 37A] A diagram showing comparison between two kinds of image processing algorithms of a numerical value calculation type that is a typical technology and an image processing algorithm of a symbol processing type in this embodiment.
Figure 37B:
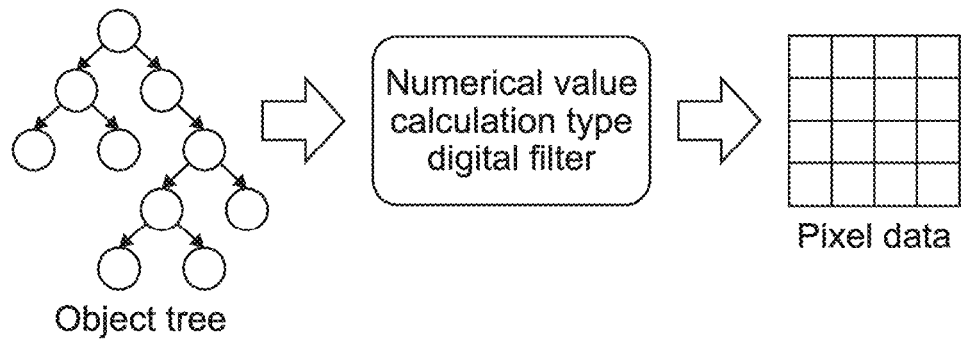
[FIG. 37B] A diagram showing comparison between the two kinds of image processing algorithms of the numerical value calculation type that is the typical technology and the image processing algorithm of the symbol processing type in this embodiment.
Figure 37C:
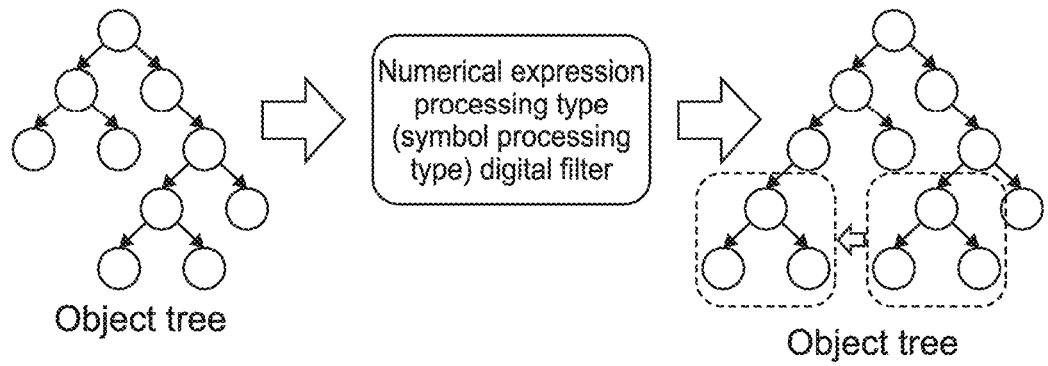
[FIG. 37C] A diagram showing comparison between the two kinds of image processing algorithms of the numerical value calculation type that is the typical technology and the image processing algorithm of the symbol processing type in this embodiment.

FIGS. 37A, 37B, and 37C are diagrams showing comparison between two kinds of image processing algorithms of a numerical value calculation type that is the typical technology and an image processing algorithm of a symbol processing type in this embodiment.

In the image processing of the numerical value calculation type, an output value is obtained by performing processing like numerical value calculation on a pixel.

Also in the above-mentioned embodiment, in the FineTune layer FT, various types of header information are input while output values are simple decoded pixel information.

In this embodiment, each header is interpreted as an image parse tree. A symbol processing algorithm synthesizes an algorithm that performs fine processing individually on each component of this parse tree. Therefore, unlike the algorithm that obtains the simple decoded image, it is possible to cope with the problem by using a complex image processing algorithm.

(Supplement 1)

In the various headers, unsupervised machine learning is performed at the stage of the PreTraining such that the input is approximately equal to the output. Therefore, the encoder and the decoder are generated at the same time in the synthesis process of the algorithm in this embodiment.

The above-mentioned embodiment employs a design in which the encoder is utilized for object tree generation and each DNN block 11$f$ of the FineTune layer FT synthesizes the decoder in accordance with the technique shown in FIG. 37B. Therefore, the decoder of the PreTraining layer PT is never utilized.

In this embodiment, the FineTune layer FT does not perform learning for obtaining the decoded image. Also for a target value (supervisory signal) to be input, a target value (supervisory signal) decomposed into the object tree information in the PreTraining layer PT is used. The FineTune layer FT of this embodiment performs learning for conversion from input header information into target value header information.

That is, the FineTune layer FT of this embodiment performs "symbol conversion from the input object tree into another target value object tree".

The thus converted object tree employs a method of finally obtaining an image by an original decoder synthesized in the PreTraining layer PT.

(Supplement 2)

As a typical image processing digital filter, a digital filter of the numerical value calculation type using pixel information as an input and pixel information as an output is often used.

In the digital filter of the numerical value calculation type, an algorithm that analyses mainly frequency components and suitably converts a signal level of each pixel by multiply-accumulate operation and logic operation has been used.

In this embodiment, the DNN performs image recognition at a high abstraction degree, considering an input image as the object tree.

Unprecedented, object-oriented, high-abstraction degree image processing becomes possible by adding numerical value calculation processing, node rearrangement processing, and logic operation processing to the respective elements of the internal structure of such an object tree.

Note that it is difficult to manually design a specific symbol processing algorithm, and hence an algorithm that rearranges the object tree is basically synthesized by mechanical learning.

(Supplement 3: Application Example)

Figure 38:
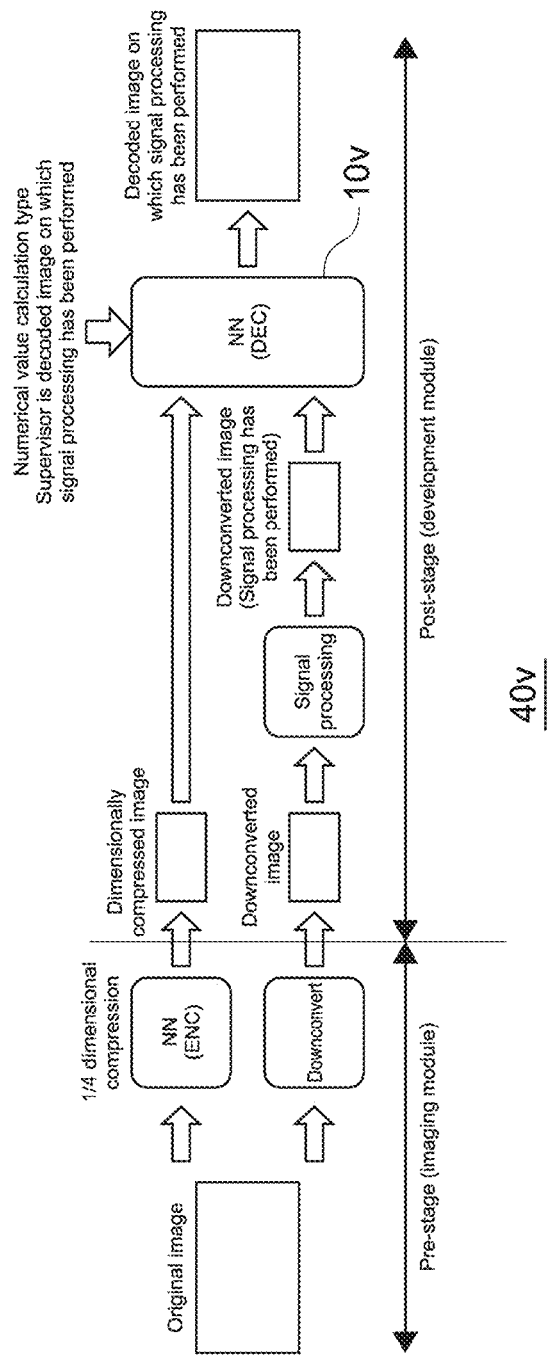
[FIG. 38] A diagram showing a configuration example of a transmission apparatus 40v using a numerical value calculation type mechanical learning module 10v.
Figure 39:
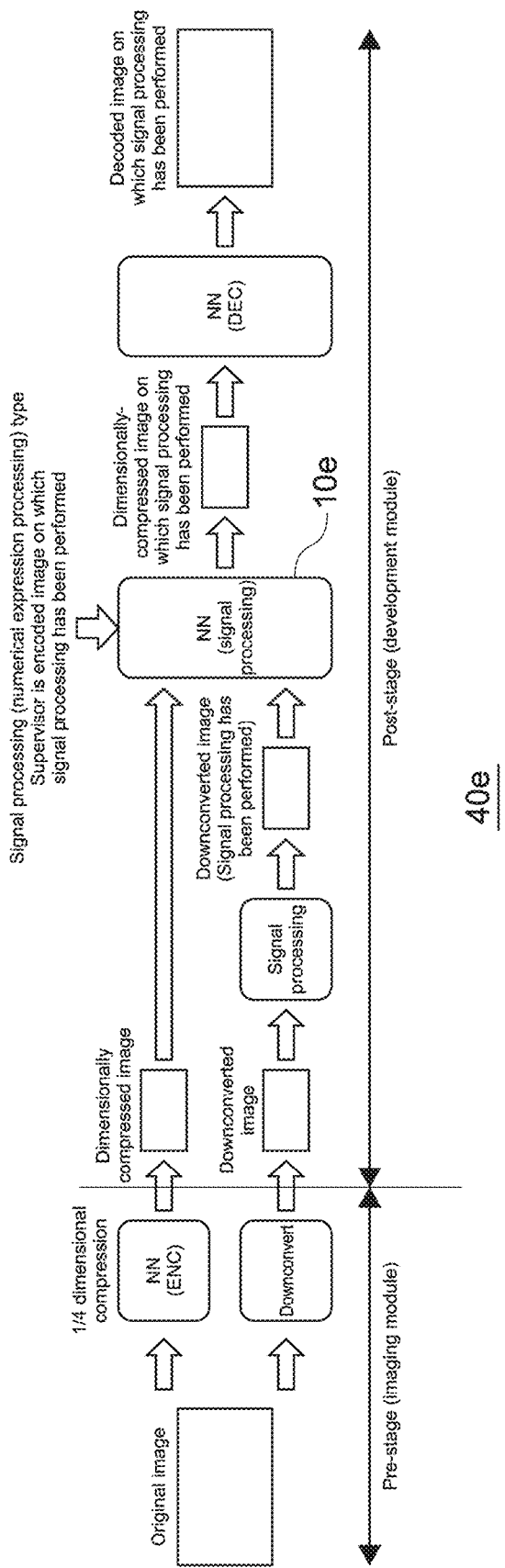
[FIG. 39] A diagram showing a configuration example of a transmission apparatus 40e using a numerical expression processing type mechanical learning module 10e.

A more specific application example using a numerical expression processing type mechanical learning module 10e and a numerical value calculation type mechanical learning module 10v will be described. FIG. 38 is a diagram showing a configuration example of the transmission apparatus 40v using the numerical value calculation type mechanical learning module 10v. FIG. 39 is a diagram showing a configuration example of a transmission apparatus 40e using the numerical expression processing type mechanical learning module 10e.

These transmission apparatuses are configured to reduce the transmission load between an imaging module 40i and a development module 40d by compressing and transmitting images by using the dimensional compression function of the AutoEncoder.

The configurations of both dimensionally compress an original image into a ¼ size by the imaging module 40i at the pre-stage and perform ¼-downconversion for a monitoring application. Thus, the transmission amount is finally reduced to ½. Then, the dimensionally compressed image is decoded by the development module 40d at the post-stage.

The both perform signal processing only on the downconverted image by utilizing the superposition function of the algorithm. It is an object to obtain the decoded image on which the signal processing has been performed, from the image on which the signal processing has been performed and the dimensionally compressed image.

It is an embodiment in which a reduction in power consumption is achieved in the compression processing at the stages of imaging and transmission and the compression of the signal processing.

The configuration shown in FIG. 38 is a configuration example of the transmission apparatus 40v that simultaneously inputs, at the time of decoding, also the downconverted image on which the signal processing has been performed and obtains the decoded image on which the signal processing has been performed.

For example, it is assumed that the original image is a 4K image. The 4K image has a large amount of data. Therefore, it is encoded by dimensional compression of the AutoEncoder, and the 4K image is compressed into an HD image.

The compressed image can be recovered to the original image by the decoders simultaneously synthesized by the AutoEncoder. It should be noted that the image quality is deteriorated as in the compression technology.

In this embodiment, for also reducing camera signal processing to the amount of computation approximately equivalent to the HD at the time of decoding, also an image obtained by downconverting the 4K image is simultaneously transmitted to the development module 40d at the post-stage and the camera signal processing is performed only on the downconverted image.

The 4K image subjected to the camera signal processing approximately equivalent to that of the downconverted image can be obtained by providing the numerical value calculation type mechanical learning module 10v that has performed learning using an image obtained by performing the camera signal processing on the entire 4K image as a supervisor by using the two images of the previously dimensionally compressed image and the image on which the camera signal processing has been performed as inputs.

In the decode processing using this configuration, there is only an increase corresponding to about six multiplications with respect to monochromatic one pixel. Thus, in the entire system, the amount of camera signal processing is reduced to approximately HD size +α.

As viewed in the entire system, the transmission band can be halved due to the dimensional compression effect of the AutoEncoder and the camera signal processing is compressed to about 75% by utilizing this dimensionally compressed data. It contributes to a reduction in power consumption and a reduction in hard resources.

In FIG. 39, by using the dimensionally compressed image and the image on which the signal processing has been performed as inputs, conversion is performed into the dimensionally compressed image on which the signal processing has been performed, and decoding is finally performed by the decoder that has simultaneously obtained at the time of the first synthesis of the dimensional compression module.

The transmission apparatus 40e has substantially the same object as the transmission apparatus 40v. However, in the transmission apparatus 40v, compressed signal processing is configured by using the numerical value calculation type and added to the decoder. In contrast, the transmission apparatus 40e is of the symbol processing type, and obtains the dimensionally compressed data on which the signal processing has been performed.

Although the amount of computation of the transmission apparatus 40e becomes slightly larger than that of the numerical value calculation type, a higher-precision algorithm can be synthesized by using the symbol processing.

By suitably providing a supervisor, a plurality of algorithms can be executed at the same time in this symbol processing level layer.

The dimensionally compressed data after the symbol processing is finally converted into the 4K image through a decode layer synthesized by the AutoEncoder.

In short, the former numerical value calculation type mechanical learning module 10v uses the pixel data as the target value while the latter numerical expression processing type mechanical learning module 10e uses each dimensionally compressed component as the target value.

The resources required for computation are slightly less in the former numerical value calculation type algorithm. However, it was confirmed from experiment results that, regarding the algorithm precision and the algorithm intelligence, the latter numerical expression processing type algorithm is superior because it synthesizes the algorithm that individually processes each clustered component.

Eighth Embodiment

Next, an eighth embodiment will be described. In the eighth embodiment, extraction of meanings from each middle-layer component will be described.

[Problem of Typical Technology]

It has been difficult to check how the components generated from the respective headers act on the decoded image as information.

[Means For Solving Problem]

It is possible to know the details of the respective components by obtaining the image decoded with the respective components masked and comparing them to the original image.

[Realization Method]

Figure 40A:
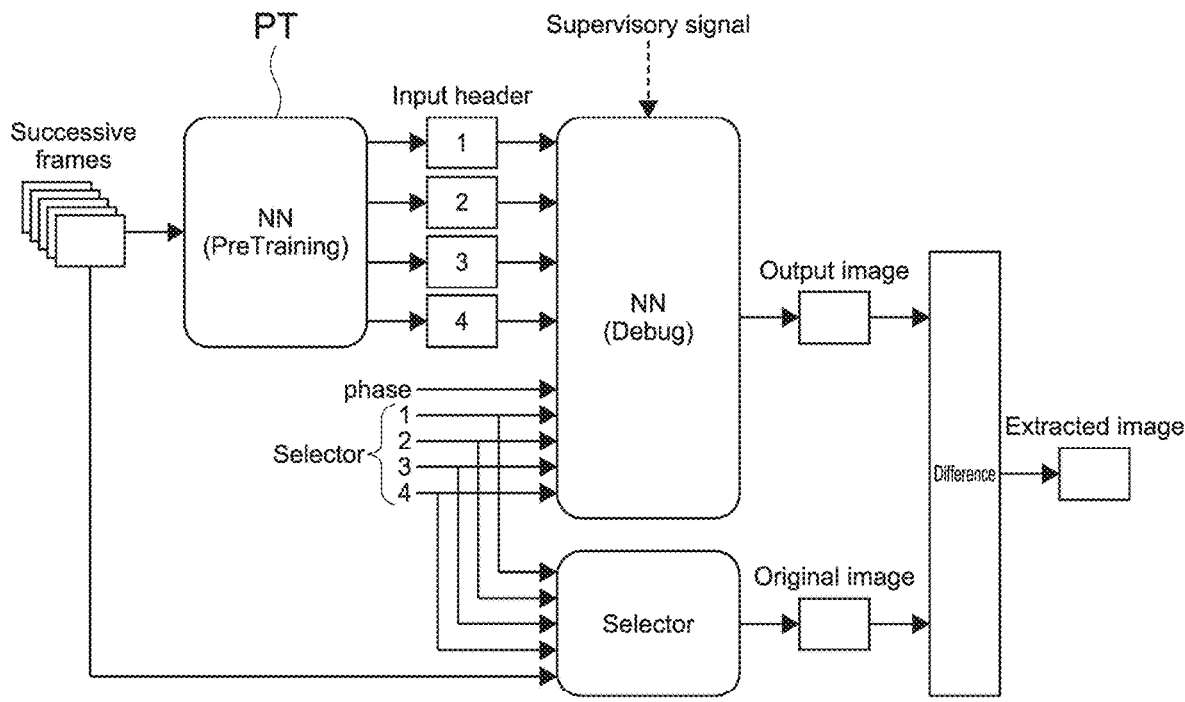
[FIG. 40A] A diagram showing a configuration example of a mechanical learning module 10d of this embodiment.
Figure 40B:
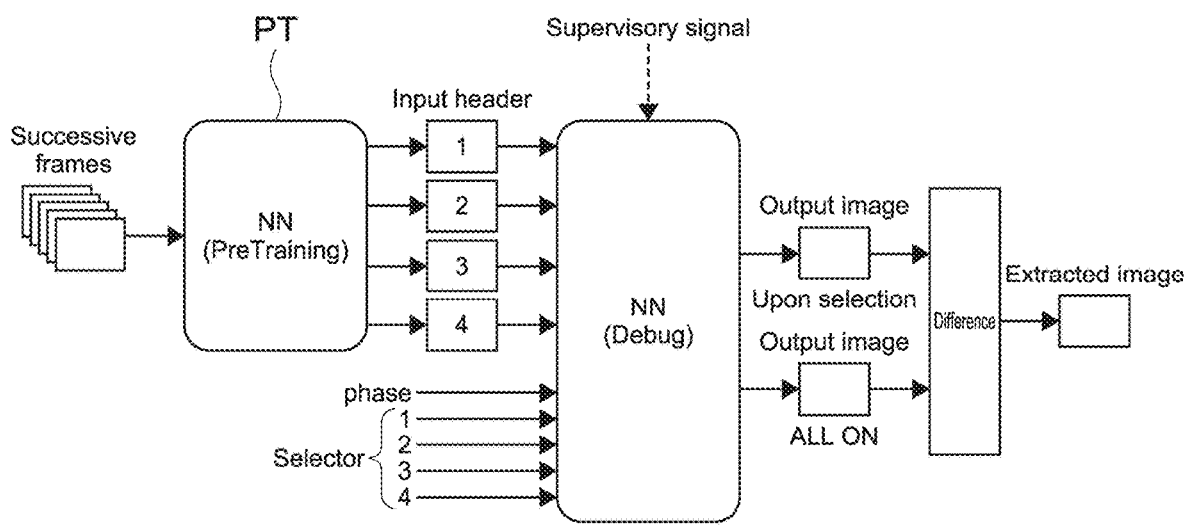
[FIG. 40B] A diagram showing a configuration example of the mechanical learning module 10d of this embodiment.

FIGS. 40A and 40B are diagrams showing a configuration example of the mechanical learning module 10d of this embodiment.

As shown in the figures, by using the headers decomposed in the PreTraining layer PT as inputs, providing a phase control signal (shown as phase), and using selectors that select any of the original successive frames as described above, selector signals corresponding to the number of input headers are input, and mechanical learning is performed classifying the cases as follows.

(1) When the selectors are ALL ON, any of the successive frames is output on the basis of the phase signal (as in described above).

(2) When the selectors are ALL OFF, a black image is output.

(3) When only any one of the selectors is ON, a header image corresponding to the number thereof is output.

As a result of the above-mentioned mechanical learning, first of all, the image according to the phase signal can be obtained when the selectors are ALL ON.

When any one of the selectors is turned OFF, the decoded image with the corresponding component masked can be obtained.

By determining a difference between the obtained image and the original image or by determining a difference from the image obtained when the selectors are ALL ON, it is possible to analyze an amount of change in a case where the corresponding header image is missing and to analyze how each header contributes to the decoded image.

<Effects of Invention>

A comprehensive image processing algorithm platform using the mechanical learning technology can be provided by using the configuration method for the upstream design module in which the input value and the expectation value (supervisory signal) provided to the mechanical learning module are designed, the application of which has been submitted, and the hierarchization method, the debug method, the tuning method, and the optimization method in the PreTraining layer PT and the FineTune layer FT, which are proposed in this application.

This comprehensive image processing algorithm platform provides a technology of smoothly solving the problem, which has been difficult to solve by design by people, by the artificial intelligence.

<Supplement Matters>

The present technology can also take the following configurations.

(1)

An information processing apparatus, including:

a mechanical learning module that is a multiplier-accumulator circuit including a plurality of deep-learning neural network blocks hierarchized and synthesizes an algorithm having a filter characteristic for image processing by mechanical learning, the image processing being a target;

a debug module that analyzes a digital filter characteristic in each of the deep-learning neural network blocks on the basis of input and output data in the mechanical learning module; and a grading module that develops an output image from an input image by performing gain control on the basis of a result of analysis of the debug module.

(2)

The information processing apparatus according to (1), in which
the mechanical learning module includes
a PreTraining layer that performs unsupervised machine learning, and
a FineTune layer that performs supervised learning.

(3)

The information processing apparatus according to (2), in which
the mechanical learning module performs the supervised learning by using a component decomposed in a middle layer of each of the deep-learning neural network blocks included in the PreTraining layer as a supervisory signal of each of the deep-learning neural network blocks included in the FineTune layer.

(4)

The information processing apparatus according to (2) or (3), in which
the PreTraining layer is constructed by an object type header that decomposes the input image into an object tree structure by performing convolution and pooling on the input image.

(5)

The information processing apparatus according to (2) or (3), in which
the PreTraining layer is constructed by a wavelet type header that generates, from the input image, a frequency decomposed image with a time and a space mixed from a high frequency to a low frequency.

(6)

The information processing apparatus according to (2) or (3), in which
the PreTraining layer is constructed by a struct type header that extracts an effective component in depth analysis, profile analysis, or region analysis of the input image.

(7)

The information processing apparatus according to any one of (2) to (6), in which
the FineTune layer includes
the plurality of deep-learning neural network blocks that perform inter-frame learning by using the input image including a plurality of frames, and
the plurality of deep-learning neural network blocks that perform in-frame learning by using the input image including the plurality of frames.

(8)

The information processing apparatus according to (7), in which
the plurality of deep-learning neural network blocks that perform the in-frame learning are connected in the order of the plurality of deep-learning neural network blocks that perform commutative-law conversion, the plurality of deep-learning neural network blocks that perform spatial-resolution conversion, and the plurality of deep-learning neural network blocks that perform dynamic-resolution conversion.

[Supplement Matters]

In addition, the present technology is not limited to the above-mentioned embodiments, and various modifications can be made without departing from the gist of the present technology as a matter of course.

REFERENCE SIGNS LIST 1 image processing algorithm generation apparatus
10 mechanical learning module 10' mechanical learning module
10d mechanical learning module
10e numerical expression processing type mechanical learning module
10s symbol processing type mechanical learning module
10v numerical value processing type mechanical learning module DNN block
11c convolution unit
11d deterioration processing unit
11p DNN block (of PreTraining layer)
11f DNN block (of FineTune layer)
11w wavelet transform section
12 conventional type serial processing module
13 geometric transform module
14 database reference type module
20 debug module
30 grading module
40d development module
40e (numerical expression processing type) transmission apparatus
40i imaging module
40v (numerical value processing type) transmission apparatus
CH CNN type header
FT FineTune layer
OH object type header
PT PreTraining layer
SH struct type header
WH wavelet type header

The invention claimed is:

1. An information processing apparatus, comprising:
a mechanical learning module that is a multiplier-accumulator circuit, wherein the mechanical learning module includes:
  a plurality of deep-learning neural network blocks hierarchized, wherein
  the mechanical learning module is configured to configured to synthesize a plurality of layers of the plurality of deep-learning neural network blocks based on mechanical learning,
  the plurality of layers has a filter characteristic for image processing, and
  the image processing is a target; and
  a PreTraining layer configured to perform unsupervised machine learning, wherein
  the PreTraining layer is constructed based on an object type header configured to decompose an input image into an object tree structure, and
  the input image is decomposed based on convolution and pooling on the input image;
a debug circuit configured to analyze a digital filter characteristic in each of the plurality of deep-learning neural network blocks based on input data and output data in the mechanical learning module; and
a grading circuit configured to:
  perform gain control based on a result of the analysis of the debug circuit; and
  generate an output image from the input image based on the performed gain control.

2. The information processing apparatus according to claim 1, wherein the mechanical learning module further includes
a FineTune layer configured to perform supervised learning.

3. The information processing apparatus according to claim 2, wherein
the mechanical learning module is further configured to perform the supervised learning based on a component decomposed in a middle layer of each of the plurality of deep-learning neural network blocks included in the PreTraining layer, and
the components decomposed in the middle layer are input as a supervisory signal of each of the plurality of deep-learning neural network blocks included in the FineTune layer.

4. The information processing apparatus according to claim 2, wherein the FineTune layer includes:
a plurality of first deep-learning neural network blocks configured to perform inter-frame learning based on the input image including a plurality of frames, and
a plurality of second deep-learning neural network blocks configured to perform in-frame learning based on the input image including the plurality of frames.

5. The information processing apparatus according to claim 4, wherein
the plurality of second deep-learning neural network blocks configured to perform the in-frame learning are connected in an order of a plurality of third deep-learning neural network blocks configured to perform commutative-law conversion, a plurality of fourth deep-learning neural network blocks configured to perform spatial-resolution conversion, and a plurality of fifth deep-learning neural network blocks configured to perform dynamic-resolution conversion.

6. The information processing apparatus according to claim 1, wherein
the PreTraining layer is constructed based on a wavelet type header, and
the wavelet type header is configured to generate, from the input image, a frequency decomposed image with a time and a space mixed from a high frequency to a low frequency.

7. The information processing apparatus according to claim 1, wherein
the PreTraining layer is constructed based on a struct type header, and
the struct type header is configured to extract at least one of an effective component in depth analysis of the input image, profile analysis of the input image, or region analysis of the input image.

8. An information processing method, comprising:
synthesizing, by a mechanical learning module, a plurality of layers of a plurality of deep-learning neural network blocks based on a mechanical learning, wherein
the mechanical learning module is a multiplier-accumulator circuit,
the mechanical learning module includes the plurality of deep-learning neural network blocks hierarchized,
the plurality of layers has a filter characteristic for image processing, and
the image processing is a target;
performing unsupervised machine learning by a PreTraining layer of the mechanical learning module, wherein
the PreTraining layer is constructed based on an object type header that decomposes an input image into an object tree structure, and
the input image is decomposed based on convolution and pooling on the input image;
analyzing, by a debug circuit, a digital filter characteristic in each of the plurality of deep-learning neural network blocks based on input data and output data in the mechanical learning module;

performing, by a grading circuit, gain control based on a result of the analysis of the debug circuit; and generating, by the grading circuit, an output image from the input image based on the performed gain control.

9. A non-transitory computer-readable medium having stored thereon, computer-executable instructions which, when executed by a computer, cause the computer to execute operations, the operations comprising:

synthesizing, by a mechanical learning module, a plurality of layers of a plurality of deep-learning neural network blocks based on a mechanical learning, wherein the mechanical learning module is a multiplier-accumulator circuit, the mechanical learning module includes the plurality of deep-learning neural network blocks hierarchized, the plurality of layers has a filter characteristic for image processing, and the image processing is a target;

performing unsupervised machine learning by a PreTraining layer of the mechanical learning module, wherein the PreTraining layer is constructed based on an object type header that decomposes an input image into an object tree structure, and the input image is decomposed based on convolution and pooling on the input image;

analyzing, by a debug circuit, a digital filter characteristic in each of the plurality of deep-learning neural network blocks based on input data and output data in the mechanical learning module;

performing, by a grading circuit, gain control based on a result of the analysis of the debug circuit; and generating, by the grading circuit, an output image from the input image based on the performed gain control.

10. An information processing apparatus, comprising:

a mechanical learning module that is a multiplier-accumulator circuit, wherein the mechanical learning module includes:

a plurality of deep-learning neural network blocks hierarchized, wherein the multiplier-accumulator circuit is configured to configured to synthesize a plurality of layers of the plurality of deep-learning neural network blocks based on mechanical learning, the plurality of layers has a filter characteristic for image processing, and the image processing is a target;

a PreTraining layer configured to perform unsupervised machine learning, and a FineTune layer configured to perform supervised learning, wherein the mechanical learning module is further configured to perform the supervised learning is based on a component decomposed in a middle layer of each of the plurality of deep-learning neural network blocks included in the PreTraining layer, the components decomposed in the middle layer are input as a supervisory signal of each of the plurality of deep-learning neural network blocks included in the FineTune layer, the PreTraining layer is constructed based on an object type header that decomposes an input image into an object tree structure, and the input image is decomposed based on convolution and pooling on the input image;

a debug circuit configured to analyze a digital filter characteristic in each of the plurality of deep-learning neural network blocks based on input data and output data in the mechanical learning module; and a grading circuit configured to:

perform gain control based on a result of the analysis of the debug circuit; and generate an output image from the input image based on the gain control.

* * * * *